United States Patent
Edge

(10) Patent No.: US 10,555,126 B2
(45) Date of Patent: *Feb. 4, 2020

(54) METHOD AND/OR SYSTEM FOR POSITIONING OF A MOBILE DEVICE

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/975,414

(22) Filed: May 9, 2018

(65) Prior Publication Data

US 2018/0262867 A1    Sep. 13, 2018

Related U.S. Application Data

(63) Continuation of application No. 15/273,305, filed on Sep. 22, 2016, now Pat. No. 9,998,856.

(Continued)

(51) Int. Cl.
*H04W 4/02* (2018.01)
*H04W 64/00* (2009.01)
(Continued)

(52) U.S. Cl.
CPC .......... *H04W 4/029* (2018.02); *G01S 5/0036* (2013.01); *G01S 5/02* (2013.01); *G01S 5/0236* (2013.01);
(Continued)

(58) Field of Classification Search
CPC ... H04W 64/003; H04W 64/00; H04W 24/00; G01C 21/206
(Continued)

(56) References Cited

U.S. PATENT DOCUMENTS

| 7,158,500 B2* | 1/2007 | Annamalai | H04W 8/08 370/338 |
| 7,525,484 B2* | 4/2009 | Dupray | G01S 1/026 342/450 |

(Continued)

OTHER PUBLICATIONS

"3rd Generation Partnership Project; Technical Specification Group Radio Access Network; Evolved Universal Terrestrial Radio Access (E-UTRA); LTE Positioning Protocol (LPP) (Release 13)", 3GPP Standard; 3GPP TS 36.355, 3rd Generation Partnership Project (3GPP), Mobile Competence Centre; 650, Route Des Lucioles; F-06921 Sophia-Antipolis Cedex; France, vol. RAN WG2, No. V13.1.0, Mar. 30, 2016 (Mar. 30, 2016), pp. 1-141, XP051088479, [retrieved on Mar. 30, 2016].

(Continued)

*Primary Examiner* — William D Cumming
(74) *Attorney, Agent, or Firm* — Hunter Clark PLLC

(57) ABSTRACT

Methods and systems provide location services for user equipment (UE) devices in a radio access network (RAN) such as a Fifth Generation (5G) RAN. An example method includes exchanging one or more first signaling messages with a first location server implemented in a base station or access point of a radio access network, wherein the radio access network comprises a first positioning domain to utilize a first protocol. The example method also includes exchanging one or more second signaling messages with a second location server associated with a core network, wherein the core network comprises a second positioning domain to utilize a second protocol distinct from the first protocol.

23 Claims, 9 Drawing Sheets

Related U.S. Application Data

(60) Provisional application No. 62/336,500, filed on May 13, 2016.

(51) Int. Cl.
*H04W 24/00* (2009.01)
*H04W 4/029* (2018.01)
*G01S 5/00* (2006.01)
*G01S 5/02* (2010.01)
*G01S 19/09* (2010.01)
*H04W 84/04* (2009.01)

(52) U.S. Cl.
CPC .............. *G01S 19/09* (2013.01); *H04W 4/02* (2013.01); *H04W 64/00* (2013.01); *H04W 84/042* (2013.01)

(58) Field of Classification Search
USPC ......... 342/464; 370/242, 446, 338; 455/423, 455/456.6
See application file for complete search history.

(56) References Cited

U.S. PATENT DOCUMENTS

| | | | | |
|---|---|---|---|---|
| 7,764,231 | B1* | 7/2010 | Karr | .................. G01S 1/026 342/457 |
| 8,995,986 | B2* | 3/2015 | Fix | .................. H04B 1/707 455/423 |
| 9,510,317 | B1* | 11/2016 | Bansal | ................ H04W 64/003 |
| 9,998,856 | B2* | 6/2018 | Edge | ................... H04W 64/00 |
| 2002/0135518 | A1* | 9/2002 | Rabinowitz | .......... G01C 21/206 342/464 |
| 2003/0008541 | A1 | 1/2003 | Oguma et al. | |
| 2003/0085841 | A1 | 5/2003 | Spilker, Jr. et al. | |
| 2004/0202194 | A1* | 10/2004 | Annamalai | ............. H04W 8/08 370/446 |
| 2012/0258733 | A1 | 10/2012 | Fischer et al. | |
| 2013/0337831 | A1 | 12/2013 | Edge et al. | |
| 2016/0212592 | A1 | 7/2016 | Chen | |
| 2017/0332192 | A1* | 11/2017 | Edge | ..................... H04W 64/00 |
| 2018/0262867 | A1* | 9/2018 | Edge | ..................... H04W 64/00 |
| 2018/0262868 | A1 | 9/2018 | Edge | |

OTHER PUBLICATIONS

"3rd Generation Partnership Project; Technical Specification Group Radio Access Network; Stage 2 functional specification of User Equipment (UE) positioning in UTRAN (Release 13)", 3GPP Draft; Draft _25305-D00_With_Rev_Marks, 3rd Generation Partnership Project (3GPP), Mobile Competence Centre; 650, Route Des Lucioles; F-06921 Sophia-Antipolis Cedex; France, Dec. 17, 2015 (Dec. 17, 2015), pp. 1-95, XP051065078, Retrieved from the Internet: URL: http://www.3gpp.org/ftp/tsg_ran/WG2_RL2/.

"3rd Generation Partnership Project; Technical Specification Group Services and System Aspects; Functional stage 2 description of Location Services (LCS) (Release 13)", 3GPP Draft; 23271-D00_From_C10_CRS_Implemented, 3rd Generation Partnership Project (3GPP), Mobile Competence Centre; 650, Route Des Lucioles; F-06921 Sophia-Antipolis Cedex; France, Sep. 17, 2015 (Sep. 17, 2015), pp. 1-172, XP051071773, Retrieved from the Internet: URL: http://www.3gpp.org/ftp/tsg_sa/WG2_Arch/Latest_SA2_Specs/DRAFT_INTERIM/Archive/ [retrieved on.

International Search Report and Written Opinion—PCT/US2017/028458—ISA/EPO—dated Aug. 7, 2017.

* cited by examiner

METHOD AND/OR SYSTEM FOR POSITIONING OF A MOBILE DEVICE

CROSS-REFERENCE TO RELATED APPLICATIONS

This application is a continuation of U.S. patent application Ser. No. 15/273,305, filed Sep. 22, 2016, entitled "Method and/or System For Positioning of a Mobile Device," now U.S. Pat. No. 9,998,856, and which claims the benefit of U.S. Provisional Application No. 62/336,500, entitled "Method and/or System for Positioning" filed May 13, 2016; this application is also related to U.S. patent application Ser. No. 15/975,477, filed May 9, 2018, entitled "Method and/or System For Positioning of a Mobile Device," each of these applications are assigned to the assignee hereof and are expressly incorporated in their entirety herein by reference.

BACKGROUND

Field

Subject matter disclosed herein relates to estimation of a location of a mobile device.

Information

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access, for example, a base station may transmit a positioning reference signal (PRS). A mobile device acquiring PRSs transmitted by different base stations may deliver signal-based measurements to a location server, which may be part of an Evolved Packet Core (EPC), for use in computing a location estimate of the mobile device using observed time difference of arrival (OTDOA) techniques. Alternatively, a mobile device may compute an estimate of its location using OTDOA techniques.

In cellular networks implementing more spectrum efficient and higher bandwidth radio interfaces than LTE (e.g. such as 5G), positioning methods similar to those used for LTE may be defined and deployed (e.g. OTDOA) as well as new positioning methods (e.g. based on new characteristics and signals for a 5G radio interface). The similar and/or new positioning methods may provide performance improvements over those used for 4G—e.g. higher accuracy, reduced latency and/or higher capacity. In order to fully exploit these performance improvements without undue constraint and maximize the benefits to both users and network operators, changes may be needed to location solutions employed by networks (e.g. changes to network architecture, protocols and positioning related procedures). Such changes may be used in both newer 5G (also referred to as Fifth Generation) networks and in legacy 3G (also referred to as 3.0 G) and 4G networks, for example.

SUMMARY

Briefly, one particular implementation is directed to a method of locating a user equipment (UE) at a location server function associated with a radio access network, comprising: exchanging one or more first signaling messages with the UE, the one or more first signaling messages comprising: (i) a location measurement obtained by the UE, the location server function enabled to determine a location estimate for the UE based at least in part on the location measurement; (ii) a request sent to the UE for the location measurement; (iii) assistance data sent to the UE, the assistance data assisting the UE to obtain the location measurement; or (iv) a combination thereof; and exchanging one or more second signaling messages with a location server associated with a core network, the one or more second signaling messages comprising location information for the UE, a request for the location information for the UE, a location configuration for the UE, a request for the location configuration for the UE, a location context for the UE, a request for the location context for the UE, or a combination thereof.

Another particular implementation is directed to a method of supporting location services at a user equipment (UE), comprising exchanging one or more first signaling messages with a location server function associated with a radio access network, the one or more first signaling messages comprising: (i) a first location measurement obtained by the UE, the location server function enabled to determine a an estimate location of the UE based at least in part on the first location measurement; (ii) a request received by the UE for the first location measurement; (iii) first assistance data received by the UE, the first assistance data assisting the UE to obtain the first location measurement; or (iv) a combination thereof; and exchanging one or more second signaling messages with a location server associated with a core network, the one or more second signaling message comprising a second location measurement obtained by the UE, a request received by the UE for the second location measurement, second assistance data received by the UE, the second assistance data assisting the UE to obtain the second location measurement, or a combination thereof.

Another particular implementation is directed to a location server function associated with a radio access network for locating a user equipment (UE), comprising: a communication interface to transmit and receive signaling messages; and one or more processors configured to exchange one or more first signaling messages with the UE through the communication interface, the one or more first signaling messages comprising: (i) a location measurement obtained by the UE, the location server function enabled to determine a location estimate for the UE based at least in part on the location measurement; (ii) a request sent to the UE for the location measurement; (iii) assistance data sent to the UE, the assistance data assisting the UE to obtain the location measurement; or (iv) a combination thereof; and exchange one or more second signaling messages with a location server associated with a core network through the communication interface, the one or more second signaling messages comprising location information for the UE, a request for the location information for the UE, a location configuration for the UE, a request for the location configuration for the UE, a location context for the UE, a request for the location context for the UE, or a combination thereof.

Another particular implementation is directed to a user equipment (UE) to support location services, comprising: a wireless transceiver to transmit signaling messages to and receive signaling messages from a communication network; and one or more processors configured to: exchange one or more first signaling messages with a location server function associated with a radio access network through the wireless transceiver, the one or more first signaling messages comprising: (i) a first location measurement obtained by the UE, the location server function enabled to determine a an estimate location of the UE based at least in part on the first location measurement; (ii) a request received by the UE for the first location measurement; (iii) first assistance data received by the UE, the first assistance data assisting the UE to obtain the first location measurement; or (iv) a combination thereof; and exchange one or more second signaling messages with a location server associated with a core network through the wireless transceiver, the one or more second signaling message comprising a second location measurement obtained by the UE, a request received by the UE for the second location measurement, second assistance data received by the UE, the second assistance data assisting the UE to obtain the second location measurement, or a combination thereof.

Another particular implementation is directed to a non-transitory storage medium comprising computer-readable instructions stored thereon which are executable by one or more processors of a location server function associated with a radio access network for locating a user equipment (UE) to: exchange one or more first signaling messages with the UE, the one or more first signaling messages comprising: (i) a location measurement obtained by the UE, the location server function enabled to determine a location estimate for the UE based at least in part on the location measurement; (ii) a request sent to the UE for the location measurement; (iii) assistance data sent to the UE, the assistance data assisting the UE to obtain the location measurement; or (iv) a combination thereof; and exchange one or more second signaling messages with a location server associated with a core network, the one or more second signaling messages comprising location information for the UE, a request for the location information for the UE, a location configuration for the UE, a request for the location configuration for the UE, a location context for the UE, a request for the location context for the UE, or a combination thereof.

Another particular implementation is directed to a location server function associated with a radio access network for locating a user equipment (UE) comprising: means for exchanging one or more first signaling messages with the UE, the one or more first signaling messages comprising: (i) a location measurement obtained by the UE, the location server function enabled to determine a location estimate for the UE based at least in part on the location measurement; (ii) a request sent to the UE for the location measurement; (iii) assistance data sent to the UE, the assistance data assisting the UE to obtain the location measurement; or (iv) a combination thereof; and means for exchanging one or more second signaling messages with a location server associated with a core network, the one or more second signaling messages comprising location information for the UE, a request for the location information for the UE, a location configuration for the UE, a request for the location configuration for the UE, a location context for the UE, a request for the location context for the UE, or a combination thereof.

Another particular implementation is directed to a non-transitory storage medium comprising computer-readable instructions stored thereon which are executable by one or more processors of method of at a user equipment (UE) supporting location services to: exchange one or more first signaling messages with a location server function associated with a radio access network, the one or more first signaling messages comprising: (i) a first location measurement obtained by the UE, the location server function enabled to determine an estimate location of the UE based at least in part on the first location measurement; (ii) a request received by the UE for the first location measurement; (iii) first assistance data received by the UE, the first assistance data assisting the UE to obtain the first location measurement; or (iv) a combination thereof; and exchange one or more second signaling messages with a location server associated with a core network, the one or more second signaling message comprising a second location measurement obtained by the UE, a request received by the UE for the second location measurement, second assistance data received by the UE, the second assistance data assisting the UE to obtain the second location measurement, or a combination thereof.

Another particular implementation is directed to a user equipment (UE) supporting location services comprising: means for exchanging one or more first signaling messages with a location server function associated with a radio access network, the one or more first signaling messages comprising: (i) a first location measurement obtained by the UE, the location server function enabled to determine an estimate location of the UE based at least in part on the first location measurement; (ii) a request received by the UE for the first location measurement; (iii) first assistance data received by the UE, the first assistance data assisting the UE to obtain the first location measurement; or (iv) a combination thereof; and means for exchanging one or more second signaling messages with a location server associated with a core network, the one or more second signaling message comprising a second location measurement obtained by the UE, a request received by the UE for the second location measurement, second assistance data received by the UE, the second assistance data assisting the UE to obtain the second location measurement, or a combination thereof.

Another particular implementation is directed to a method of locating a user equipment (UE) at a location server associated with a core network, comprising: exchanging one or more first signaling messages with the UE, the one or more first signaling messages comprising a location measurement received obtained by the UE, a request sent to the UE for the location measurement, assistance data sent to the UE, the assistance data assisting the UE to obtain the location measurement, or a combination thereof; and exchanging one or more second signaling messages with a location server function associated with a radio access network, one or more second signaling message comprising location information for the UE, a request for the location information for the UE, a location configuration for the UE, a request for the location configuration for the UE, a location context for the UE, a request for the location context for the UE, or a combination thereof.

Another particular implementation is directed to a location server associated with a core network for locating a user equipment (UE), comprising: a communication interface; and one or more processors to: exchange one or more first signaling messages through the communication interface with the UE, the one or more first signaling messages comprising a location measurement received obtained by the UE, a request sent to the UE for the location measurement, assistance data sent to the UE, the assistance data assisting the UE to obtain the location measurement, or a combination thereof; and exchange one or more second signaling messages through the communication interface with a location server function associated with a radio access network, one or more second signaling message comprising location information for the UE, a request for the location information for the UE, a location configuration for the UE, a request for the location configuration for the UE, a location context for the UE, a request for the location context for the UE, or a combination thereof.

Another particular implementation is directed to a non-transitory storage medium comprising computer-readable instructions stored thereon which are executable by one or more processors of a location server associated with a core network for locating a user equipment (UE) to: exchange one or more first signaling messages with the UE, the one or more first signaling messages comprising a location measurement received obtained by the UE, a request sent to the UE for the location measurement, assistance data sent to the UE, the assistance data assisting the UE to obtain the location measurement, or a combination thereof; and exchange a plurality of one or more second signaling messages with a location server function associated with a radio access network, one or more second signaling message comprising location information for the UE, a request for the location information for the UE, a location configuration for the UE, a request for the location configuration for the UE, a location context for the UE, a request for the location context for the UE, or a combination thereof.

Another particular implementation is directed to a location server associated with a core network for locating a user equipment (UE), comprising: means for exchanging a one or more first signaling messages with the UE, the one or more first signaling messages comprising a location measurement received obtained by the UE, a request sent to the UE for the location measurement, assistance data sent to the UE, the assistance data assisting the UE to obtain the location measurement, or a combination thereof; and means for exchanging a plurality of one or more second signaling messages with a location server function associated with a radio access network, one or more second signaling message comprising location information for the UE, a request for the location information for the UE, a location configuration for the UE, a request for the location configuration for the UE, a location context for the UE, a request for the location context for the UE, or a combination thereof.

It should be understood that the aforementioned implementations are merely example implementations, and that claimed subject matter is not necessarily limited to any particular aspect of these example implementations.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
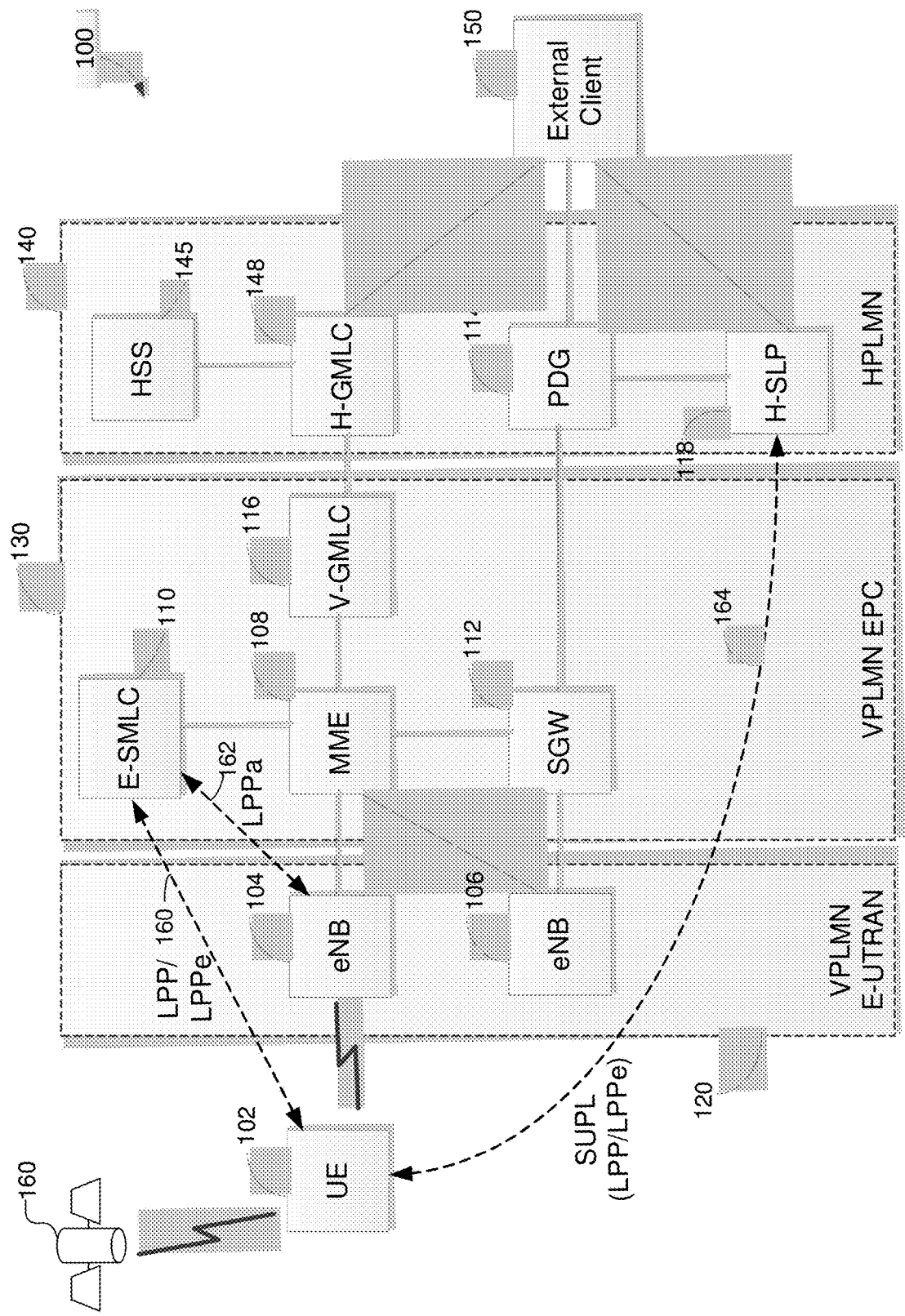
FIG. 1 is a system diagram illustrating certain features of a system comprising a mobile device and a 4G network, in accordance with an example implementation.

Reference is made in the following detailed description to accompanying drawings, which form a part hereof, wherein like numerals may designate like parts throughout that are identical, similar and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

A mobile device may be referred to as a device, user equipment (UE), wireless device, mobile terminal, wireless terminal, terminal, mobile station (MS), Secure User Plane Location (SUPL) Enabled Terminal (SET) or by some other name. A mobile device (referred to synonymously herein as a UE) may be, or may be part of, a cellphone, smartphone, tablet, laptop, wearable, tracking device, in vehicle communication system (IVS), Drone, Robot, Internet of Things (IoT) device or any other movable entity for which wireless communication is needed or usable. An estimated location of a mobile device may be useful or essential for certain applications such as emergency calls, navigation, tracking, direction finding, Internet services, autonomous movement (e.g. by a vehicle, drone or robot), augmented reality, virtual reality.

A location of a mobile device may be defined in geodetic terms (e.g. using X, Y and possibly Z Cartesian coordinates or using latitude, longitude and possibly altitude) and/or in civic terms (e.g. via a postal address, street address, well known landmark, building related designation). A location may further be expressed in absolute terms (e.g. using latitude and longitude) or relative (e.g. by providing a distance and bearing to another defined location). A location may also include an orientation of the mobile device and may also be accompanied by (or sometimes replaced by) a velocity (e.g. speed and direction) of the mobile device. An estimated location may be accompanied by a level of certainty or uncertainty for the location—e.g. by providing an area or volume within which the mobile is expected to be located with a certain confidence (e.g., 67%) and/or by providing an expected or maximum error for the estimated location (e.g. such as indicating a maximum error of 100 meters with a 67% confidence level for a location).

A "location" may also be referred to herein as a location estimate, position, position estimate, position fix, location fix, fix or by some other name. A location may be highly accurate (e.g., with an error less than 1.0 meter) which may be needed or useful for location of a mobile device indoors or when associated with or part of a vehicle, drone or robot. A location may also be less accurate (e.g., with an error of 200 to 1000 meters) which may be adequate to determine in which city or town and/or in which part of a city or town a mobile device is located, which may suffice for some Internet services and for coarse tracking.

The term "downlink" as used herein refers to a direction of transfer from a network, fixed transmitter or other component of an infrastructure (e.g. satellite system) to a mobile device. Thus, for example, a downlink signal is transmitted from a network, fixed transmitter or satellite to a mobile device. The term "uplink" as used herein refers to a direction of transfer from a mobile device to a network, fixed receiver, transceiver or other component of an infrastructure (e.g. satellite system). Thus, for example, an uplink signal is transmitted from a mobile device to a network, fixed transceiver or a satellite. The term "sidelink" as used herein refers to a direction of transfer from a mobile device to another mobile device or to some other peer entity (e.g. a wearable or WPAN controller). Thus, for example, a sidelink signal is transmitted from a mobile device to another mobile device or peer entity like a wearable or WPAN controller. The terms downlink, uplink and sidelink can also be used to distinguish different types of positioning operations and methods to locate a mobile device as described later herein.

Techniques for positioning operations have included use of downlink positioning methods in which a mobile device acquires and measures downlink signals transmitted from some fixed or mobile entity associated with a network or a positioning system. One class of downlink positioning makes use of a satellite positioning system (SPS). Examples of an SPS include GPS and other like global navigation satellite systems (GNSSs) such as GLONASS, Galileo and Beidou. Here, a receiver may estimate its location at a point on (or above or possibly below) the Earth based, at least in part, on acquisition and measurement of signals transmitted from multiple satellite-based transmitters in a GNSS constellation. In certain conditions or implementations, positioning operations based on acquisition and measurement of signals from GNSS transmitters may not be feasible such as in urban or indoor environments or for mobile devices that do not have receivers capable of acquiring and measuring signals transmitted from GNSS transmitters. GPS and GNSS based location may be highly accurate when used outdoors (e.g. with an accuracy as good as 10 meters) and may be able to attain sub-meter accuracy when used in carrier-phase mode—e.g. with real time kinematics (RTK).

In certain scenarios, a cellular carrier may enable downlink positioning at a mobile device based on acquisition and measurement of signals transmitted by a terrestrial transmitter (e.g., at a cellular base station or WiFi access point). For example, a carrier may enable positioning operations based on acquisition and measurement of signals transmitted by a terrestrial transmitter using techniques such as advanced forward trilateration (AFLT), observed time difference of arrival (OTDOA) and enhanced cell ID (ECID). Here, signals transmitted by terrestrial transmitters and acquired and measured by a mobile device for use in positioning operations may comprise terrestrial positioning signals. In this context, a "terrestrial positioning signal" (TPS) comprises a signal that may be acquired by a mobile device and that has one or more characteristics that may be measured by the mobile device. A TPS may correspond to the physical layer of a radio interface (e.g. "layer 1" or "level 1") and may comprise a particular component, portion, subset, signal and/or set of signals transmitted as part of the physical layer. The acquisition and measurement by the mobile device of a TPS may involve coherent or non-coherent integration of the TPS over time (e.g. over a period of 20 ms to 100 ms)—e.g. in the case that a TPS has a signal strength below the noise floor. Characteristics of a TPS that may be measured may include a received signal strength indication (RSSI), a time of arrival (TOA), a signal to noise ratio (S/N), an angle of arrival (AOA), a round trip signal propagation time (RTT), a reference signal received power (RSRP), a reference signal received quality (RSRQ), and a reference signal time difference (RSTD).

The term "positioning reference signal" (PRS), as used herein, denotes a terrestrial signal that has been defined and/or implemented specifically to support positioning. The term "terrestrial positioning signal" (TPS), as used herein, includes any terrestrial signal that can be measured to support location of a mobile device. A TPS may be used for other—e.g. to assist network access by a mobile device, assist network operation, convey control information, convey voice or data. A TPS may be (though need not be) a PRS. A PRS, by contrast, is always a TPS. To assist readability, a TPS and a PRS are sometimes referred to herein as a "TPS signal" and a "PRS signal", respectively, even though, strictly speaking, the word "signal" in such a usage is redundant.

According to specifications from the $3^{rd}$ Generation Partnership Project (3GPP), networks supporting 4G Long Term Evolution (LTE) may employ a TPS that comprises a PRS, defined according to 3GPP technical specification (TS) 36.211, for use in OTDOA. A PRS used to assist OTDOA in the case of LTE access may also be highly accurate when transmitters (e.g. base stations) are precisely time synchronized (e.g. GPS synchronized) and may achieve an accuracy of 10-50 meters in both outdoor and indoor environments. A TPS or PRS signaling may sometimes be referred to as being transmitted at a level 1, a layer 1 (e.g. a 5G layer 1) or at a physical level or in a physical layer because a TPS or PRS signal is typically defined (e.g. in the case of 3GPP) as part of the physical level or bottom most (layer 1) of a radio interface.

A TPS may be transmitted by a transmission point (TP) which may be a terrestrial transmitter such a base station (BS), evolved NodeB (eNodeB or eNB), a TP for a terrestrial beacon system (TBS), an access point (AP) or other transmitter. The term transmission point (TP), as used herein, represents any kind of terrestrial transmitter that may be used for downlink positioning including a cellular base station (BS), a home BS, a femtocell and a WiFi access point (AP). The term transmission beacon (TB), as used herein, refers to any terrestrial transmitter that transmits a TPS but is not used to support uplink communication from mobile devices. A TP may thus be a transceiver (e.g. a cellular base station) or may be a TB capable only of transmitting. The class of TBs is thus a subset of the class of TPs. The term base station (BS) is also used herein in a generic sense to refer to a cellular base station, a small cell, an access point, femtocell or picocell that supports wireless access from one or more devices involving two way radio transmission which may be full duplex though may also be half duplex.

In a particular implementation, a TPS may occupy a dedicated portion of the spectrum of a downlink signal transmitted by a TP. The dedicated portion of spectrum used by a TPS may comprise a particular frequency or frequencies, a particular bandwidth and/or particular transmission times (e.g., timeslots, frames or subframes) which may be fixed or may vary over time (e.g., via frequency hopping and/or via periodic rescheduling of transmission times). A TP (e.g., by transmitting broadcast information) or a server on the network side (e.g., by sending assistance data) may provide a mobile device with characteristics of a PRS or TPS including the dedicated portion of spectrum being used (e.g., frequency or frequencies, bandwidth and/or transmission times), the TPS signal coding, approximate expected TOA or RSTD at the mobile device for the TPS and/or any muting of the TPS in order to assist the mobile device to accurately, reliably and efficiently acquire and measure the PRS or TPS. In the case of a future 5G radio interface, TPS and/or PRS signals may be defined and used to support measurements of RSSI, S/N, RTT, AOA, RSRP, RSRQ, RSTD and/or other signal characteristics for the 5G radio interface, which may be used to determine or help determine the location of a mobile device.

Positioning of a UE may also be supported using sensors attached to, embedded within or otherwise accessible from a UE including inertial sensors and/or other environmental sensors. Inertial sensors may include an accelerometer, magnetometer, gyroscope and/or compass. Environmental sensors may include a thermometer, barometer, microphone, camera and/or hygrometer. Inertial sensors may be able to detect and measure changes in motion of a UE (e.g. a change of speed and/or direction), while environmental sensors may be able to measure altitude (e.g. via barometric pressure) and/or characteristics of a local environment that may help determine a UE location. A UE may provide measurements obtained from sensors and/or location related information obtained from such measurements (e.g. a current altitude, current speed or recent change in location) to a location server to assist the location server in determining a current UE location. A location server may also provide assistance data to a UE to help calibrate or make use of some sensors—such as providing a known atmospheric pressure at some known reference location nearby to a UE to assist the UE in determining a current altitude from a measured atmospheric pressure at the current location of the UE.

Positioning of a UE can be supported by a number of uplink terrestrial position methods, also referred to as "network based" position methods, in which a base station (e.g., eNodeB), access point (AP) (e.g., IEEE 802.11 AP) or a location measurement unit (LMU) acquires and measures an uplink signal (e.g., TPS) transmitted by a UE. The uplink signal may have properties similar to or the same as a downlink TPS or PRS or may simply be any signal transmitted by a UE for other purposes such as sending control information, voice or data to a network (or possibly some remote entity). Characteristics of an uplink signal that may be measured can be similar to or the same as characteristics of a downlink signal and may include RSSI, S/N, TOA, RTT, RSRP, RSRQ, AOA. Uplink position methods may include measurements of uplink time difference of arrival (UT-DOA), which may be based on measuring TOA and enhanced cell ID (ECID). Measurements of TOA and ECID may be further based on measuring other characteristics such as RSSI, RTT, S/N, RSRP, RSRQ and AOA.

In other embodiments, a UE may determine or obtain measurements to estimate a location of the UE based, at least in part, on signals transmitted between the UE and other peer device such as other UEs. Position methods based on signals transmitted between a UE and a peer device may be referred to as sidelink position methods and the measured signals as sidelink signals. For example, measurements of signal strength and/or round-trip time of signals transmitted between or among peer UE devices may be used for computation of a range (e.g., straight line distance) between or among the UE devices. Such measurements of range between or among peer UE devices may be used to estimate, or help estimate, a relative or absolute location of at least one of the UE devices. Signals that are exchanged between or among UEs and other peer devices, and measured to support or help support UE location may include signals transmitted according to Bluetooth®, Bluetooth Low Energy (BTLE), IEEE 802.11 WiFi, LTE Direct (LTE-D), WiFi Direct (WiFi-D), LTE unlicensed (LTE-U) and/or one or more future 5G radio interfaces, just to provide a few examples.

To support positioning of a mobile device, two broad classes of location solution have been defined: control plane and user plane. With control plane (CP) location, signaling related to positioning and support of positioning may be carried over existing network (and mobile device) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP). Control plane solutions can support all three types of positioning referred to previously as downlink, uplink and sidelink positioning. User plane solutions may support only downlink position methods, though uplink and sidelink position methods may be supported with some extensions—e.g. by treating one UE as a location server in the case of user plane location between a pair of UEs.

3GPP has defined control plane location solutions for mobile devices that use radio access according to Global System for Mobile communications GSM (2G), Universal Mobile Telecommunications System (UMTS) (3G) and LTE (4G). A control plane solution for future 5G access may be defined in future. These solutions are defined in 3GPP TSs 23.271 (common part), 43.059 (GSM access), 25.305 (UMTS access) and 36.305 (LTE access). The Open Mobile Alliance (OMA) has similarly defined a UP location solution known as Secure User Plane Location (SUPL) which can be used to locate a mobile device accessing any of a number of radio interfaces that support IP packet access such as General Packet Radio Service (GPRS) with GSM, GPRS with UMTS, or IP access with LTE.

Both CP and UP location solutions may employ a location server (LS) to support positioning. The LS may be part of or accessible from a serving network or a home network for a UE or may simply be accessible over the Internet or over a local Intranet. If positioning of a UE is needed, an LS may instigate a session (e.g. a location session or a SUPL session) with the UE and coordinate location measurements by the UE and determination of an estimated location of the UE. During a location session, an LS may request positioning capabilities of the UE (or the UE may provide them without a request), may provide assistance data to the UE (e.g. if requested by the UE or in the absence of a request) and may request a location estimate or location measurements from a UE (e.g. for the GNSS, OTDOA and/or ECID position methods). Assistance data may be used by a UE to acquire and measure GNSS, TPS and/or PRS signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or TP locations and other TP characteristics such as TPS or PRS timing in the case of terrestrial positioning).

In an alternative UE assisted mode of operation, a UE may return location measurements to an LS which may determine an estimated location of the UE based on these measurements in addition to other known or configured data (e.g. satellite ephemeris data for GNSS location or TP characteristics including TP locations and possibly TPS/PRS timing in the case of terrestrial positioning).

In another standalone mode of operation, a UE may make location related measurements without any assistance data from an LS and may further compute a location or a change in location without any assistance data from an LS. Position methods that may be used in a standalone mode include GPS and GNSS (e.g. if a UE obtains satellite orbital data from data broadcast by GPS and GNSS satellites themselves) as well as sensors.

In the case of 3GPP CP location, an LS may be an enhanced serving mobile location center (E-SMLC) in the case of LTE access, a standalone SMLC (SAS) in the case of UMTS access or a serving mobile location center (SMLC) in the case of GSM access. In the case of OMA SUPL location, an LS may be a SUPL Location Platform (SLP) which may act as any of: (i) a home SLP (H-SLP) while in or associated with the home network of a UE or while providing a permanent subscription to a UE for location services; (ii) a discovered SLP (D-SLP) while in or associated with some other (non-home) network or while not associated with any network; (iii) an Emergency SLP (E-SLP) while supporting location for an emergency call instigated by the UE; or (iv) a visited SLP (V-SLP) while in or associated with a serving network or a current local area for a UE.

An entity that is "associated with" a network, as described herein, may be physically part of the network, directly connected to one or more entities within the network, or may be accessible from the network and belong to the operator or owner of the network During a location session, an LS and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE access, in which case LPP or LPP/LPPe messages are exchanged between a UE and E-SMLC. LPP or LPPa messages may be exchanged between a UE and E=SMLC via a serving Mobility Management Entity (MME) and a serving eNodeB for the UE. LPP and LPP/LPPe may also be used to help support the OMA SUPL solution for many types of wireless access that support IP messaging (such as LTE and WiFi) where LPP or LPP/LPPe messages are exchanged between a SET (the term used for a UE with SUPL) and an SLP, which may be transported within SUPL messages such as a SUPL POS or SUPL POS INIT message According to an embodiment, both LPP and LPPe (and LPP/LPPe) may support the types of messages shown in Table 1 which may be valid for use with both CP and UP location solutions. The different columns in Table 1 show the message name, allowed direction of transfer for each message and a purpose of each message. In the case of LPPe, a "reversed mode" is supported that allows an LS and UE to swap their normal roles and transfer the two Capabilities and two Location Information messages in the opposite direction to that indicated in Table 1.

TABLE 1

| Message Name | Direction | Purpose |
| --- | --- | --- |
| Request Capabilities | LS to UE | LS requests UE positioning capabilities |
| Provide Capabilities | UE to LS | UE provides its positioning capabilities |
| Request Assistance Data | UE to LS | UE requests assistance data for UE assisted and/or UE based location |
| Provide Assistance Data | LS to UE | LS provides assistance data for UE assisted and/or UE based location |
| Request Location Information | LS to UE | LS requests location measurements or a location estimate from a UE |
| Provide Location Information | UE to LS | UE provides location measurements or a location estimate to an LS |
| Error | Both | UE or LS indicates a protocol or procedural error |
| Abort | Both | UE or LS aborts a location session |

FIG. 1 exemplifies a system 100 capable of supporting location of a UE 102 that has LTE access. System 100 may support both control plane location according to the 3GPP CP location solution defined in 3GPP TSs 23.271 and 36.305, and user plane location according to any of the OMA SUPL solutions defined in OMA TSs OMA-TS-ULP-V2_0_3, OMA-TS-ULP-V2_1 and OMA-TS-ULP-V3_0. However, actual systems may only include support for one of these (CP or UP location), or neither. System 100 is illustrative of features capable of supporting operations for determining location estimates in 4G networks but not necessarily 5G networks.

According to an embodiment, system 100 may be referred to as an Evolved Packet System (EPS). As illustrated, system 100 may include a UE 102, an Evolved UMTS Terrestrial Radio Access Network (E-UTRAN) 120, and an Evolved Packet Core (EPC) 130. The E-UTRAN 120 and the EPC 130 may be part of a Visited Public Land Mobile Network (VPLMN) capable of communicating with a Home Public Land Mobile Network (HPLMN) 140 for the UE 102.

System 100 may interconnect with other networks. For example, the Internet may be used to carry messages to and from different networks such as the HPLMN 140 and the VPLMN EPC 130. For simplicity those other networks are not shown in FIG. 1. As shown, system 100 may provide packet-switched services, however, as those skilled in the art will readily appreciate, the various concepts and features presented throughout this disclosure may be extended to networks providing circuit-switched services.

UE 102 may comprise any electronic device configured for LTE radio access. UE 102 may be referred to as a mobile device or by other names, as previously discussed, and may correspond to (or be part of) a smart watch, digital glasses, and fitness monitor, smart cars, smart appliances, cellphone, smartphone, laptop, tablet, PDA, IoT device, tracking device, control device, or some other portable or moveable device. The UE 102 may comprise a single entity or may comprise multiple entities such as in a personal area network where a user may employ audio, video and/or data I/O devices and/or body sensors and a separate wireline or wireless modem. Typically, though not necessarily, the UE 102 may support wireless communication such as using GSM, Code Division Multiple Access (CDMA), Wideband CDMA (WCDMA), LTE, High Rate Packet Data (HRPD), IEEE 802.11 WiFi, Bluetooth (BT), WiMax, etc. UE 102 may also support wireless communication using a wireless LAN (WLAN), Digital Subscriber Line (DSL) or packet cable for example. Although FIG. 1 shows only one UE 102, system 100 may include having features of UE 102 as described herein.

The UE 102 may enter a connected state with a wireless communication network that may include the E-UTRAN 120. In one example, UE 102 may communicate with a cellular communication network by transmitting wireless signals to, or receiving wireless signals from, a cellular transceiver, such as a serving evolved Node B (eNB) 104 in the E-UTRAN 120. The E-UTRAN 120 may include one or more additional eNBs 106. The eNB 104 may provide user and control plane protocol terminations toward the UE 102. The eNB 104 may also be referred to as a base station, a base transceiver station, a radio base station, a radio transceiver, a radio network controller, a transceiver function, a base station subsystem (BSS), an extended service set (ESS), or by some other suitable terminology. The UE 102 also may transmit wireless signals to, or receive wireless signals from, a local transceiver, such as an access points (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth network) or a cellular network (e.g. an LTE network or other wireless wide area network). Of course it should be understood that these are merely examples of networks that may communicate with a mobile device over a wireless link, and claimed subject matter is not limited in this respect.

Examples of radio access technologies that may support wireless communication include Narrow Band Internet of Things (NB-IoT), Global System for Mobile Communications (GSM), Code Division Multiple Access (CDMA), Wideband CDMA (WCDMA), Long Term Evolution LTE), High Rate Packet Data (HRPD). NB-IoT, GSM, WCDMA and LTE are technologies defined by 3GPP. CDMA and HRPD are technologies defined by the 3rd Generation Partnership Project 2 (3GPP2). WCDMA is also part of the Universal Mobile Telecommunications System (UMTS) defined by 3GPP. Cellular transceivers, such as eNBs 104, 106, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

The eNBs 104, 106 are connected by an interface to the VPLMN EPC 130. EPC 130 includes a Mobility Management Entity (MME) 108, and a Serving Gateway (SGW) 112, through which IP packets are transferred to and from the UE 102. The MME 108 may comprise a serving MME for UE 102 and provide a control node that processes the signaling between the UE 102 and the EPC 130, and supports attachment and network connection of UE 102. MME 108 may also establish and release data bearers on behalf of the UE 102. In an implementation, MME 108 may provide bearer and connection management for the UE 102, and may be connected to the SGW 112, the eNBs 104 and 106, the E-SMLC 110 and a Visited Gateway Mobile Location Center (V-GMLC) 116 in the VPLMN EPC 130.

E-SMLC 110 may support determining an estimated location of the UE 102 using the 3GPP control plane (CP) location solution as previously described. V-GMLC 116, which may also be referred to simply as a Gateway Mobile Location Center (GMLC) 116, may provide access on behalf of an external client (e.g. external client 150) or another network (e.g. HPLMN 140) to the location of UE 102.

As illustrated, HPLMN 140 may include (i) a Home Gateway Mobile Location Center (H-GMLC) 148 that may be connected to the V-GMLC 116 (e.g. via the Internet), and (ii) a Packet Data Network Gateway (PDG) 114 that may be connected to the SGW 112 (e.g. via the Internet). PDG 114 may provide UE 102 with IP address allocation and IP and other data access to external networks (e.g., the Internet), external clients (e.g. external client 150) and external servers, as well as other data transfer related functions. In some implementations, PDG 114 may be located in VPLMN EPC 130 and not in HPLMN 140 when the UE 102 receives local IP breakout. MME 108 and PDG 114 may be connected to location servers, such as E-SMLC 110 and H-SLP 118, respectively. H-SLP 118 may support the SUPL UP location solution as previously described and may comprise an H-SLP for UE 102. In the case that PDG 114 is located in VPLMN EPC 130 with local IP breakout, H-SLP 118 may be replaced by a D-SLP or E-SLP that is connected to PDG 114. H-GMLC 148 may be connected to the Home Subscriber Server (HSS) 145, which may comprise a central database containing user-related and subscription-related information for UE 102. H-GMLC 148 may provide location access to the UE 102 for external clients such as external client 150. One or more of the H-GMLC 148, PDG 114, and H-SLP 118 may be connected to the external client 150, e.g., through another network, such as the Internet.

In some cases, a Requesting GMLC (R-GMLC) located in another PLMN (not shown in FIG. 1) may be connected to H-GMLC 148 (e.g. via the Internet) in order to provide location access to UE 102 on behalf of external clients connected to the R-GMLC. The R-GMLC, H-GMLC 148 and V-GMLC 116 may support location access to the UE 102 using the 3GPP CP location solution for LTE access that was mentioned previously.

It should be understood that while a VPLMN network (comprising VPLMN E-UTRAN 120 and VPLMN EPC 130) and a separate HPLMN 140 are illustrated in FIG. 1, both PLMNs (networks) may comprise the same PLMN. This may occur while the UE 102 receives wireless access from its home PLMN and is not roaming in some other VPLMN. In that case, (i) H-SLP 118, PDG 114, and HSS 145, may be in the same network (EPC) as the MME 108, E-SMLC 110 and SGW 112, and (ii) the V-GMLC 116 and the H-GMLC 148 may comprise the same GMLC.

In particular implementations, UE 102 may have circuitry and processing resources capable of supporting downlink positioning, uplink positioning, sidelink positioning and/or location using sensors as previously described. In addition, in the case of downlink positioning, UE 102 may support one or more position methods that may be used in UE assisted, UE based and/or standalone modes. UE 102 may be further capable of supporting location estimation according to the 3GPP CP location solution for LTE access and/or the SUPL UP location solution. Furthermore, UE 102 may support the LPP, LPPe and/or combined LPP/LPPe positioning protocols.

As non-limiting examples of positioning support, UE 102 may support location related measurements using downlink signals from GPS or other GNSS satellite vehicles (SVs) 160 and/or downlink signals from cellular transceivers such as eNBs 104, 106, and may support computing an estimated location of UE 102 based on these location related measurements (e.g., for UE based mode). In some implementations, location related measurements obtained by UE 102 may be transferred to an LS, such as E-SMLC 110 or H-SLP 118, for UE assisted mode after which the LS may estimate a location for UE 102 based on the location related measurements.

Location related measurements obtained by UE 102 may include pseudorange measurements of signals received from SVs 160. The pseudorange measurements may comprise measurements of the code phase of a navigation signal transmitted by an SV 160. In addition or as an alternative, UE 102 may measure a carrier phase for a navigation signal transmitted by an SV 160 which may enable very precise location (e.g. centimeter level accuracy) using RTK. UE 102 may also or instead obtain measurements of RSSI, RTT, S/N, RSRP, RSRQ, AOA and/or RSTD for TPS signals received from eNBs 104 and 106 and/or other base stations and APs not shown in FIG. 1. UE 102 or the LS (e.g. E-SMLC 110 or H-SLP 118) may then obtain a location estimate for UE 102 based on these location related measurements using any one of several position methods such as, for example, GNSS, Assisted GNSS (A-GNSS), RTK, AFLT, OTDOA, E-CID or combinations thereof. In some of these techniques (e.g. A-GNSS, AFLT and OTDOA), pseudoranges or timing differences (e.g. RSTDs) may be measured by UE 102 relative to three or more terrestrial TPs fixed at known locations or relative to four or more satellites with accurately known orbital data, or combinations thereof, based at least in part, on pilots, TPS signals, PRS signals (or other positioning related signals) transmitted by the TPs or satellites and received at the UE 102. Here, location servers, such as E-SMLC 110 or H-SLP 118, may be capable of providing positioning assistance data to UE 102 including, for example, information regarding signals to be measured (e.g., expected signal timing, signal coding, signal frequencies, signal Doppler), locations and identities of terrestrial TPs and/or signal, timing and orbital information for GNSS satellites to facilitate positioning techniques such as A-GNSS, AFLT, OTDOA and E-CID. Such facilitation of positioning techniques such as A-GNSS, AFLT, OTDOA and E-CID may include improving signal acquisition and measurement accuracy by UE 102 and, in some cases, enabling UE 102 to compute its estimated location based on the location measurements. For example, location servers may comprise an almanac which indicates locations and identities of cellular transceivers (e.g. eNBs 104 and 106) and/or local transceivers in a particular region or regions such as a particular venue, and may provide information descriptive of signals transmitted by a cellular base station or AP such as transmission power and signal timing.

In order to coordinate location of UE 102 using the 3GPP control plane location solution with downlink positioning, UE 102 and E-SMLC 110 may exchange LPP or LPP/LPPe messages 160. LPP or LPP/LPPe messages 160 may be transferred between UE 102 and E-SMLC 110 via serving eNB 104 and serving MME 108. LPP or LPP/LPPe messages may include the types of messages shown in Table 1. For example, an LPP or LPP/LPPe Provide Location message may be used by UE 102 to send downlink location related measurements to E-SMLC 110.

In order to coordinate location of UE 102 using the 3GPP control plane location solution with uplink positioning, E-SMLC 110 may exchange LPPa annex (LPPa) messages 162 with serving eNB 104. LPPa and LPPa messages 162 may be defined according to 3GPP TS 36.455. LPPa messages 162 may be transferred between eNB 104 and E-SMLC 110 via serving MME 108. For example, E-SMLC 110 may send an LPPa message to eNB 104 to request uplink location measurements by eNB 104 of TPS signals transmitted by UE 102, such as measurements of RSSI, RSRP, RSRQ, AOA, S/N, and AOA. eNB 104 may then obtain and returned the requested measurements to E-SMLC 110 by sending another LPPa message to E-SMLC 110 via serving MME 108. E-SMLC 110 may also send an LPPa message to serving eNB 104 to request current configuration information for eNB 104 such as the precise location of an antenna for eNB 104 and/or timing information for TPS signals transmitted by eNB 104. In the case that eNB 104 manages more than one cell (e.g. manages a number of cell sectors, remote radio heads (RRHs) and/or remote TBs), E-SMLC may request configuration information (e.g. antenna location and TPS timing) for each cell, each RRH and/or each remote TB that eNB 104 manages. eNB 104 may then return the requested information in one or more LPPa messages back to E-SMLC 110.

In order to coordinate location of UE 102 using the OMA SUPL UP location solution, UE 102 and H-SLP 118 may exchange SUPL UserPlane Location Protocol (ULP) messages 164 as defined in OMA-TS-ULP-V2_0_3, OMA-TS-ULP-V2_1 or OMA-TS-ULP-V3_0. One or more of the exchanged SUPL ULP messages 164 may further include one or more embedded LPP or LPP/LPPe messages. SUPL ULP messages 164 may be transferred between UE 102 and H-SLP 118 using UDP/IP or TCP/IP via serving eNB 104, SGW 112 and PDG 114. LPP or LPP/LPPe messages that are embedded in SUPL ULP messages 164 may include the types of messages shown in Table 1. For example, an LPP or LPP/LPPe Provide Location message (embedded in one of the SUPL ULP messages 164) may be used by UE 102 to send downlink location related measurements to H-SLP 118.

FIG. 1 is illustrative of location support in a 4G wireless system such as an LTE network (also known as an EPS). To support estimating a location of a UE 102 in a 5G wireless system, it may be desirable to support some or all of the location features for a 4G system and some additional features that may not be supported in a 4G system. Table 2 shows a set of possible location features that may be applicable to a 5G system for a number of different categories of features.

TABLE 2

| Feature Category | Location Features applicable to 5G |
|---|---|
| Positioning services | Positioning may be available to all services, clients and applications. |
| Positioning Methods | Positioning methods may use downlink, uplink and/or sidelink signals. |
| TPS and PRS | TPS and PRS signals may be optimized for positioning measurements (e.g. RSSI, RSTD, AGA, TOA, RTT etc.).<br>Interference to TPS signals from other TPS signals and/or from other non-TPS signals may be reduced via (i) periodic muting of potentially interfering signals; (ii) separation of TPS signals from other TPS signals and/or from other signals in the frequency, code, time and/or spatial domains; and/or (iii) interference cancellation techniques. |
| TPs | TPs may be synchronized to some common time (e.g. GPS time) or unsynchronized. |
| Broadcast | Assistance data may be provided to UEs via broadcast from TPs as well as (or instead of) from an LS.<br>Broadcast of assistance data to UEs may be unciphered and available to all UEs and/or may be ciphered and available only to authenticated and subscribed UEs. |

To support positioning in a 5G system using radio signals defined for 5G, the same or similar TPS signals could in principle be used as in 4G systems. Since the 5G radio interface, referred to as the "New Radio" (NR) in the case of 3GPP, may differ (possibly significantly) from LTE as used for 4G in order to achieve higher data and signaling rates, greater spectrum efficiency, higher capacity and lower latency, TPS signals in 5G may differ also from TPS signals for 4G. Table 3 shows a number of possible characteristics for a 5G TPS (or for different 5G TPSs) and for their associated TPs that may be desirable for a 5G system to improve location estimation support (e.g. enable more accurate and reliable location estimation, lower latency, higher capacity, greater efficiency and/or reduced complexity and cost).

TABLE 3

| Characteristic | Description |
|---|---|
| Scheduling | Downlink and possibly uplink TPS signals may be scheduled to reduce bandwidth usage such that a TPS signal is transmitted at only certain times that may be made known in advance to a UE in the case of downlink signals (e.g. via assistance data from an LS or assistance broadcast from a TP).<br>The scheduling of a downlink TPS may be varied such that a TPS is only transmitted while UEs in the coverage area of the TPS need to or may need to measure the TPS.<br>Scheduling of a TPS may reduce bandwidth usage by avoiding transmission of a TPS at times when it need not be measured. |
| Spatial Confinement | A downlink TPS may be spatially confined via transmission in certain cells and/or via directional transmission (e.g. using an antenna array).<br>Spatial confinement of a TPS may be used to send a TPS to UEs attempting to measure the TPS and avoid sending the TPS to areas where UEs are not attempting to measure the TPS, which may improve bandwidth usage and reduce interference with respect to the areas to which a TPS is not transmitted. |
| TPS IDs | A TPS (e.g. a PRS) may be encoded using a sequence of symbols that may be defined by one or more parameters such as one or more integers. These parameters may help identify the TPS since they may define its code sequence and may thus be regarded as TPS identifiers (IDs). For example, in the case of a PRS for LTE defined in 3GPP TS 36.211, the PRS code sequence may be defined by a single integer between 0 and 504 or between 0 and 4095 which provide a non-unique PRS ID.<br>A UE may store the IDs and other information associated with a downlink TPS (e.g. an inferred location or an inferred ID for the source TP of a downlink TPS) and use this later to assist location of the UE. A UE may also crowdsource the same TPS information to a server for later download to other UEs to assist location of these UEs when able to receive and measure the same TPS. An operator preferring not to allow use of their TPS signals to assist location of non-authorized UEs may periodically change the TPS ID(s) - e.g. randomly - to attempt to make information stored or crowdsourced by UEs not remain valid for very long. This may be used, for example, for TPS signals transmitted by base stations, remote radio heads and by TBs. |
| Frequencies | TPS signals could use several different frequency bands including licensed and unlicensed bands. |
| Antenna Arrays | A TPS signal may be transmitted in a particular direction or certain set of directions using an antenna array - e.g. an antenna array for multiple-input and multiple-output (MIMO) radio operation. This may improve signal acquisition and measurement accuracy and may enable more accurate measurement of an AOA or angle of departure (AOD).<br>A TP may also rotate a downlink TPS (e.g. over 360 degrees for a circular rotation or a smaller angle for rotation within an arc) via electronic means using an antenna array, which may enable a UE or an LS to determine the direction of the TPS while measured by a UE, which may then be used to infer an AOA or AOD and thence assist location of the UE. |
| TBs | Transmission beacons (TBs) may be used to increase the number of TPs visible to a UE whose TPS signals can be measured. This may assist location in areas where not many TPs are otherwise visible (e.g. inside a building or in a dense urban area).<br>Because TBs may only need to transmit a TPS and may not need to support wireless communications (e.g. may not need to function as a BS or AP), the cost of deploying TBs may be significantly less than the cost of deploying other types of TP which may enable an operator to improve accurate location support for served UEs in a cost effective manner. |
| TP Positioning | A TP or TB may be positioned using other TPs and/or TBs if the TP or TB to be positioned measures TPS signals transmitted by these other TPs and/or TBs, and/or if the other TPs and/or TBs measure TPS signals transmitted by the TP or TB to be positioned. The same or similar position methods may be used as are used to locate a UE (e.g. OTDOA, ECID, UTDOA). Locations of some TPs or TBs may be used initially (e.g. as obtained using surveying or GPS), but the locations of other TPs and TBs may be obtained from these initial locations using measurements of TPS signals. |

In addition to improvements in physical layer support for a new 5G system using measurements of TPS signals transmitted by TPs, location support may be improved at higher layers and in association with aspects of a 5G system other than TPS signals and associated TPs. Possible higher layer features that could improve location support for a 5G system are described in Table 4.

TABLE 4

| Feature | Description |
|---|---|
| Unauthenticated UEs | Location estimation of unauthenticated UEs is not normally supported in 2G, 3G and 4G systems except for unauthenticated UEs that instigate an emergency call.<br>A 5G system might provide some limited or extended support of location for unauthenticated UEs as a free |

TABLE 4-continued

| Feature | Description |
|---|---|
| | service associated with a network. For example, a network associated with a venue (e.g. shopping mall, airport convention center, sports arena, college campus) may provide location support to all UEs (authenticated and unauthenticated) as a means of improving overall service to users within the venue. |
| Multi Tier Architecture | Location support in a 5G network may be tiered into two or more different domains. As an example, a 3-tier architecture could comprise a Radio Access Network (RAN) domain, Core Network (CN) domain and a Device to Device (D2D) domain. The D2D domain may be limited to UE positioning using sidelink TPS signals and may also be referred to as a UE domain. The RAN domain may be limited to use of 5G TPS signals for positioning and possibly other (e.g. GNSS) signals and may involve UEs and RAN elements only (e.g. UEs, BSs and APs). The CN domain may function in a similar manner to location support using an LS for a 4G system, as described for FIG. 1, and may support multiple RANs (e.g. 3G RAN, 4G RAN, 5G RAN and/or other radio access types such as WiFi), make use of one or more LSs in or associated with a CN and may support control plane and/or user plane location solutions. |
| Architecture Domains | The UE, RAN and CN domains may support one another or operate independently and/or autonomously (e.g. when a domain is absent). As an example, some 5G networks could support the RAN domain but not the CN domain and vice versa. |
| Positioning Usage | Location results for UEs (e.g. obtained by a RAN domain or a CN domain) may be used for real time network optimization and to support UE cell selection and handover. |
| Location Services | The CN and/or RAN domains may support improved trigger based location of UEs - e.g. periodic location or triggered location based on UE movement, UE cell change, or environment change for a UE. |

Figure 2:
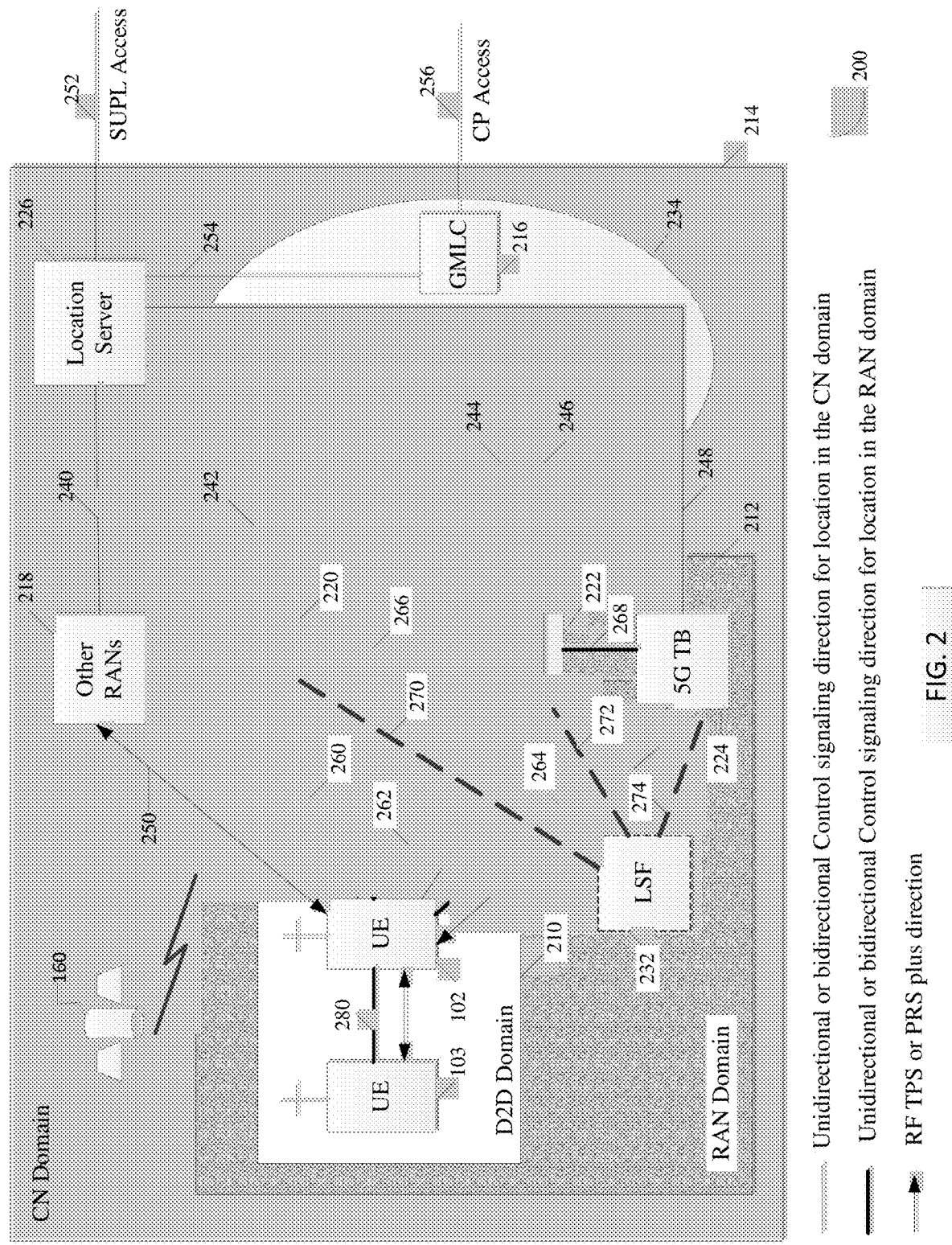
FIG. 2 is a system diagram illustrating certain features of a system comprising a mobile device and a 5G network, in accordance with an example implementation.

FIG. 2 exemplifies a system 200 capable of supporting estimation of a location of a UE 102 that has wireless access according to a fifth generation (5G) radio access interface such as a 3GPP 5G new radio (NR) interface. System 200 may also be applicable to a UE 102 that has other types of radio access such as LTE, IEEE 802.11 WiFi, UMTS, GSM, BT etc. System 200, including one or more of 5G BS 220, 5G BS 222, 5G TB 224, LSF 232 and location server (LS) 226, may support some or all of the location estimation features, characteristics and high level features described previously in Tables 2, 3 and 4. For ease of interpretation of FIG. 2, unidirectional or bidirectional control signaling between pairs of entities belonging to a CN domain is shown using solid lines; unidirectional or bidirectional control signaling between pairs of entities belonging to a RAN domain or a D2D domain is shown using bold solid lines and bold dashed lines; and transfer of radio frequency (RF) TPS and PRS signals is shown using arrows where an arrow direction indicates a possible transmission direction of a TPS or PRS signal. For all signaling transmitted to the UE 102 from a RAN domain, transmission using point to point means or using broadcast is allowed.

The terms "control signaling", "signaling messages" and "control signaling messages" are used synonymously herein to refer to messages, parts of a message (e.g. one or parameters) or other signaling information (e.g. a sequence of bits or symbols) that are transmitted from one entity to one or more other entities to coordinate, manage and/or assist procedures and techniques used for network operation and UE support, such as support of location estimation related services for a UE 102. Control signaling may be transferred using wireline, wireless or both wireline and wireless means and/or using point to point, multicast or broadcast means. One or more protocols may be used to transport control signaling (or signaling messages) such as the Internet Protocol (IP), Transmission Control Protocol (TCP), User Data Protocol (UDP) or Stream Control Transmission Protocol (SCTP). Furthermore, one or more application level protocols may define the information content of control signaling, such as the OMA ULP, OMA LPPe, OMA Mobile Location Protocol (MLP), 3GPP LPP and 3GPP LPPa protocols in the case of location services. Control signaling may be transmitted directly between two entities when the entities are directly connected to one another (e.g. as in the case of control signaling sent from 5G BS 220 to either 5G BS 222 or UE 102) or may be sent via one or more intermediate entities (e.g., as in the case of control signaling transmitted from a standalone LSF 232 to UE 102 via 5G BS 222, or control signaling 246 sent from LS 226 to UE 102 via 5G BS 222). Control signaling that is sent between elements in a RAN or between an element in a RAN and a UE may be referred to as level 3 signaling or occurring at a layer 3 (or 5G layer 3) because the protocols used in 3GPP to support such signaling (e.g. a Radio Resource Control (RRC) protocol) typically occur at a layer 3 in a so called seven layer ISO/SNA model.

While control signaling is sent via one or more intermediate entities, signaling content that is defined by an application level protocol (e.g. ULP, LPP, LPPe) may not be changed, but signaling content that is associated with a transport protocol (e.g. IP, TCP, UDP, SCTP) may be changed if the transport protocols used along the path of the control signaling change due to protocol conversion at an intermediate entity. For example, if LS 226 sends an LPP signaling message to UE 102 via 5G BS 222 (and possibly via other intermediate entities in 5G CN 234 that are not shown in FIG. 2), IP and SCTP may be used as transport protocols between LS 226, any intermediate entities in 5G CN 234 and 5G BS 222, whereas other transport protocols such as the 3GPP Packet Data Convergence Protocol (PDCP) and 3GPP Radio Link Control (RLC) may be used (among others) between 5G BS 222 and UE 102. In that case, 5G BS 222 may perform protocol conversion between SCTP and IP received from 5G CN 234 and PDCP and RLC sent to UE102. In some embodiments, protocol conversion by an intermediate entity at an application level may also occur.

System 200 includes the UE 102 and another UE 103 that may be similar to or the same as UE 102 in terms of its capabilities. Other UEs similar to or the same as UEs 102 and 103 may also be present but are not shown for simplicity. UEs 102 and 103 may support wireless access according to a 5G radio interface, a 3GPP NR radio interface and possibly one or more other radio interfaces such as LTE, IEEE 802.11 WiFi, UMTS, GSM, BT etc. UEs 102 and 103 may be able to acquire and measure one or more TPS or PRS signals transmitted by one or more of 5G BS 220, 5G BS 222 and 5G TB 224 to enable location of UE 102 and/or UE 103. UEs 102 and 103 may further be able to acquire and measure SPS signals transmitted by one or more SVs 160 (e.g. GNSS SVs) to enable location of UE 102 and/or UE 103.

Although elements in system 200 such as UE 102, UE 103, 5G BS 220, 5G BS 222 and 5G TB 224 are all described herein as supporting a 5G radio interface such as a 3GPP 5G NR radio interface and as exchanging TPS signals and control signaling using the 5G or 5G NR radio interface, the various techniques and embodiments described herein are to be understood as being applicable to support of other types of radio interface by these elements such as a future 6G radio interface, a 2G, 3G or 4G radio interface (e.g. GSM, UMTS, LTE), an 802.11 WiFi radio interface or to combinations of different radio interfaces in a heterogeneous network.

System 200 includes a serving network for UE 102 that includes a 5G core network (CN) 224 and a 5G RAN that includes a 5G base station (BS) 220, a 5G BS 222, a 5G transmission beacon (TB) 224 and a location server function (LSF) 232. Additional 5G BSs may be present that are not shown in FIG. 2 for simplicity. The serving network for UE 102 may include one or more other RANs 218, each supporting some other radio access technology (RAT) such as LTE, IEEE 802.11 WiFi, UMTS, GSM etc. The 5G CN 234 may include a GMLC 216 and may be associated with a location server (LS) 226. The LS 226 may be part of 5G CN 234 or accessible from 5G CN 234 (e.g. connected to 5G CN 234) and belonging to the operator for 5G CN 234. 5G CN 234 may include other elements not shown in FIG. 2. For example, 5G CN 234 may contain an MME (e.g. a 5G MME) similar to or the same as MME 108 in system 100, an SGW similar to or the same as SGW 112 in system 100, a PDG similar to or the same as PDG 114 in system 100 and/or an HSS similar to or the same as HSS 145 in system 100. 5G CN 234 may contain other elements such as a Mobility Management Function (MMF) and a Session Management Function (SMF) that perform the mobility management functions and session management functions, respectively, normally performed by an MME such as MME 108.

In some embodiments, 5G CN 234 may include an IP Multimedia Subsystem (IMS) (not shown in FIG. 2) that may be used to establish a voice call (e.g. an emergency voice call) or a data session originated by or terminated to UE 102. An IMS in 5G CN 234 may include a Location Retrieval Function (LRF) that may support location related functions similar to GMLC 216 in terms of providing location services to external clients such as providing a location for UE 102 to an external client (e.g. an external client that is a public safety answering point). In some embodiments, an LRF included in an IMS in 5G CN 234 may connect to LS 226 when LS 226 supports a UP location solution (e.g. while LS 226 is a SUPL SLP) and/or may connect to GMLC 216 while LS 226 supports a control plane location solution.

5G BS 220 and/or 5G BS 222 may provide wireless communication access to UE 102 according to a 5G radio interface or 3GPP NR radio interface and may comprise a serving BS for UE 102. 5G BS 220 and 5G BS 222 may perform similar functions to eNBs 104 and 106 in system 100, except for supporting a 5G or NR radio interface. 5G BS 220 and/or 5G BS 222 may further transmit TPS and/or PRS signals to UE 102 to support downlink location of UE 102 (e.g. according to OTDOA or ECID) and/or may measure TPS and/or PRS signals transmitted by UE 102 to enable uplink location of UE 102 (e.g. according to UTDOA or ECID). A 5G TB 224, possibly in the same RAN as 5G BS 220 and 5G BS 222, may transmit TPS and/or PRS signals to UE 102 to further support downlink location of UE 102 (e.g. according to OTDOA or ECID).

A location server function (LSF) 232 may support positioning of UE 102 using (i) uplink measurements of UE 102 obtained and provided by 5G BS 220, 5G BS 222 and/or by separate LMUs (not shown in FIG. 2) and/or (ii) downlink measurements obtained and provided by UE 102. In this context, a "location server function" as referred to herein means an apparatus that is capable of communicating with a UE to support one or more operations for estimating a location of the UE. In an embodiment, a location server function may comprising one or more processors executing computer-readable instructions to support one or more operations for estimating a location of a UE including, for example, providing positioning assistance data, computing estimates of locations of client UE devices based, at least in part, on measurements obtained from the client UE devices, requesting client UEs to obtain measurements for use in computing estimated locations of the client UE devices, forwarding estimated locations of client UE devices to other entities (e.g., for responses to E911 events), just to provide a few examples. As described herein with respect to particular implementations, a location server function may be integrated as part of the processing resources of an entity configured to perform a base station function within an RAN. In other implementations, a location server function may comprise a stand-alone entity within a RAN that operates separately from base stations that server UES in the RAN. It should be understood, however, that these are merely examples of features of a location server function, and that claimed subject matter is not limited in this respect. Downlink measurements obtained and provided by UE 102 may include measurements of TPS and PRS signals transmitted by 5G BS 220, 5G BS 222 and/or 5G TB 224 and/or measurements of navigation signals transmitted by SVs 160. LSF 232 may be a standalone entity or may be part of a 5G BS or 5G TB such as 5G BS 220, 5G BS 222 or 5G TB 224. An LSF 232 that is implemented as part of a BS or TB is referred to as "integrated LSF" herein, or as an "LSF integrated in a BS" or "LSF integrated in a TB", in either case respectively. An LSF integrated in a BS may also be referred to simply as a base station, eNodeB or by some other name that does not explicitly call out a location capability. An LSF 232 that is implemented as a separate standalone entity is referred as a "standalone LSF" herein and may also be referred to as a location server or as a server. LSF 232 may also be referred to as a "location function" or "location application". A standalone LSF 232 may be connected to one or more 5G BSs and/or 5G TBs such as 5G BS 220, 5G BS 222 and 5G TB 224 via direct links, a local area network, IP routers and/or other entities. Such connections may enable standalone LS 232 to exchange signaling messages with the connected entities and/or with other entities via the connected entities. A standalone LSF 232 may also have a connection to 5G CN 234. A standalone LSF 232 may be enabled to communicate with entities in or associated with 5G CN 234, such as LS 226, via a connection to 5G CN 234 and/or via other entities such as 5G BSs 220 and 222 that have connections to 5G CN 234. An LSF 232 integrated in 5G BS 220, 5G BS 222 or 5G TB 224 may also be enabled to communicate with entities in or associated with 5G CN 234, such as LS 226, by using any connection or signaling path between the entity in which LSF 232 is integrated and 5G CN 234. While only one LSF 232 is shown in FIG. 2, a 5G RAN may include more than one LSF. For example, 5G BS 220, 5G BS 222 and 5G TB 224 may each contain an integrated LSF.

UE 102 and UE 103 in system 200 may be in communication—for example, using D2D signaling applicable to a 5G or NR radio interface. In addition, UE 102 and UE 103 may be enabled to perform sidelink positioning wherein UE 102 acquires and measures a TPS or PRS transmitted by UE 103 and/or UE 103 acquires and measures a TPS or PRS transmitted by UE 102. As previously described, sidelink positioning may enable a UE 102 to determine a location of another UE 103 relative to UE 102 or vice versa.

5G CN 234 may support communication services for UE 102 such as supporting mobility for UE 102 and communication access by UE 102 to remote entities and the Internet. 5G CN 234 may perform similar functions to VPLMN EPC 130 and/or HPLMN 140 in system 100, except for also enabling wireless access by UE 102 according to a 5G or NR radio interface. 5G CN 234 may be a serving PLMN for UE 102 and may, in some cases, also be the HPLMN for UE 102.

LS 226 may support location services on behalf of UE 102 and may support a control plane location solution and/or a user plane location solution. LS 226 may be similar to or the same as E-SMLC 110 while supporting a control plane location solution. LS 226 may function as a SUPL SLP (e.g. a D-SLP, E-SLP and/or H-SLP) while supporting a user plane location solution and may then be accessed by an external client (not shown in FIG. 2) using a communication link 252 (e.g. which may provide access using SUPL to the location of UE 102 to an external client accessible over the Internet). LS 226 may be similar to or the same as H-SLP 118 in system 100 while supporting SUPL.

In an embodiment, LS 226 and standalone LSF 232 may be parts of the same physical location server (e.g. may be separate software elements or processes or separate hardware components for the same physical server). This embodiment may reduce network complexity and cost by enabling efficient communication between LSF 232 and LS 226 in which control signaling exchanged between LSF 232 and LS 226 is exchanged internally within the same physical location server and in which data (e.g. a location context and/or a location configuration for UE 102) can be shared by and accessible to both LSF 232 and LS 226.

GMLC 216 may provide location access to UE 102 (e.g. via LS 226) according to a control plane location solution on behalf of one or more external clients (not shown in FIG. 2) which may access GMLC 216 using a communication link 256 for control plane access. GMLC 216 may be similar to or the same as V-GMLC 116 and/or H-GMLC 148 in system 100.

System 200 may support two or more different "positioning domains". In this context, a "positioning domain" may define a portion of a network including particular network devices that are capable of supporting positioning operations for a UE 102 or UE 103 by exchanging signaling messages between or among the particular network devices. Examples of a positioning domain include a "RAN domain", "CN domain" and "Device to Device (D2D) Domain" (also referred to as a "UE domain"). System 200 is shown in FIG. 2 as including a D2D domain 210, a RAN domain 212 and a CN domain 214. D2D domain 210 includes UEs 102 and 103. RAN domain 212 includes UE 102 as well as 5G BS 220, 5G BS 222, 5G TB 224 and LSF 232. CN domain 214 includes UE 102 as well as LS 226. Due to use of multiple domains, system 200 may be referred to as tiered domain architecture, a multi-tiered architecture, a tiered system or a tiered architecture where the different tiers may correspond to the different positioning domains such as D2D domain 210, RAN domain 212 and CN domain 214.

Implementing more than one positioning domain in a network may enable improved support for location services for UEs such as UE 102 and/or for external or internal clients who may be the recipients of location information (e.g. location estimates) obtained for UE 102. For example, RAN domain 212 may support low latency (e.g. a low delay of a few seconds or less in obtaining a location estimate for a UE 102), high capacity (e.g. an ability to locate all or most UEs currently attached to BSs and APs in RAN domain 212), and/or a high frequency of location for some or all UEs (e.g. such as one location every 10 seconds). In contrast, CN domain 214 may provide a standard interface or standard set of interfaces to external clients (e.g. external users, external web servers) that enable the external clients to request location information (e.g. location estimates) for one or more UEs. The standard interfaces may correspond to those for a 3GPP control plane location solution (e.g. as provided by GMLC 216 using CP communication link 256) and/or those for a SUPL user plane location solution (e.g. as provided by LS 226 using SUPL communication link 252). CN domain 214 may also support more accurate location of UE 102 than RAN domain 212 through use of positioning methods not supported by RAN domain 212.

In one case including but not limited to system 200, a "RAN domain" may refer to a positioning domain comprising a mobile device such as UE 102 in combination with entities belonging to a RAN including base stations such as 5G BS 220 and 5G BS 222, transmission beacons such as 5G TB 224, LMUs (not shown in FIG. 2) and an LSF such as LSF 232. Because a RAN domain includes entities in a RAN, it may also be referred to more simply as a radio access network (RAN). Here, messaging or signaling between or among devices in a RAN domain may be limited to wireless signaling or messaging between a mobile device and one or more base stations and other entities (e.g. TBs and/or an LSF) in the RAN domain, and signaling or messaging between or among base stations and other entities (e.g. LMUs, TBs and/or an LSF) in the RAN domain. In a particular implementation of a RAN domain, location estimates for a mobile device such as UE 102 may be obtained from (i) downlink location measurements made by the mobile device of TPS or PRS signals transmitted by BSs and/or TBs in the RAN domain, (ii) downlink location measurements made by the mobile device of other signals transmitted by entities not in the RAN domain (such as SVs 160) and/or (iii) uplink location measurements of TPS or PRS signals transmitted by the mobile device made by BSs and/or LMUs in the RAN domain, for example. A location estimate may be obtained by an integrated or standalone LSF (e.g. LSF 232) in the RAN domain.

In one case including but not limited to system 200, a "CN domain" may refer to a positioning domain comprising a mobile device such as UE 102 in combination with a core network such as CN 234 and including one or more location servers such as LS 226 that are in or associated with the core network. Because a CN domain includes entities in a CN, it may also be referred to more simply as a core network (CN). Here, messaging or signaling between or among devices in a CN domain may include signaling or messaging between a mobile device and one or more location servers and/or other entities in the CN domain. Additional signaling or messaging between a location server in the CN domain and one or more entities in a RAN domain may also be supported. For example, this signaling or messaging may allow a location server in the CN domain, such as LS 226, to request and obtain location information (e.g. location measurements and/or a location estimate) for a mobile device such as UE 102 from one or more entities in the RAN domain, such as LSF 232, 5G BS 220 and/or 5G BS 222.

A location server in the CN domain, such as LS 226, may be enabled to obtain: (i) downlink measurements made by a mobile device, such as UE 102, of TPS or PRS signals transmitted by entities in the RAN domain, such as BS 220 and TB 224, (ii) downlink measurements obtained by the mobile device of TPS or PRS signals transmitted by other RANs such as other RANs 218, and/or (iii) downlink measurements of navigation signals transmitted by SVs such as SVs 160.

A location server in a CN domain, such as LS 226, may be further configured to request and obtain location information (e.g. uplink and/or downlink location measurements and/or a location estimate) for a mobile device, such as UE 102, from other RANs such as other RANs 218. A location server in a CN domain, such as LS 226, may combine the location information received from the mobile device (e.g. UE 102), the RAN domain (e.g. RAN domain 212) and/or other RANs (e.g. other RANs 218) to determine a location estimate for the mobile device. A location server in a CN domain, such as LS 226, may support a control plane location solution and/or a user plane location solution—e.g. as described previously for LS 226. A location server in a CN domain, such as LS 226, may be enabled to configure or otherwise control the performance of location services in a RAN domain (e.g. RAN domain 212) and/or D2D domain (e.g. D2D domain 210)—e.g. by configuring particular types of location service to be performed in the RAN domain by an LSF (e.g. LSF 232) or in the D2D domain by a UE (e.g. UE 102).

A "D2D domain" (or a "UE domain") may refer to peer devices, such as UEs 102 and 103, capable of exchanging signaling or messaging in one or more wireless links established between the peer devices and without an intervening device (e.g., base station). In a particular implementation, devices in a D2D domain, such as UEs 102 and 103, may also be part of a RAN domain, such as RAN domain 212, and/or a CN domain, such as CN domain 214, and may employ sidelink positioning as described previously to obtain relative and/or absolute locations of one another.

In the example system 200 in FIG. 2, RAN domain 212 may support location of UE 102 using only downlink and/or only uplink measurements of 5G TSP and/or PRS signals. In an embodiment, RAN domain 212 may also support location of UE 102 using other downlink measurements obtained by UE 102 such as of TPS and/or PRS signals transmitted by other RANs 218 and/or SVs 160. Location support by RAN domain 212 may be provided to both an authenticated UE 102 and an unauthenticated UE 102. The location support may include assisting UE 102 to obtain its own location (e.g. using UE based position methods) and/or obtaining a location for UE 102 using UE assisted and/or network based position methods and providing this location to UE 102. For an authenticated UE 102, the network (e.g. RAN domain 212 and/or CN domain 214) may know a public identity (e.g. a Mobile Station International Subscriber Directory Number (MSISDN)) and/or a private identity (e.g. an International Mobile Subscriber Identity (IMSI)) for the UE 102 and may have authenticated one or both identities as being correct. For an unauthenticated UE 102, the network (e.g. RAN domain 212 or CN domain 214) may not know a public or private identity for UE 102 or may know such an identity but not have authenticated that the identity is correct.

Within RAN domain 212, a location estimate of UE 102 may be obtained by UE 102 using one or more UE based or standalone position methods or may be obtained by LSF 232 using one or more UE assisted and/or network based position methods. FIG. 2 shows the uplink and downlink TPS and PRS signals that may be acquired and measured to support positioning of UE 102 in the RAN domain 212 (via the arrows in FIG. 2) and shows associated control signaling (e.g. signaling messages) that may be exchanged between entities in the RAN domain 212 to coordinate the measurements (via the bold solid and bold dashed lines in FIG. 2).

For example, control signaling 260 and/or 262 may be sent point to point (e.g. using a signaling link or signaling channel) from 5G BS 220 and/or from 5G BS 222, respectively, to UE 102 to: (i) request one or more downlink location measurements or a location estimate from UE 102; (ii) provide assistance data to UE 102 to help UE 102 acquire and measure downlink signals (e.g. TPS signals or navigation signals from SVs 160) to obtain these location measurements and/or to obtain a location from such location measurements; and/or (iii) request UE 102 to transmit a TPS or PRS to be measured by 5G BS 220 and/or 5G BS 222 for uplink positioning.

Control signaling 260 and/or 262 may also be transmitted from UE 102 to 5G BS 220 and/or 5G BS 222, respectively, to provide downlink location measurements (e.g. in response to a request) or to request assistance data. Control signaling 266 may be sent from 5G BS 220 to 5G BS 222, or vice versa, to request uplink and/or downlink location measurements of UE 102. Control signaling 268 may be sent from 5G BS 222 to 5G TB 224 to configure TPS or PRS transmission from 5G TB 224. Control signaling 264, 260 and/or 262 may be broadcast from 5G TB 224, 5G BS 220 and/or 5G BS 222, respectively, to UE 102 to provide assistance data to UE 102 to help UE 102 acquire and measure TPS or PRS signals transmitted by 5G TB 224, 5G BS 220 and/or 5G BS 222. For example, assistance data that is broadcast or sent point to point may indicate when TPS or PRS signals will be transmitted (or scheduled) and may provide characteristics of the TPS or PRS signals such as frequencies used, bandwidth, coding and timing. The assistance data broadcast or sent point to point by a particular entity (e.g. 5G TB 224, 5G BS 220 or 5G BS 222) may be restricted to assisting measurement of TPS or PRS signals transmitted only by that entity or may also assist measurement of TPS or PRS signals transmitted by other entities. Assistance data that is broadcast or sent point to point may also or instead assist measurement of other signals—e.g. TPS or PRS signals transmitted by other RANs 218 or navigation signals transmitted by SVs 160. In a particular embodiment, 5G BS 220, 5G BS 222, and/or 5G TB 224 may broadcast assistance data for GNSS RTK—e.g. by providing the carrier phase for navigation signals for one or more SVs 160 that were recently measured by one or more GNSS receivers at precisely known locations, such as locations co-sited with one or more of 5G BS 220, 5G BS 222, 5G TB 224 and LSF 232.

An LSF 232 integrated in a BS (e.g. 5G BS 220) may determine a location for UE 102 from downlink location measurements provided by UE 102, uplink measurements obtained by the BS, and/or uplink measurements obtained by another BS and transferred to the BS of which LSF 232 is a part. A standalone LSF 232 may obtain an estimated location of UE 232 from these same measurements if transferred to LSF 232 from another entity in RAN domain 212 such as 5G BS 220 or 5G BS 222. In this case, standalone LSF 232 may exchange signaling messages with UE 102 indirectly via an intermediate BS such as 5G BS 220 or 5G BS 222 in order to: (i) request one or more downlink location measurements or a location estimate from UE 102; (ii) provide assistance data to UE 102 to help UE 102 acquire and measure downlink signals and/or obtain a location from such location measurements; and/or (iii) request UE 102 to transmit a TPS or PRS to be measured by 5G BS 220 or 5G BS 222 for uplink positioning.

Signaling messages exchanged between a standalone LSF 232 and UE 102 via an intermediate BS (e.g. 5G BS 220 or 5G BS 222) within RAN domain 212 may undergo protocol conversion by the intermediate BS to transform one or more protocols (e.g. transport protocols) used between standalone LSF 232 and the intermediate BS into similar or equivalent protocols used between the intermediate BS and UE 102 over the 5G or 3GPP NR radio interface. Such a protocol conversion may perform conversion for both directions of message transfer. A standalone LSF 232 may also provide assistance data to 5G BS 220, 5G BS 222 and/or 5G TB 224 for later provision by point-to-point or by broadcast messaging to UE 102. For example, the assistance data may include any of the assistance data types previously described herein for RAN domain 212.

Within RAN domain 212, control signaling 270, 272 and/or 274 may also be exchanged between 5G BS 220, 5G BS 222 and/or 5G TB 224, respectively, and a standalone LSF 232 to enable determination of a location for one or more of 5G BS 220, 5G BS 222 and 5G TB 224. For example, 5G BS 220 and 5G BS 222 may have accurate known locations due to a previous site survey or use of GPS location but 5G TB 224 may be a low cost device installed by an operator without an initially known accurate location. 5G TB 224 may then acquire and measure TPS or PRS signals transmitted by 5G BS 220 and/or 5G BS 222 (and possibly from other BSs not shown in FIG. 2) and may obtain location measurements (e.g. of RSTD, RTT, AOA) which may be transferred to standalone LSF 232 as part of control signaling. LSF 232 may then compute an estimated location of 5G TB 224 and may transmit this estimated location to 5G TB 224 and/or to LS 226 for later use as assistance data to locate a UE 102 that obtains location measurements for TPS or PRS signals transmitted by 5G TB 224. An LSF 232 integrated in 5G BS 220 or 5G BS 222 may perform similar functions to obtain an estimated location of a 5G TB 224.

RAN domain 212 may support positioning of some or all UEs (such as UE 102) in the coverage area of BSs in RAN domain 212 on a continuous and/or autonomous basis. For example, RAN domain 212 (e.g. a standalone LSF 232 and/or an integrated LSF 232 in RAN domain 212) may periodically (e.g. every 10 minutes) obtain the locations of some or all served UEs such as UE 102 and/or obtain the locations of UEs such as UE 102 when certain trigger events (also referred to as trigger conditions) occur. For example, a trigger event may occur when (i) UE 102 changes serving cell (e.g. moves from being served by 5G BS 220 to being served by 5G BS 222), or (ii) UE 102 radio coverage degrades (e.g. UE approaches the border of a serving cell) as indicated by either UE 102 receiving low signal strength and/or low signal quality from a serving BS (e.g. 5G BS 220), or a serving BS (e.g. 5G BS 220) receiving low signal strength and/or low signal quality from UE 102. This periodic and/or triggered location may be managed and configured by CN domain 214 (e.g. by LS 226) or may be supported autonomously by RAN domain 212 without any configuration and management by CN domain 214.

RAN domain 212 may be implemented and/or designed or optimized for high volume positioning (e.g. to support UEs belonging to the Internet of Things (IoT)), low latency and/or high signaling efficiency.

RAN domain 212 may support periodic location of a UE 102, triggered location of a UE 102 (e.g. as previously described) and/or on demand location of a UE 102 at one or more different times.

A "location configuration" of a UE as referred to herein means parameters indicative of conditions or events under which one or more operations or actions supporting determination of an estimated location of the UE is to occur. In an example implementation, a location context of UE 102 may be stored in RAN domain 212 such as in a standalone LSF 232, an LSF 232 integrated in a serving 5G BS 220 for UE 102 or in a serving 5G BS 220 without an LSF. The location configuration may include information (e.g. parameters) that defines: (i) whether the UE 102 is to be located periodically and, if so, an associated periodicity, (ii) whether UE 102 is to be located if certain trigger events occur and if so what are the associated trigger events (e.g. such as UE 102 moving to a new cell or receiving degraded radio coverage), (iii) whether on demand a location of UE 102 is to be supported and, if so which internal or external clients are enabled to request on demand location, and/or (iv) a quality of service (QoS) for locating UE 102 (e.g. defined separately for each of (i), (ii) and (iii)) in terms of location accuracy and/or response time and latency. The location configuration for UE 102 may be provided to RAN domain 212 by CN domain 214 (e.g. by LS 226), or may be provided by Operations and Maintenance (O&M), or may be preconfigured in RAN domain 212 and may then possibly be the same for all UEs served by RAN domain 212. The location configuration for UE 102 may depend on the location capabilities of UE 102 (e.g. may depend on which position methods are supported by UE 102) and/or on subscription information for UE 102. For example, a location configuration for UE 102 may define frequent periodic location and/or triggered location for UE 102 if UE 102 supports position methods that have low latency and/or if UE subscribes to obtaining its location frequently, and may define accurate location of UE 102 if UE 102 supports accurate position methods.

A "location context" of a UE as referred to herein means one or more parameters characterizing current or past locations of the UE. In an example implementation, a location context may be stored in RAN domain 212 for UE 102 such as in a standalone LSF 232, an LSF integrated in a serving 5G BS 220 for UE 102 or in a serving 5G BS 220 without an LSF. The location context may include information (e.g., parameters) that is associated with the current location or recent locations of UE 102 and may include: (i) the last known (e.g. most recently obtained) location of UE 102, (ii) the identity (ID) of the current or last known serving cell for UE 102, (iii) the ID for the current or last known serving BS or serving AP for UE 102, (iv) one or more previous locations, previous serving cell IDs and/or previous serving BS or AP IDs for UE 102, (v) some or all of the most recent location measurements obtained by UE 102 in the case of downlink measurements and/or obtained by one or more BSs and/or LMUs in the case of uplink measurements, (vi) previous uplink and/or downlink location measurements for UE 102, (vii) information related to GNSS SVs measured by UE 102 such as visible SVs, SV code phase and/or carrier phase measurements, or SV Doppler measurements, (viii) other location related measurement information obtain by UE 102 or by BSs and APs in RAN 212 for UE 102, (ix) details of ongoing location measurements currently in progress for UE 102 (e.g. such a downlink measurements currently being obtained by UE 102), and/or (x) timestamps providing the times and possibly the dates when some or all of the different types of information in the location context (e.g. last known location, previous location measurements) were obtained.

In some embodiments, the location context for UE 102 may include the location configuration for UE 102. The location context for UE 102 may be useful in providing a previous location estimate or a location history for UE 102 to an external client (e.g. a user or web server) when UE 102 cannot be currently positioned (e.g. due to not being accessible from RAN domain 212 such as if out of radio coverage or in a power saving mode). The location context for UE 102 may also be used by RAN 212 to support a "warm start" or "hot start" if locating UE 102 by knowing in advance roughly where UE 102 is located which may significantly reduce latency and/or resources used for positioning (such as by avoiding measurements of TPS signal from or by BSs that are distant from UE 102). The location context for UE 102 may be further used to improve network operation by enabling RAN domain 212 or other entities (e.g. 5G CN 234) to determine a suitable serving cell and serving BS for UE 102, a suitable carrier frequency and/or if handover or cell change may be needed.

Either or both of the location context and location configuration for UE 102 may be transferred from one BS to another or from one LSF to another within RAN domain 212 to support mobility of UE 102 as UE 102 moves to new serving cells supported by RAN domain 212. The location context and possibly the location configuration for UE 102 may also be transferred to CN domain 214 by RAN domain 212 (e.g. by LSF 232 or 5G BS 220) when UE 102 is no longer attached to RAN domain 212 (e.g. no longer has a signaling connection to a BS in RAN domain 212 or is otherwise in idle state). The location context and location configuration for UE 102 (if transferred) may be stored by CN domain 214 (e.g. may be stored by LS 226 or by another entity in CN domain 214 such as an MME, a 5G MME or an entity similar to an MME). At a later time, if UE 102 is again attached to RAN domain 212, the location context and location configuration (if stored) may be transferred back to RAN domain 212 (e.g. to a new serving BS for UE 102 or to an LSF associated with or integrated in the serving BS) to assist in supporting location for UE102.

Location results obtained by RAN domain 212 for UE 102 (e.g. all or part of a location context for UE 102 or separate location estimates for UE 102 obtained by RAN domain 212) may be used to help support handover and cell selection for UE 102 and may also be used, along with similar results for other UEs, for, dynamic optimization of RAN domain 212, network planning, network analytics, vehicle to vehicle signaling and services and be accessible to the CN domain 214, LS 226 and/or external clients.

The LSF 232 may support location services for UEs such as UE 102 served by or able to access BSs in RAN domain 212. LSF 232 may be restricted to supporting location services only for UEs in a certain coverage area such as UEs served by a particular BS when LSF 232 is integrated in the BS or UEs served by some set of BSs when LSF 232 is a standalone LSF with an association with (e.g. connections to) this set of BSs. LSF 232 may also be able to support location services for all UEs served by or able to access RAN domain 212. RAN domain 212 may contain a number of (e.g. two or more) LSFs that may be load shared among UEs served by or able to access RAN domain 212 and/or may be assigned to different sets of UEs based, for example, on supporting UEs only in certain coverage areas as previously described and/or supporting only UEs that support certain position methods. LSF 232 may store the location contexts and location configurations for some or all UEs served by LSF 232. LSF 232 may coordinate the location of served UEs (e.g. UE 102) according to requirements in the location configuration for each UE. For example, LSF 232 may instigate location of UE 102 periodically and/or when certain trigger conditions occur according to periodic location and/or triggered location information requirements in the location context for UE 102.

An LSF 232 may also support on demand location requests from a UE 102 which may apply when a UE 102 is authenticated and/or when UE 102 is unauthenticated. To support on demand location of UE 102, LSF 232 may send assistance data to UE 102, may enable UE 102 to access broadcast assistance data (e.g. by providing a ciphering key to UE 102 when broadcast assistance data is ciphered), and/or may obtain a location for UE 102 using UE assisted and/or network based position methods and then send the obtained location to UE 102. LSF 232 may interact, by exchanging control signaling, with BSs (e.g. 5G BS 220 and 5G BS 222) in RAN domain 212 in order to coordinate and obtain uplink location measurements for one or more UEs (e.g. UE 102) and/or downlink location measurements made by the UEs and provided by the UEs to the BSs. The location measurements may be used to obtain locations for the UEs.

LSF 232 may interact, by exchanging control signaling, with a location server in the CN domain 214 (e.g. LS 226) if CN domain 214 is present to support location and may assist the location server to locate a UE 102 by obtaining and returning location measurements for the UE 102 to the location server. LSF 232 may enable location of served UEs such as UE 102 with low latency, high capacity and/or high volume by being close to the served UEs, wherein control signaling to support location of the served UEs remains within RAN domain 212 and does not need to travel over long signaling links (which may be expensive) or through many, if any, intermediate entities. LSF 232 may also facilitate coupling of and interaction between CN domain 214 and RAN domain 212 by providing a convenient focal point for access to the locations of UEs by entities in CN domain 214 such as LS 226.

The CN domain 214 in system 200 may support some functions and control signaling that are similar to that described for system 100 in FIG. 1. This may be of benefit in enabling CN domain 214 to provide the same or similar location services to external clients and to UEs as that provided by system 100. This may enable a network operator to migrate from location services support for UEs with LTE access, as exemplified by system 100, to location services support for UEs with 5G or 3GPP NR radio access, as exemplified by system 200, and may also enable coexistence of both sets of services for an operator with a network or networks that support both LTE (4G) access and 5G or NR access.

Within CN domain 214, location server 226 may support exchange of control signaling 242 with 5G BS 220 and/or exchange of control signaling 244 with 5G BS 222 which may enable LS 226 to send and receive location related information to and from 5G BS 220 and/or 5G BS 222. This location related information may include a request for location information for UE 102 sent from LS 226 to 5G BS 220 or 5G BS 222 (e.g. a request for a location estimate or uplink and/or downlink location measurements for UE 102) and/or may include a request for a location context for UE 102. The location related information may also include a location configuration and/or a location context for UE 102 sent by LS 226 to 5G BS 220 or 5G BS 222. The location related information may further include location information for UE 102 (e.g. a location estimate or uplink and/or downlink location measurements) or a location context for UE 102 sent by 5G BS 220 or 5G BS 222 to LS 226 (e.g. if requested by LS 226). LS 226 may use any uplink and/or downlink location measurements received from 5G BS 220 and/or 5G BS 222 to help determine a current location for UE 102.

Control signaling 242 and/or 244 may also enable LS 226 to send and receive the same location related information (e.g. as described previously) to and from LSF 232, if LSF 232 is integrated in either 5G BS 220 or 5G BS 222 or if control signaling 242 or 244 is forwarded (or relayed) by 5G BS 220 or 5G BS 222, respectively, to and from a standalone LSF 232. Any forwarding (or relaying) of control signaling 242 or 244 by 5G BS 220 or 5G BS 222 may include protocol conversion (e.g. for transport protocols) as previously described and/or may include protocol conversion at an application level, wherein control signaling exchanged between standalone LSF 232 and 5G BS 220 and 5G BS 222 uses a different application protocol to control signaling 242 and 244 exchanged between LS 226 and 5G BS 220 and 5G BS 222.

LS 226 may further exchange control signaling 248 with 5G TB 224, control signaling 242 with 5G BS 220 and/or control signaling 244 with 5G BS 222 to enable LS 226 to (i) send and configure information for transmitted PRS or TPS signals (e.g. PRS or TPS bandwidth, frequencies, codes, time scheduling, duty cycle, muting, signal timing and/or synchronization) in 5G TB 224, 5G BS 220 and/or 5G BS 222, respectively; (ii) request and subsequently receive information for transmitted PRS or TPS signals (e.g. PRS or TPS bandwidth, frequencies, codes, time scheduling, duty cycle, muting, signal timing and/or synchronization) in 5G TB 224, 5G BS 220 and/or 5G BS 222, respectively; and/or (iii) request and subsequently receive information related to the locations of 5G TB 224, 5G BS 220 and/or 5G BS 222, respectively (e.g. location coordinates or measurements made by 5G TB 224, 5G BS 220 and/or 5G BS 222, respectively, of PRS or TPS signals transmitted by other BSs and/or TBs which may enable LS 226 to compute locations for 5G TB 224, 5G BS 220 and/or 5G BS 222, respectively).

In some embodiments, control signaling 242, 244 and/or 248 may use the 3GPP LPPa protocol which may include certain messages and/or parameters that support positioning for 5G or NR radio access by a UE 102. In addition, control signaling 242, 244 and/or 248 may be transferred between LS 226 and 5G TB 224, 5G BS 220 and/or 5G BS 222, respectively, via one or more intermediate entities in CN 234 (not shown in FIG. 2) such as a serving MME for UE 102 or an entity similar to a serving MME that supports 5G or NR radio access for UE 102.

LS 226 may exchange control signaling 240 with other RANs 218 to enable LS 226 to request and subsequently receive location related measurements for UE 102 from other RANs 218. Control signaling 240 may be similar to or the same as LPPa signaling 162 in system 100 in the case of LTE access being supported by other RANs 218.

LS 226 may exchange control signaling 246 with UE 102. Control signaling 246 may be similar to or the same as, and/or may be transferred in the same or similar way as, LPP/LPPe signaling 160 in system 100 when LS 226 supports a control plane location solution to locate or provide assistance data to UE 102. Control signaling 246 may be similar to or the same as, and/or may be transferred in the same or similar way as, SUPL signaling 164 in system 100 when LS 226 is an SLP (e.g. H-SLP, D-SLP or E-SLP) and supports the SUPL user plane location solution to locate or provide assistance data to UE 102. Thus, control signaling 246 may include LPP and/or LPPe messages including the message types described in Table 1. Control signaling 246 may enable LS 226 to request and/or receive the location capabilities of UE 102 from UE 102, receive a request for assistance data from UE 102, send assistance data to UE 102 (e.g. if requested by UE 102), request location measurements or a location estimate from UE 102 and receive location measurements or a location estimate from UE 102 (e.g. if first requested by LS 226). Control signaling 246 may support a number of position methods to enable LS 226 to locate UE 102 such as GNSS, Assisted GNSS (A-GNSS), OTDOA applicable to 5G or NG radio access, ECID as applicable to 5G or NG radio access, WiFi positioning, sensor based positioning, Bluetooth or BTLE based positioning. Control signaling 246 may be transferred between LS 226 and UE 102 via 5G BS 222 (or 5G BS 220) and one or more intermediate entities in CN 234 (not shown in FIG. 2) such as a serving MME for UE 102 or an entity similar to a serving MME that supports mobility management and/or session management for 5G or NR radio access for UE 102.

CN domain 214 may comprise an evolution of a CN with location support for a UE with 3G (e.g. WCDMA) and/or 4G (e.g. LTE) wireless access, such as VPLMN EPC 130 and/or HPLMN 140 exemplified in system 100 in the case of LTE, but may include additional capabilities such as an ability to configure location support in RAN domain 212 and obtain location information for UE 102 from RAN domain 212 as previously described. CN domain 214 may include one or more location servers, such as LS 226, which may be part of or associated with CN 234, and be able to support the OMA SUPL location solution and/or a 3GPP control plane location solution. There may be multiple location servers in CN domain 214. Each LS (e.g. LS 226) may support load sharing of location support for UEs, location support for a specific geographic area or a specific network coverage area, one or more position methods that may be distinct from position methods supported by other location servers, and/or some combination of these. In some networks, no location server 226 may be present and instead, location support of a UE 102 may be provided only by RAN domain 212 and/or by D2D domain 210.

A location server 226 in CN domain 214 may support functions of an E-SMLC for location of a UE with 4G LTE access and may then perform actions that are the same as, or similar to, E-SMLC 110 in system 100. Location server 226 may also or instead support functions of an SLP (e.g. an H-SLP, D-SLP or E-SLP) for location of a UE with 4G LTE access and may then perform actions the same as or similar to H-SLP 118 in system 100.

CN domain 214 and LS 226 may support location of UEs such as UE 102 with lower volume, lower capacity, higher latency, higher accuracy and/or higher reliability than RAN domain 112. CN domain 214 and LS 226 may also support location of UE 102 in particular scenarios: (i) in association with an emergency call from UE 102; (ii) while UE 102 is able to access and make location related measurements for multiple RANs such as both RAN domain 212 and other RANs 218; and/or (iii) while positioning methods not associated with measuring TPS or PRS signals are used such as with positioning using A-GNSS or sensors.

CN domain 214 and/or LS 226 may further enable support for location privacy for UE 102 and may interact with external clients (e.g. via GMLC 216 or directly via LS 226) to enable external clients to request and receive location information (e.g. location estimates) for UE 102 and to request additional services such as periodic or triggered location reporting for UE 102.

CN domain 214 (e.g. LS 226 and/or other elements in CN domain 214 such as an MME or an entity similar to an MME) may be enabled to control location support in RAN domain 212 by providing a location configuration to RAN domain 212 (e.g. to LSF 232, 5G BS 220 and/or 5G BS 222)

for UE 102 or for a group of (e.g. all) UEs accessing RAN domain 212. The location configuration that is provided may include requirements and instructions for locating UE 102 or a group of UEs (e.g. all UEs accessing RAN domain 212), as discussed previously. CN domain 214 (e.g. LS 226 and/or other elements in CN domain 214 such as an MME or an entity similar to an MME) may further be enabled to request and receive a location context and/or location information for UE 102 (and/or or for a group of UEs accessing RAN domain 212), wherein the location context includes information related to current and previous locations for UE 102 (or for a group of UEs) as previously discussed and wherein the location information includes a current location estimate for UE 102 (or for each of a group of UEs).

CN domain 214 (e.g. LS 226 and/or other elements in CN domain 214 such as an MME or an entity similar to an MME) may be further enabled to support location for an authenticated UE 102 and possibly for an unauthenticated UE 102 (e.g. if location is requested for an unauthenticated UE 102 that is making an emergency call).

CN domain 214 (e.g. LS 226 or some other entity in CN domain 214) may maintain a location context and/or location configuration for UE 102 that may be similar to, or the same as, the location context and/or location configuration, respectively, that may be maintained for UE 102 in RAN domain 112 (e.g. by LSF 232) as described previously. A location context and/or location configuration for UE 102 maintained by CN domain 214 may be used to support location services for UE 102. A location context for UE 102 maintained by CN domain 214 may include location related information (e.g. current and previous cell IDs, current and previous location related measurements) applicable to other RANs 218 if UE 102 has current or previous access and/or current or previous visibility to BSs and/or APs in other RANs 218. A location configuration for UE 102 maintained by CN domain 214 may enable support for (i) geofencing (e.g., to enable a report to an external client when UE 102 enters, leaves or remains within a particular geographic area), (ii) tracking (e.g., to enable reporting of a location history for UE 102 to an external client), (iii) navigation (e.g., to enable reporting of navigation directions to UE 102), and/or (iv) other location services.

Part of all of a location configuration maintained by CN domain 214 for UE 102 may be transferred to RAN domain 212 (e.g. to 5G BS 220, 5G BS 222 or LSF 232) to provide RAN domain 212 with a location configuration for UE 102. Similarly, part or all of a location context for UE 102 may be transferred from CN domain 214 to RAN domain 212 or vice versa to (i) serve as an initial location context for UE 102, (ii) add to an existing location context for UE 102 and/or (iii) assist with mobility support for UE 102 wherein a location context in a serving BS for UE 102 or in an LSF associated with UE 102 is transferred to the CN domain 214 when UE 102 moves to a new serving BS or becomes temporarily detached from RAN domain 212 and is later transferred back to a new serving BS or new LSF associated with UE 102 (e.g. when UE 102 later reattaches to RAN domain 212).

D2D domain 210 may be an extension or part of RAN domain 212 in some embodiments or may be a separate autonomous domain. D2D domain 210 may help support location of UEs 102 and 103 if one or both UEs are out of radio coverage of RAN domain 212 and CN domain 214, unable to access RAN domain 212 and CN domain 214 (e.g. due to lack of an appropriate subscription) and/or if RAN domain 212 or CN domain 214 have insufficient capacity and resources to support location adequately for all UEs. UEs 102 and 103 may exchange control signaling 280 to discover one another and/or to coordinate location support. For example, UE 102 and/or UE 103 may measure TPS or PRS signals transmitted from the other UE (e.g. may measure RSSI, RTT, AOA, RSRP and/or RSRQ) and may request, transfer and/or assist these measurement by exchanging control signaling 280. UE 102 (and UE 103) may coordinate with other UEs (not shown in FIG. 2) to obtain or enable additional measurements of TPS or PRS signals transmitted by these UEs and/or additional measurements by these UEs of TPS or PRS signals transmitted by UE 102 (and UE 103). The location measurements may be returned to LSF 232 and/or to LS 226 to enable determination of a location for UE 102 (and UE 103) by LSF 232 and/or LS 226 or may be used by UE 102 (and UE 103) to determine a location or relative location of UE 102 (and UE 103). The location measurements and determined locations for UE 102 and UE 103 may be used to help support direct signaling being UEs 102 and 103 (e.g., LTE-Direct or WiFi-Direct), discovery by UE 102 of UE 103 and/or vice versa, and/or various peer to peer communication services.

Figure 3:
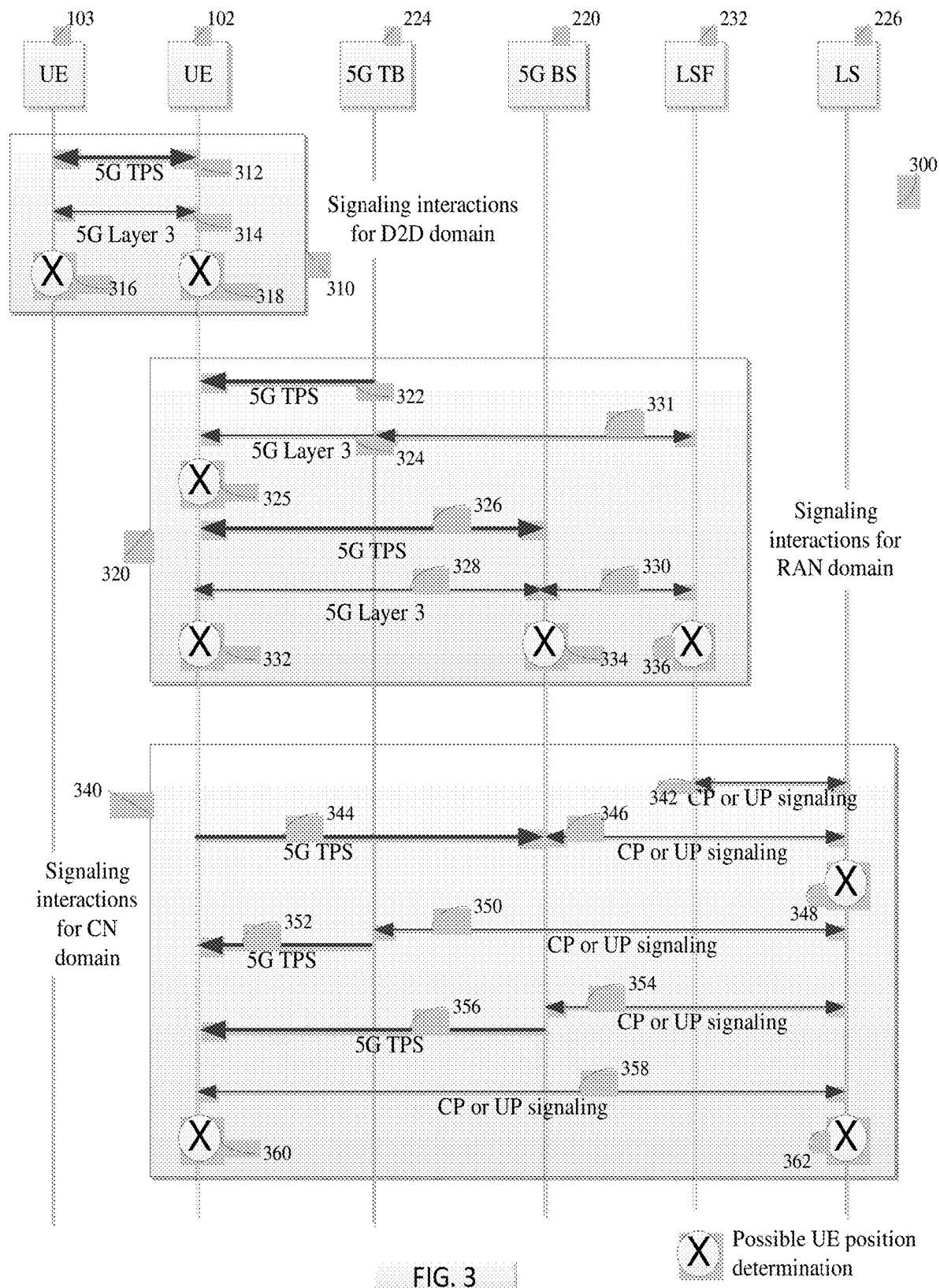
FIG. 3 is a message flow diagram in accordance with certain example implementations.

FIG. 3 shows a signaling flow 300 applicable to system 200 that enables support of location services by D2D domain 210, RAN domain 212 and CN domain 214 in system 200. Signaling flow 300 comprises three sets of signaling interactions 310, 320 and 340 that may each occur in isolation or in association with one another. Signaling interactions 310 support positioning of UE 102 using the D2D domain 210; signaling interactions 320 support positioning of UE 102 using the RAN domain 212; and signaling interactions 340 support positioning if UE 102 using the CN domain 214. For ease of interpretation of FIG. 3, control signaling between pairs of entities is shown using arrows with an allowed direction of transfer shown by an arrow (e.g. with a double arrow indicating allowance of bidirectional signaling transfer). Radio frequency TPS or PRS signals sent between pairs of entities are shown using bold arrows where an arrow again indicates a possible transmission direction. The arrows can correspond to point to point transfer (e.g. directional transfer of PRS/TPS signals using an antenna array or targeted transfer of control signaling) as well as use of broadcast.

For simplicity (and as also applicable to FIG. 2), only one instance of control signaling and/or one instance of TPS signaling (which may be unidirectional or bidirectional) is shown in FIG. 3 between certain pairs of interacting entities. However, this is not intended to imply that one and only one signaling message would be transferred from one entity to another in the case of control signaling or that one and only one type of TPS signal would be transmitted from one entity to the other in the case of TPS signals. Instead, the arrows are to be understood as indicating the transfer of a plurality of zero, one or more signaling messages from one entity to the other in the direction shown by an arrow in the case of control signaling and the transmission of zero, one or more TPS signals from one entity to the other in the direction shown by an arrow in the case of TPS signals. In addition, where bidirectional transfer is indicated (using a double arrow), the signaling messages and the TPS signals sent in each direction may be the same, similar, or different. Furthermore, in some embodiments, control signaling and/or TPS transmission may be sent from one entity to another that is not indicated in FIG. 3.

The numbered elements in FIG. 3 (UE 102, UE 103, 5G BS 220, 5G TB 224, LSF 232 and LS 226) correspond to the like numbered elements in FIG. 2 and may perform exactly the same functions. Each small circle containing an "X" in FIG. 3 indicates a possible event at an entity where a location estimate for UE 102 or possibly for UE 103 may be determined by the entity (e.g. using location measurements and other information previously received in control signaling). Other elements in system 200 are omitted from FIG. 3 for clarity. The control signaling and transmission of TPS or PRS signals shown in FIG. 3 largely mirrors that shown in FIG. 2 but is shown in more detail in order to better clarify support of location services by D2D domain 210, RAN domain 212 and CN domain 214 in system 200.

Signaling interactions 310 for D2D domain 210 include transmission of one or more TPS signals 312 for a 5G or NR radio interface from UE 102 to UE 103 and/or from UE 103 to UE 102. TPS signals 312 may be sent on request (e.g., if one UE sends a control signaling request to the other) or if triggered by receipt of other TPS signals 312 or for other reasons. UE 102 or/and UE 103 that receives TPS signals 312 may make location related measurements of TPS signals 312, for example measurements of RSSI, RTT, AOA, RSRP, RSRQ, and/or RSTD as described previously. Signaling interactions 310 also include transmission of one or more control signaling messages 314 that may correspond to messages for a 5G or NR radio signaling layer 3. Control signaling 314 may be used by UE 102 and/or UE 103 to instigate and coordinate sidelink positioning of one or both UEs in which one or both UEs obtain measurements of TPS signals 312 transmitted by the other UE and possibly send the measurements to the other UE using control signaling 314. Following exchange of TPS signals 312 and control signaling 314, UE 103 may determine a location for UE 103 and/or for UE 102 at 316 and/or UE 102 may determine a location for UE 102 and/or for UE 103 at 318, using measurements of TPS signals 312 that were made locally and/or measurements of TPS signals 312 that were sent by the other UE.

Signaling interactions 320 for RAN domain 212 include the TPS signals, control signaling and determination of a location for UE 102 shown in FIG. 3. 5G TB 224 may transmit one or more TPS signals 322 (e.g. may broadcast the signals) which may be for a 5G or NR radio interface. The TPS signals 322 may be sent at fixed periodic intervals or may be sent at irregular intervals (e.g. if UEs such as UE 102 are to be positioned). Sending of TPS signals 322 may be controlled by LSF 232—e.g. if positioning of a UE 102 is requested. UE 102 may make location related measurements of TPS signals 322 which may include measurements of RSSI, RTT, AOA, RSRP, RSRQ and/or RSTD measurements.

Control signaling 324 sent by 5G TB 224 to UE 102 (e.g. sent via broadcast or multicast) may provide different types of assistance data to UE 102 to assist UE 102 to measure TPS signals 322, to assist UE 102 to determine a location from measurements of TPS signals 322 and/or to assist UE 102 to measure other TPS signals and signals from other sources (e.g. GNSS SVs) and possibly compute an estimated location of UE 102 from such measurements. As an example, a transmission schedule for the future transmission times of TPS signals 322 may be provided to UE 102 and possibly other UEs by 5G TB 224 using control signaling 324. A UE 102 receiving the transmission schedule for TPS signals 322 may determine times to assign resources to measure TPS signals 322. Control signaling 324 sent by 5G TB 224 to UE 102 may also provide other details of TPS signals 322 such as the frequency or frequencies, bandwidth, coding and/or muting pattern (if any) for TPS signals 322. Control signaling 324 sent by 5G TB 224 may also or instead provide other location related information such as location coordinates for 5G TB 224, the precise current time (e.g. a GPS time or a Coordinated Universal Time (UTC)), time synchronization or time difference information for TPS signals 322 (e.g. relative to GPS time or TPS timing of 5G TB 224), and/or similar TPS and location related information (e.g. such as location coordinates and TPS parameters) for other 5G TBs and/or 5G BSs such as 5G BS 220. Control signaling 324 may also or instead provide assistance data related to other types of positioning such as by providing information useful for GNSS positioning such as GNSS ephemeris data, GNSS almanac data, SV Doppler shifts, SV carrier phase measurements at a GNSS reference receiver applicable to RTK (e.g. at a GNSS reference receiver co-sited with 5G TB 224), ionospheric propagation data, and/or tropospheric propagation information.

After obtaining measurements of TPS signals 322 and possibly of other signals (e.g., GNSS SV navigation signals), UE 102 may use the obtained measurements and possibly any assistance data received in control signaling 324 to determine or help determine a location for UE 102 at 325.

Similarly to 5G TB 224, 5G BS 220 may transmit (e.g., via multicast or broadcast) one or more TPS signals 326 and control signaling 328 to or towards UE 102. TPS signals 326 and control signaling 328 sent by 5G BS 220 may be similar to or the same as TPS signals 322 and control signaling 324, respectively, sent by 5G TB 224 as described previously, but with control signaling 328 providing information primarily for TPS signals 326 and for 5G BS 220 rather than primarily for TPS signals 322 and for 5G TB 224. UE 102 may obtain location related measurements of TPS signals 326 sent by 5G BS 220 that be similar to or the same as location related measurements described previously for TPS signals 322. However, unlike interaction with 5G TB 324, UE 102 may transmit one or more TPS signals 326 that may be measured by 5G BS 220 or by an LMU associated with 5G BS 220. UE 102 transmission of TPS signals 326 may be controlled (e.g. scheduled) by 5G BS 220 using control signaling 328 or by standalone LSF 232 using control signaling 330 and 328 as described later.

In an embodiment, control signaling 328 and/or control signaling 324 may be performed according to a Radio Resource Control (RRC) protocol (e.g. for 5G or NR radio access).

5G BS 220 may obtain measurements, such as of RSSI, RTT, AOA, RSRP and/or RSRQ, for TPS signals 326 transmitted by UE 102. 5G BS 220 (or an LSF integrated in 5G BS 220) or standalone LSF 232 may use control signaling 328 or control signaling 328 and 330, respectively, to control or coordinate (i) measurements by UE 102 of TPS signals 326 transmitted by 5G BS 220, and/or (ii) TPS signals 326 transmitted by UE 102 that are measured by 5G BS 220. UE 102 may use control signaling 328 to send to 5G BS 220 any measurements made by UE 102 of (i) TPS signals 326 transmitted by 5G BS 220 and/or (ii) TPS signals 322 transmitted by 5G TB 224. In addition or instead, 5G BS 220 (or an LSF integrated in 5G BS 220) may use control signaling 328 to send to UE 102 any measurements made by 5G BS 220 of TPS signals 326 transmitted by UE 102. While used to schedule measurements by UE 102 of TBS signals 322 or 326 or to transfer measurements from UE 102 to 5G BS 220 or from 5G BS 220 to UE 102, control signaling 328 may be used in a point to point manner (e.g. if there is an association or signaling connection between UE 102 and 5G BS 220) rather than in a broadcast message. Following these measurements and possible transfer of measurements, UE 102 or 5G BS 220 (or an LSF integrated in 5G BS 220) may determine a location for UE 102 using these measurements (that were obtained locally or received using control signaling 328) at 332 or 334, respectively.

In some implementations, 5G BS 220 may contain an integrated LSF in which case 5G BS 220 (or the LSF integrated in 5G BS 220) may assist UE 102 to obtain a location for UE 102 or may obtain a location for UE 102 itself, as just described for RAN domain signaling interactions 320. Other functions for an integrated LSF in 5G BS 220, such as support of a location context or location configuration for UE 102, may be the same as or similar to functions described further on for a standalone LSF 232.

In some implementations, a standalone LSF 232 may be deployed in RAN domain 212 with connections (e.g. direct or indirect) to other entities in RAN domain 212 such as 5G BS 220 and 5G TB 224. Standalone LSF 232 may use these connections to exchange control signaling 330 and/or 331 with 5G BS 220 and/or 5G TB 224, respectively. Standalone LSF 232 may send control signaling 330 to 5G BS 220 to configure TPS signals 326 sent (e.g. broadcast) by 5G BS 220 such as by providing TPS configuration information including transmission scheduling, bandwidth, frequencies, coding, muting etc. Standalone LSF 232 may also send assistance data to 5G BS 220 in control signaling 330 to be later sent by 5G BS 220 to UE 102 in control signals 328 and corresponding to one or more of the different types of assistance data described previously that may be sent by 5G BS 220 or by 5G TB 224 to UE 102. Standalone LSF 232 may also send a request to 5G BS 220 in control signaling 330 for configuration information (e.g. parameters) for TPS signals 326 sent by 5G BS 220 and/or for other information related to 5G BS 220 such as location coordinates. 5G BS 220 may then return the requested information in control signaling 330 to standalone LSF 232. Analogous to this interaction with 5G BS 220, standalone LSF 232 may use control signaling 331 to send configuration information for TPS signals 322 to 5G TB 224, to send assistance data to 5G TB 224 and/or to request and receive configuration information for TPS signals 322 sent by 5G TB 224 and/or other information related to 5G TB 224.

Standalone LSF 232 may also or instead use control signaling 330 to request or schedule measurements of TPS signals 322 and/or 326 by UE 102, to request and receive measurements from UE 102 and/or to send assistance data to UE 102. In this case, a signaling message sent by standalone LSF 232 to 5G BS 220 using control signaling 330 may be forwarded or relayed by 5G BS 220 to UE 102 using control signaling 328 and possibly with protocol conversion by 5G BS 220. The forwarding at 5G BS 220 may use point to point means to send control signaling 328 to UE 102 (e.g. if there is an association or signaling connection between UE 102 and 5G BS 220) or may use broadcast to send information to UE 102 and possibly to other UEs—e.g. in the case of assistance data sent by standalone LSF 232. Transfer of control signaling in the reverse direction from UE 102 to standalone LSF 232 via 5G BS 220 with forwarding or relaying by 5G BS 220 and possibly with protocol conversion by 5G BS 220 may occur in a similar manner. Standalone LSF 232 may then use control signaling 330 and 328 (e.g. with forwarding or relaying by 5G BS 220) to (i) send assistance data to UE 102 (e.g. assistance data to help UE measure TPS signals 322 and/or 326 sent by 5G TB 224 and/or 5G BS 220, respectively, and/or assistance data for location sources such as GNSS or RTK); (ii) schedule or request measurements by UE 102 of TPS signals 322 and/or 326 sent by 5G TB 224 and/or 5G BS 220, respectively, and/or of other signals sent by other sources such as GNSS SVs; and/or (iii) receive measurements from UE 102 and made by UE 102 of TPS signals 322 and/or 326 sent by 5G TB 224 and/or 5G BS 220, respectively.

In some embodiments, UE 102 may use control signaling 328 to send positioning capabilities of UE 102 to 5G BS 220. The positioning capabilities of UE 102 may indicate the position methods, location measurements (e.g. of RSSI, RTT, AOA, S/N, RSTD, RSRP, and/or RSRQ) and/or assistance data supported by UE 102. 5G BS 220 may forward any positioning capabilities received from UE 102 to either an integrated LSF 232 in 5G BS 220 or to a standalone LSF 232 using control signaling 330. In some embodiments, UE 102 may send positioning capabilities of UE 102 to 5G BS 220 if requested by 5G BS 220 or by an integrated LSF 232 in 5G BS 220 using control signaling 328, or if requested by a standalone LSF 232 using control signaling 330 and 328 relayed through 5G BS 220. Standalone LSF 232 or an LSF 232 integrated in 5G BS 220 may use any positioning capabilities of UE 102 to determine, or help determine, assistance data to be sent to UE 102 and/or particular location measurements (e.g. of TPS signals 322 and 326 or of signals from SVs 160) to be requested from UE 102.

Standalone LSF 232 may also or instead use control signaling 330 to (i) send assistance data to 5G BS 220 (e.g. assistance data to help 5G BS 220 measure TPS signals 326 sent by UE 102), (ii) schedule or request measurements by 5G BS 220 (or an LMU associated with 5G BS 220) of TPS signals 326 sent by UE 102, and/or (iii) receive measurements from 5G BS 220 and made by 5G BS 220 of TPS signals 326 sent by UE 102. Following receipt, as just described, of location related measurements made by UE 102 and/or made by 5G BS 220, standalone LSF 232 may compute a location for UE 102 at 336 based at least in part on these measurements.

As described previously, standalone LSF 232 or an LSF integrated in 5G BS 220 may have a location configuration for UE 102 and/or a location context for UE 102, one or both of which may be initially provided by CN domain 214 (e.g. by LS 226). The various actions described previously for standalone LSF 232 and 5G BS 220 (or an LSF integrated in 5G BS 220) with regard to scheduling location measurements by UE 102, sending assistance data to UE 102 and/or requesting and receiving location measurements made by UE 102, or made by 5G BS 220 of UE 102, may be partly or completely defined by the location configuration for UE 102. For example, the location configuration may define or indicate (i) if a location estimate for UE 102 is to be obtained (e.g. periodically and/or when certain trigger events occur); (ii) which types of assistance should be or can be sent to UE 102 (e.g. assistance data to assist measurement of TPS signals 322 and/or 326 or assistance data to assist UE 102 measurements and possibly location computation for GNSS or RTK); (iii) which types of location measurements can or should be requested from UE 102 and/or from 5G BS 220; and/or (iv) a particular level of location accuracy and/or latency may be needed for any estimated location of UE 102.

Standalone LSF 232 or an integrated LSF in 5G BS 220 may also store location related information for UE 102 in a location context, which may include location estimates obtained for UE 102, location measurements obtained from or of UE 102, a current serving BS for UE 102, and/or a current serving cell for UE 102. Standalone LSF 232 or an integrated LSF in 5G BS 220 may use a location context for UE 102 to improve location support for UE 102 (e.g. by knowing in advance which BSs can make measurements of UE 102 or can be measured by UE 102) and to assist location services to external clients—e.g. by enabling a location history or a last known location for UE 102 to be provided to an external client.

Signaling interactions 340 for CN domain 214 may include TPS signals, control signaling and determination of an estimated location of UE 102 shown in FIG. 3. 5G TB 224 may transmit one or more TPS signals 352 (e.g. may broadcast the signals) which may correspond to TPS signals 322 described previously and may be measured by UE 102 as described previously for UE 102 measurement of TP signals 322. 5G BS 220 may transmit one or more TPS signals 356 (e.g. may broadcast the signals) which may correspond to TPS signals 326 described previously when sent by 5G BS 220. TPS signals 356 may be also measured by UE 102 as described previously for UE 102 measurement of TP signals 326 transmitted by 5G BS 220. UE 102 may transmit TPS signals 344 which may correspond to TPS signals 326 described previously when sent by UE 102. TPS signals 344 may be also measured by 5G BS 220 (or by an LMU associated with 5G BS 220) as described previously for 5G BS 220 measurement of TPS signals 326 transmitted by UE 102. Transmission and/or measurement of TPS signals 344, 352 and/or 356 may be controlled at least in part by CN domain 214 such as by LS 226 associated with CN domain 214. In the description that follows, it is assumed that control of measurement and/or transmission of TPS signals 344, 352 and/or 356 as well as other interactions are performed by LS 226, but in some embodiments, at least some of these actions may be performed by other elements in CN domain 214 such as by an MME, a PDG or other elements in 5G CN 234 similar to or corresponding to these.

LS 226 may exchange control signaling 342 with standalone LSF 232, control signaling 346 and 354 with 5G BS 220 (or with an integrated LSF in 5G BS 220), control signaling 358 with UE 102, and control signaling 350 with 5G TB 224. Control signaling 342, 346, 350, 354 and 358 may be control signaling for a control plane location solution (e.g. when LS 226 supports a control plane solution) or control signaling for a user plane location solution (e.g. when LS 226 is a SUPL SLP). As described previously, control signaling for a user plane solution may be transferred as data messaging within a network using such protocols as IP and TCP while control signaling for a control plane solution is transferred using existing network interfaces and protocols and appearing as control signaling rather than as data to immediate entities.

In an embodiment, in order to improve signaling efficiency for CN domain 214, control signaling 342, 346, 350, 354 and/or 358, when sent as part of a control plane location solution, may be transferred (e.g. via intermediate entities) similar to or the same as data using, for example, IP, UDP, TCP and/or SCTP as transport protocols. This embodiment may also be used in RAN domain 212 to transfer control signaling 330 and 331 between standalone LSF 232 and 5G BS 220 and 5G TB 224, respectively, the same as data. In this embodiment, control signaling 342, 346, 350, 354 and/or 358 (and/or control signaling 330 and 331) may only be visible to endpoints for transmission and reception (e.g. may be visible to UE 102, LSF 232, 5G BS 220, 5G TB 224 and LS 226), but may be seen and transferred as data by intermediate entities such as (i) an MME or entity similar to an MME in CN domain 214 or (ii) 5G BS 220. This embodiment may reduce impacts to support control signaling 342, 346, 350, 354 and/or 358 by CN domain 214 and/or RAN domain 212, may reduce signaling delay and latency and/or may increase network capacity by enabling a greater volume of control signaling supporting location for more UEs. In addition, the embodiment may reduce differences between control plane location support and user plane location support at UE 102 and LS 226, thereby reducing implementation impact and cost when both location solutions are supported. The embodiment may also facilitate support of control signaling 342, 346, 350, 354 and/or 358 by LS 226 when LS 226 supports user plane location, which may enable additional location support from RAN domain 212 for LS 226 as described later herein. This embodiment may contrast with existing support of user plane location as described previously for system 100 where an SLP such as H-SLP 118 may not normally be enabled to access location information and/or control location activity in a RAN domain such as RAN domain 212.

Although supporting control signaling 342, 346, 350, 354 and/or 358 similar to data in the case of a control plane location solution may reduce differences with a user plane solution such as SUPL, the two solutions may still remain different in some aspects. For example, access from an external client to LS 226 when supporting control plane location may be via a GMLC such as GMLC 216 or via a GMLC and an LRF. In contrast, access to LS 226 when supporting a user plane location solution may be direct, via an LRF but not a GMLC, or via the Internet (e.g. using the OMA MLP protocol). Such different types of access, though adding to network implementation, may be useful to operators who need to support existing control plane and/or user plane location solutions for other radio access types such as 4G LTE as previously exemplified in system 100, because it may enable the same type of common access from an external client regardless of whether a UE 102 has 5G radio access as in system 200 or 4G radio access as in system 100 or some other radio access. This common access may enable common location support to an external client regardless of the radio access type being used by UE 102. For example, in the case of control plane location, an external client may send a location request for UE 102 to GMLC 216 in system 200 (e.g., directly or via one or more other GMLCs and possibly the Internet). GMLC 216 may then determine the serving network and a serving node (e.g., an MME such as MME 108 for 4G LTE access or a Mobile Switching Center (MSC) for 2G or 3G access) for UE 102 (e.g., by querying HSS 145). GMLC 216 may then forward the location request to the serving node in the serving network which may forward the location request to an LS such as E-SMLC 110 when UE 102 has 4G LTE access according to system 100 or LS 226 when UE 102 had 5G access according to system 200. The LS can then obtain a location for UE 102 (e.g., as described previously for system 100 in the case of LTE access and as described previously for system 200 in the case of 5G radio access) and return the location to the external client via the serving node and GMLC 216. Such a solution may support a location request from an external client for several types of cellular access (e.g. 2G, 3G, 4G or 5G) by UE 102 and without requiring the external client to know which cellular access type is currently being used by UE 102.

LS 226 may send control signaling 342 to standalone LSF 232 or control signaling 346 to an integrated LSF in 5G BS 220 in order to transfer to either entity location configuration for UE 102, a location context for UE 102, location information for UE 102 (e.g. in response to a request) or a request for one or more of these items. Similarly, standalone LSF 232 may send control signaling 342 to LS 226, or an integrated LSF in 5G BS 220 may send control signaling 346 to LS 226, in order to transfer to LSF 226 a location configuration for UE 102, a location context for UE 102, location information for UE 102 (e.g. in response to a request from LS 226) or a request for one or more of these items. A location configuration and location context for UE 102 may be as described previously and may be used by standalone LSF 232 or an integrated LSF in 5G BS 220 as described previously for signaling interactions 320 in RAN domain 212.

LS 226 may create, update and/or store a location configuration for UE 102 based at least in part on subscription data for UE 102 (e.g. which may be configured in LS 226 for UE 102 or may be provided to LS 226 by another element in CN domain 214 such as an MME or an entity similar to an MME). LS 226 may also or instead create, update and/or store a location configuration for UE 102 based on network preferences for all UEs (e.g. configured in LS 226) or based on a location service request for UE 102—e.g. received directly or indirectly (e.g. via GMLC 216) from an external client or an internal client belonging to or associated with CN domain 214. The location configuration may include information described previously such as requirements for periodic location, triggered location and/or location accuracy for UE 102.

LS 226 may also or instead create, update and/or store a location context for UE 102 which may contain location information obtained for UE 102 by LS 226 such a last known location, previous locations, previous location measurements, a last known and/or previous serving cell IDs, and/or last known and/or previous serving BS IDs. LS 226 may request a location context for UE 102 from an LSF in RAN domain 212 (e.g. standalone LSF 232) as just described and may combine the received location context with any location context already stored by LS 226 for UE 102.

LS 226 may transfer a stored location configuration and/or a stored location context for UE 102 to standalone LSF 232 or to an integrated LSF in 5G BS 220 for use in RAN domain 212 as previously described for signaling interactions 320 in RAN domain 212. LS 226 may select standalone LSF 232 or an integrated LSF in 5G BS 220 based on 5G BS 220 being a serving BS for UE 102 and/or (if selecting standalone LSF 232) standalone LSF 232 being associated with (e.g. connected to) a serving BS for UE 102. Alternatively, LS 226 may select standalone LSF 232 or an integrated LSF in 5G BS 220 based on load sharing requirements and/or positioning and location service capabilities of standalone LSF 232 or an integrated LSF in 5G BS 220 (e.g. such as support of certain position methods and/or support of certain location services like periodic or triggered location). LS 226 may also receive a location context from standalone LSF 232 or an integrated LSF in 5G BS 220 and later transfer the location context to another (or the same) standalone LSF or integrated LSF in order to support mobility of UE 102 (e.g. cell change or handover) and detachment of UE 102 from, and later re-attachment of UE 102 to, RAN domain 212 and CN domain 214 (e.g. if UE 102 temporarily loses radio coverage or goes into idle state to reduce network resource and/or battery power usage).

LS 226 may request and receive location information from standalone LSF 232 or an integrated LSF in 5G BS 220 using control signaling 342 or 346, respectively. The location information may include a location estimate for UE 102, a last known location for UE 102, a location history for UE 102 and/or location measurements for UE 102. Location measurements for UE 102 may be obtained by UE 102 of TPS signals 352 and/or 356 or of other signals such as GNSS signals or may be obtained by 5G BS 220 (and/or by other BSs or LMUs) of TPS signals 344 transmitted by UE 102. LS 232 may use received location information to determine or help determine a location estimate for UE 102 which may then be provided to an external client or internal client of CN domain 214 (not shown in FIG. 3). Actions of LS 226 may be triggered in part by location requests received by LS 232 (e.g. according to a control or user plane location solution) from an external client or internal client of CN domain 214.

LS 226 may send control signaling 354 (and/or 346) to 5G BS 220 to configure TPS signals 356 (and/or 326) sent (e.g. broadcast) by 5G BS 220 to UEs such as UE 102. Control signaling 354 sent by LS 226 may provide configuration information for TPS signals 356 such as including transmission scheduling, bandwidth, frequencies, coding, muting etc. LS 226 may also or instead send assistance data to 5G BS 220 in control signaling 354 (and/or 346) to be later sent by 5G BS 220 to UE 102 in control signals 328. The configuration information and assistance data may correspond to that described previously as being sent in some embodiments from a standalone LSF 232 to 5G BS 220. For example, the assistance data may include information to assist a UE 102 to measure TPS signals 356 (and/or 326) transmitted by 5G BS 220, to measure TPS signals transmitted by other BSs and TBs (e.g. 5G TB 224) and/or to measure other signal sources such as GNSS SVs. LS 226 may also send a request to 5G BS 220 in control signaling 354 (and/or 346) for configuration information (e.g. parameters) for TPS signals 356 (and/or 326) transmitted by 5G BS 220 and/or for other information related to 5G BS 220 such as location coordinates. 5G BS 220 may then return the requested information in control signaling 354 (and/or 346) to LS 226. Analogous to this interaction with 5G BS 220, LS 232 may use control signaling 350 to: (i) send configuration information for TPS signals 352 (and/or 322) to 5G TB 224; (ii) send assistance data to 5G TB 224 for onward transmission (e.g. via broadcast) to UEs such as UE 102; and/or (iii) request and receive configuration information for TPS signals 352 (and/or 322) transmitted by 5G TB 224 and/or for other information related to 5G TB 224. The interactions using control signaling between LS 226 and 5G BS 220 and between LS 226 and 5G TB 224 may be the same as or similar to the interactions using control signaling between standalone LSF 232 and 5G BS 220 and between standalone LSF 232 and 5G TB 224, respectively, in terms of the information transferred If LS 226 is to obtain a location for UE 102 (e.g. due to receiving a location request for UE 102 from an external client or an internal client in CN domain 214), LS 226 may send control signaling 346 to 5G BS 220 to request 5G BS 220 to measure TPS signals 344 transmitted by UE 102 and/or to measure other uplink signals transmitted by UE 102 not normally intended for positioning (e.g. signals used primarily to transfer control information, voice or data). The measurements requested from 5G BS 220 may include measurements of RSSI, RTT, AOA, RSRP, and/or RSRQ, to name a few examples. LS 226 may also or instead send control signaling 346 to 5G BS 220 to request measurements made by UE 102 if such measurements are available to 5G BS 220 (e.g., due to having been sent by UE 102 to 5G BS 220 in control signaling 328). The requested measurements made by UE 102 may include measurements of TPS signals 356 transmitted by 5G BS 220 and/or of other signals transmitted by 5G BS 220 (e.g., such as signals used to transfer control information or data), and/or (ii) measurements made by UE 102 of signals transmitted by other BSs and/or TBs. 5G BS 220 may then send control signaling 346 to LS 226 to return any measurements made by 5G BS 220 that were requested by LS 226, and/or return any measurements made by UE 102 that are available to 5G BS 220 and that were requested by LS 226. LS 226 may use measurements returned by 5G BS 220 in control signaling 346 to determine or help determine a location estimate for UE 102 at 348.

Similar to obtaining measurements from 5G BS 220 to obtain a location for UE 102, LS 226 may send control signaling 358 to UE 102 to request UE 102 to measure (i) TPS signals 356 transmitted by 5G BS 220; (ii) other signals transmitted by 5G BS 220 (e.g. such as signals used to transfer control information or data); (iii) TPS and/or other signals transmitted by other BSs and/or other TBs (e.g. 5G TB 224); and/or (iv) signals transmitted by other sources such as BSs and/or TBs in other RANs 218 or SVs 160. The measurements requested by LS 226 may support one or more position methods including ECID, OTDOA, A-GNSS, WiFi, Bluetooth, sensors, to name a few examples. In the case of ECID, the requested measurements may include measurements of RSSI, RTT, S/N, AOA, RSRP and/or RSRQ for TPS or other signals sent by BSs and TBs such as 5G BS 220 and 5G TB 224. In the case of OTDOA, the requested measurements may include measurements of RSTD and/or TOA for TPS or other signals sent by BSs and TBs such as 5G BS 220 and 5G TB 224. In the case of A-GNSS, the requested measurements may include measurements of pseudoranges, code phase values and/or carrier phase values for one or more SVs 160 in one or more GNSSs. To assist UE 102 to obtain the requested measurements and/or possibly to assist UE 102 to compute a location estimate using these measurements, LS 226 may send assistance data to UE 102 in control signaling 358.

To know in advance the positioning capabilities of UE 102 (e.g. indicating which location measurements, position methods and assistance data are supported by UE 102), LS 226 may exchange control signaling 358 with UE 102 to request and obtain the positioning capabilities of UE 102 or may receive the positioning capabilities of UE 102 unsolicited from UE 102 in control signaling 358. UE 102 may obtain some or all of the location measurements requested by LS 232. UE may then compute a location estimate for UE 102 at 360 and/or may return the location measurements, or a computed location estimate, to LS 232 using control signaling 358, after which LS 226 may determine a location for UE 102 at 362 using the returned location measurements or location estimate.

In an embodiment, control signaling 342, 346, 350 and/or 354 may use the 3GPP LPPa protocol with additional messages and/or additional parameters compared to existing LPPa. For example, the additional messages and/or parameters in LPPa may be used to support positioning methods, information transfer and/or retrieval and configuration of TPS signals for a 5G or 5G NR radio access by UEs such as UE 102.

In another embodiment, control signaling 358 may use the 3GPP LPP positioning protocol and/or the combined LPP/LPPe positioning protocol which may include additional messages and/or additional parameters compared to existing LPP and/or existing LPPe. For example, the additional messages and/or parameters in LPP and/or LPPe may be used to request and return location measurements, request and return assistance data, transfer unsolicited assistance data, request and return UE positioning capabilities for position methods associated with a 5G or 5G NR radio access by UEs such as UE 102.

Figure 4:
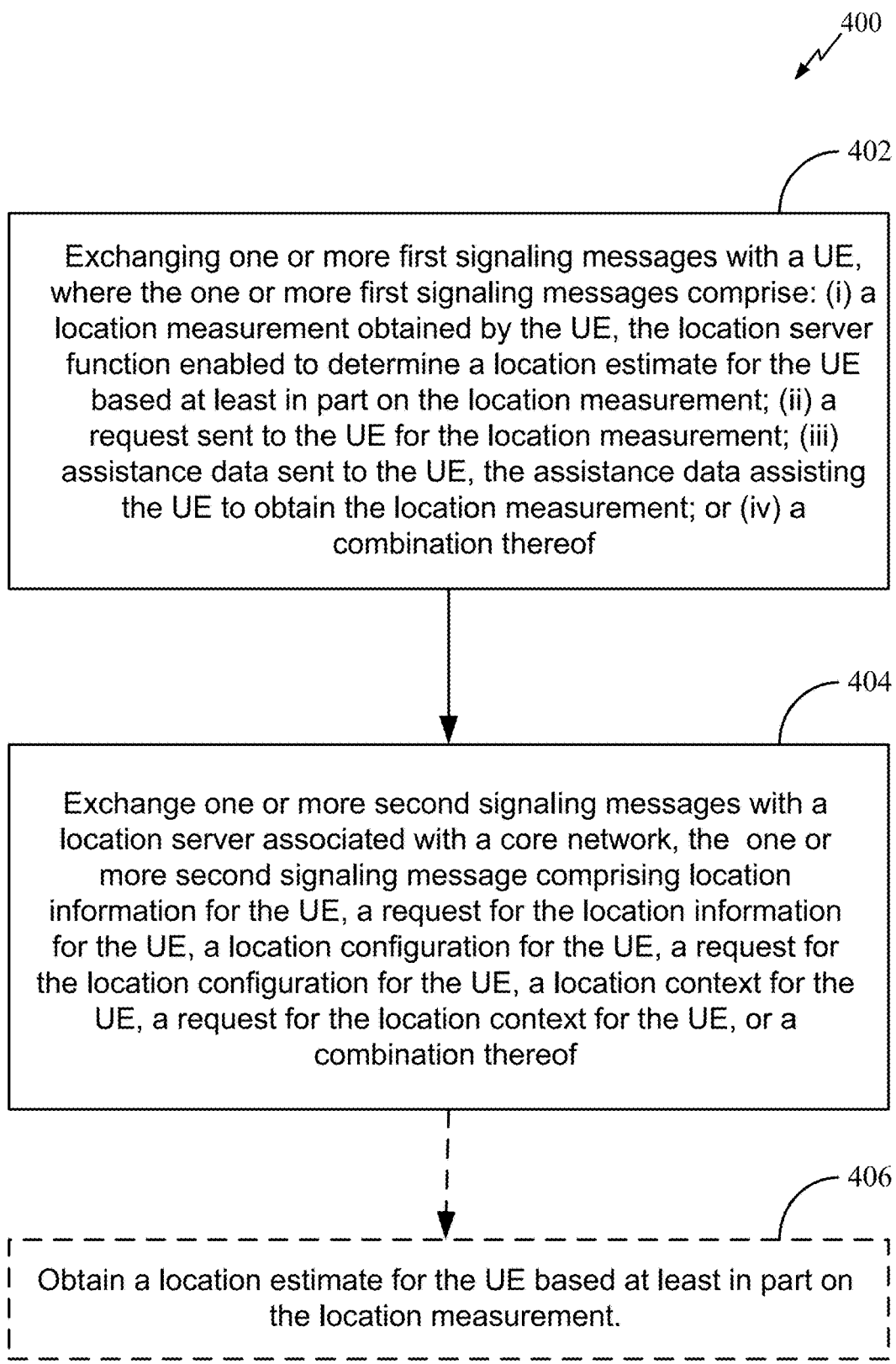
FIGS. 4-6 are flow diagrams for processes for providing positioning services according to various embodiments.

FIG. 4 is a flow diagram for a process 400 for providing positioning services to a UE accessing a RAN according to an embodiment. The positioning services may include obtaining an estimated location for the UE. The UE may correspond to UE 102 or UE 103 in FIGS. 1-3. In one implementation, the process 400 may be performed by one or more processors of a base station, access point or a location server function in a RAN as discussed previously. In an implementation, the process 400 may be performed by certain elements in FIGS. 2-3 comprising (i) a standalone LSF 232, (ii) an LSF 232 integrated in 5G BS 220 or in 5G BS 222, or (iii) 5G BS 220 or 5G BS 222. For example, a base station or integrated LSF having features shown by device 704 of FIG. 7 may perform the actions for process 400, at least in part, by execution of instructions stored on memory 722 by processing unit 720. Furthermore, communication interface 730 in combination with processing unit 720 may be used to transmit and receive messages/signals/control signaling in data links in support of providing location services to UEs in a RAN domain. In an alternative implementation, the process 400 may be performed by a standalone LSF 232 acting as a standalone entity. For example a standalone LSF having features shown by device 904 of FIG. 9 may perform actions for process 400, at least in part, by execution of instructions stored on memory 922 by processing unit 920. Furthermore, communication interface 930 in combination with processing unit 920 may be used to transmit and receive messages/signals/control signaling in data links in support of providing location services to a UE. It should be understood that the example structures for performing actions set forth in process 400 are merely example structures, and that claimed subject matter is not limited to these particular structures. Furthermore, the actions described for process 400 may be performed in various orders and actions may be omitted or added. For ease of description, process 400 is described as being performed by an LSF (e.g. a standalone LSF 232 or an LSF 232 integrated in 5G BS 220) but may also be performed by a BS (e.g. 5G BS 220) as just described.

At block 402 for process 400, the LSF exchanges a plurality of one or more first signaling messages with the UE, one or more first signaling messages comprising: (i) a location measurement received from the UE; (ii) a request sent to the UE for the location measurement; (iii) assistance data sent to the UE; or (iv) some combination of these. For case (i) where a location measurement is received from the UE, the LSF may be enabled to determine a location estimate for the UE based at least in part on the location measurement. For case (iii) where assistance is sent to the UE, the assistance data may assist the UE to obtain the location measurement. One or more first signaling messages may correspond to control signaling 328 in signaling flow 300 in the case of an LSF integrated in 5G BS 220 or control signaling 328 plus control signaling 330 in signaling flow 300 in the case of a standalone LSF 232, as described previously herein.

At block 404 for process 400, the LSF exchanges a plurality of one or more second signaling messages with a location server associated with a core network. One or more second signaling message may comprise location information for the UE, a request for the location information for the UE, a location configuration for the UE, a request for the location configuration for the UE, a location context for the UE, a request for the location context for the UE, or some combination of these. One or more second signaling messages may correspond to control signaling 342 in signaling flow 300 in the case of a standalone LSF 232 or to control signaling 346 and/or 354 in the case of an LSF integrated in 5G BS 220.

When the LSF corresponds to a standalone LSF, such as standalone LSF 232, one or more first signaling messages may be exchanged with the UE using an intermediate base station such as 5G BS 220. In that case, one or more first signaling messages may undergo protocol conversion at the intermediate base station. For example, this may be as described previously for signaling flow 300, where standalone LSF 232 sends and receives control signaling 330 via standalone 5G BS 220, with standalone 5G BS 220 forwarding or relaying the control signaling to or from UE 102 as control signaling 328. 5G BS 220 may then perform protocol conversion between control signaling 328 and control signaling 330 (e.g. at the transport level and/or at the application level).

The UE in process 400 may have a 5G or 3GPP NR radio interface and one or more first signaling messages may then be exchanged, at least in part, using the 5G or NR radio interface.

In an embodiment, the location measurement received at block 402 may be obtained by the UE and may be a measurement of received signal strength indication (RSSI), angle of arrival (AOA), round trip signal propagation time (RTT), reference signal time difference (RSTD), signal to noise ratio (S/N), reference signal received power (RSRP), reference signal received quality (RSRQ), a code phase for a satellite vehicle (SV), a carrier phase for an SV, or a location estimate for the UE.

In an embodiment, the assistance data sent at block 402 may be sent to the UE by the LSF using broadcast or may be sent point to point to the UE.

In an optional block 406 for process 400, the LSF obtains a location estimate for the UE based at least in part on the location measurement received from the UE at block 402. Block 406 may correspond to event 334 or event 336 in signaling flow 300.

In an embodiment, the location information exchanged at block 404 may comprise a location estimate for the UE, location measurements for the UE or both.

In an embodiment, the location configuration exchanged at block 404 may comprise parameters defining periodic location of the UE, triggered location of the UE, location accuracy for the UE, or some combination of these, as described in association with system 200 and signaling flow 300.

In an embodiment, the location context exchanged at block 404 may comprise a last known serving cell identifier (ID) for the UE, a last known serving base station ID for the UE, a last known location for the UE, the location measurement received at block 402, or some combination of these, as described in association with system 200 and signaling flow 300.

In an embodiment, one or more second signaling messages exchanged at block 404 may be defined according to the Long Term Evolution (LTE) Positioning Protocol Annex (LPPa) protocol for the 3$^{rd}$ Generation Partnership Project (3GPP).

In an embodiment, one or more second signaling messages exchanged at block 404 may be exchanged using the Internet Protocol (IP).

Figure 5:
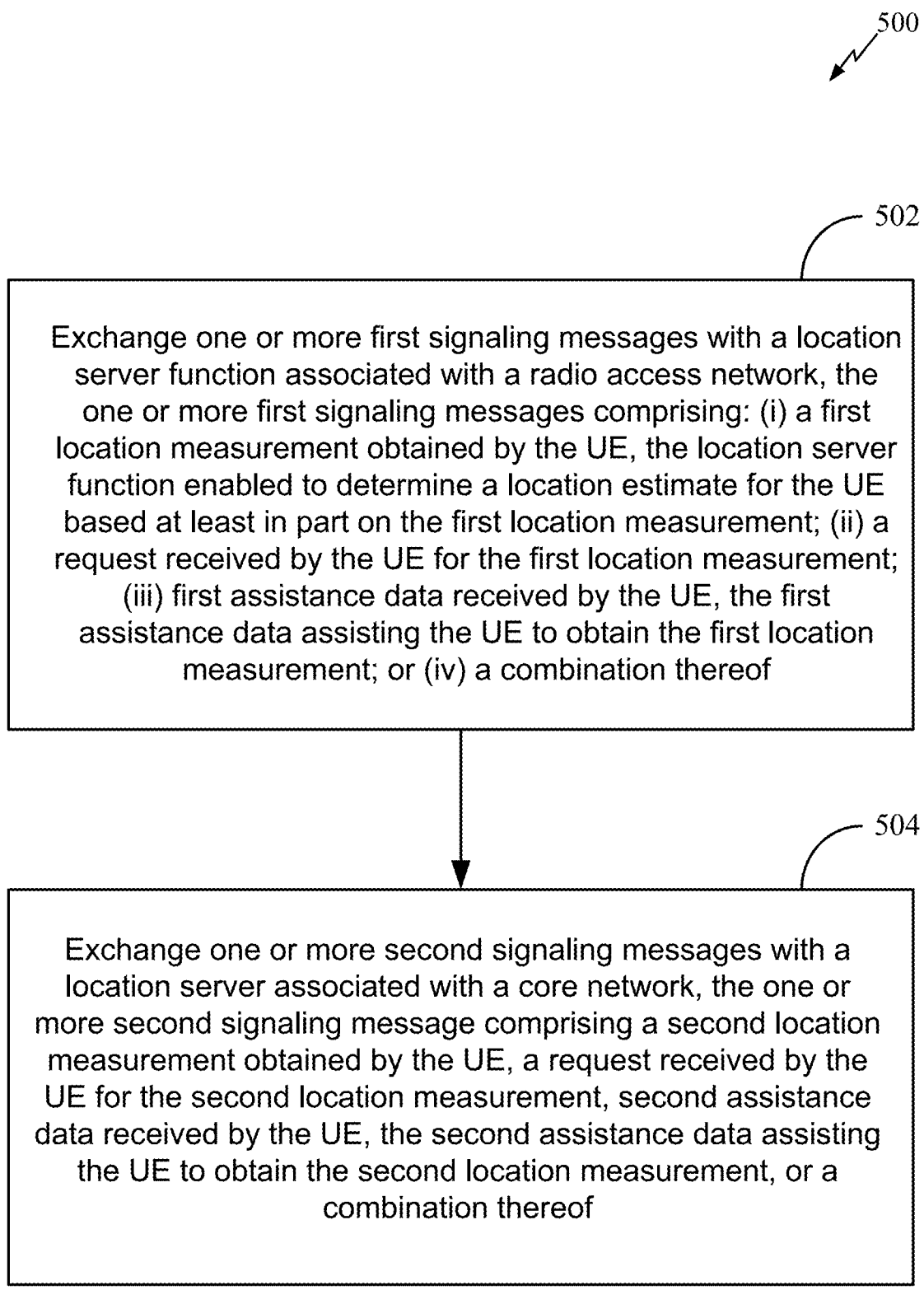

FIG. 5 is a flow diagram for a process 500 for supporting location services at a user equipment (UE) that may be accessing a RAN according to an embodiment. The location services may include obtaining a location for the UE. The UE may correspond to UE 102 or UE 103 in FIGS. 1-3. For example, a UE having features shown by mobile device 800 of FIG. 8 may perform the actions for process 500, at least in part, by execution of instructions stored on memory 840 by modem processor 866, general purpose application processor 811 or DSP(s) 812. Furthermore, interface 820 in combination with wireless transceiver 821 may be used to transmit and receive messages/signals/control signaling in support of actions for process 500. It should be understood that the example structures for performing actions set forth in process 500 are merely example structures, and that claimed subject matter is not limited to these particular structures. Furthermore, the actions described for process 500 may be performed in various orders and actions may be added or omitted.

At block 502 for process 500, the UE exchanges a plurality of one or more first signaling messages with a location server function (LSF) associated with a radio access network (RAN). One or more first signaling messages comprises: (i) a first location measurement sent by the UE; (ii) a request received by the UE for the first location measurement; (iii) first assistance data received by the UE; or (iv) some combination of these. For case (i), the location server function may be enabled to determine a location estimate for the UE based at least in part on the first location measurement. For case (iii), the first assistance data may assist the UE to obtain the first location measurement. The LSF may be a standalone entity (e.g. a standalone LSF) or an LSF integrated in a base station or access point. The LSF may correspond to standalone LSF 232 or to an LSF 232 integrated in 5G BS 220, as described previously for system 200 and signaling flow 300. One or more first signaling messages may correspond to control signaling 328 in signaling flow 300 in the case of an LSF integrated in 5G BS 220 or control signaling 328 plus control signaling 330 in signaling flow 300 in the case of a standalone LSF 232, as described previously herein.

At block 504 for process 500, the UE exchanges a plurality of one or more second signaling messages with a location server (LS) associated with a core network. One or more second signaling message may comprise a second location measurement sent by the UE, a request received by the UE for the second location measurement, second assistance data received by the UE, or some combination of these. The assistance data received by the UE in block 504 may assist the UE to obtain the second location measurement. One or more second signaling messages exchanged at block 504 may correspond to control signaling 358 in signaling flow 300. The location server may correspond to LS 226 in system 200.

When the LSF for block 502 corresponds to a standalone entity such as standalone LSF 232, one or more first signaling messages may be exchanged with the LSF using an intermediate base station such as 5G BS 220. In that case, one or more first signaling messages may undergo protocol conversion at the intermediate base station. For example, this may be as described previously for signaling flow 300, where standalone LSF 232 sends and receives control signaling 330 via 5G BS 220, with 5G BS 220 forwarding or relaying the control signaling 330 to or from UE 102 as control signaling 328. 5G BS 220 may then perform protocol conversion between control signaling 328 and control signaling 330 (e.g. at the transport level and/or at the application level).

When the UE for process 500 has 5G or 3GPP NR radio access (e.g. as in system 200), one or more first signaling messages may be exchanged, at least in part, using the 5G or 3GPP NR radio interface.

In some embodiments of process 500, at least one of the first location measurement sent by the UE at block 502 and the second location measurement sent by the UE at block 504 is a measurement of received signal strength indication (RSSI), angle of arrival (AOA), round trip signal propagation time (RTT), reference signal time difference (RSTD), signal to noise ratio (S/N), reference signal received power (RSRP), reference signal received quality (RSRQ), a code phase for a satellite vehicle (SV), a carrier phase for an SV or a location estimate for the UE.

In an embodiment of process 500, the first assistance data received by the UE at block 502 may be received in a broadcast signal (e.g. a signal broadcast by 5G TB 224 or 5G BS 220 in the case of signaling flow 300).

In an embodiment of process 500, one or more second signaling messages exchanged at block 504 may be defined according to the Long Term Evolution (LTE) Positioning Protocol (LPP) for the 3$^{rd}$ Generation Partnership Project (3GPP), the LPP Extensions (LPPe) protocol defined by the Open Mobile Alliance (OMA), or both LPP and LPPe.

Figure 6:
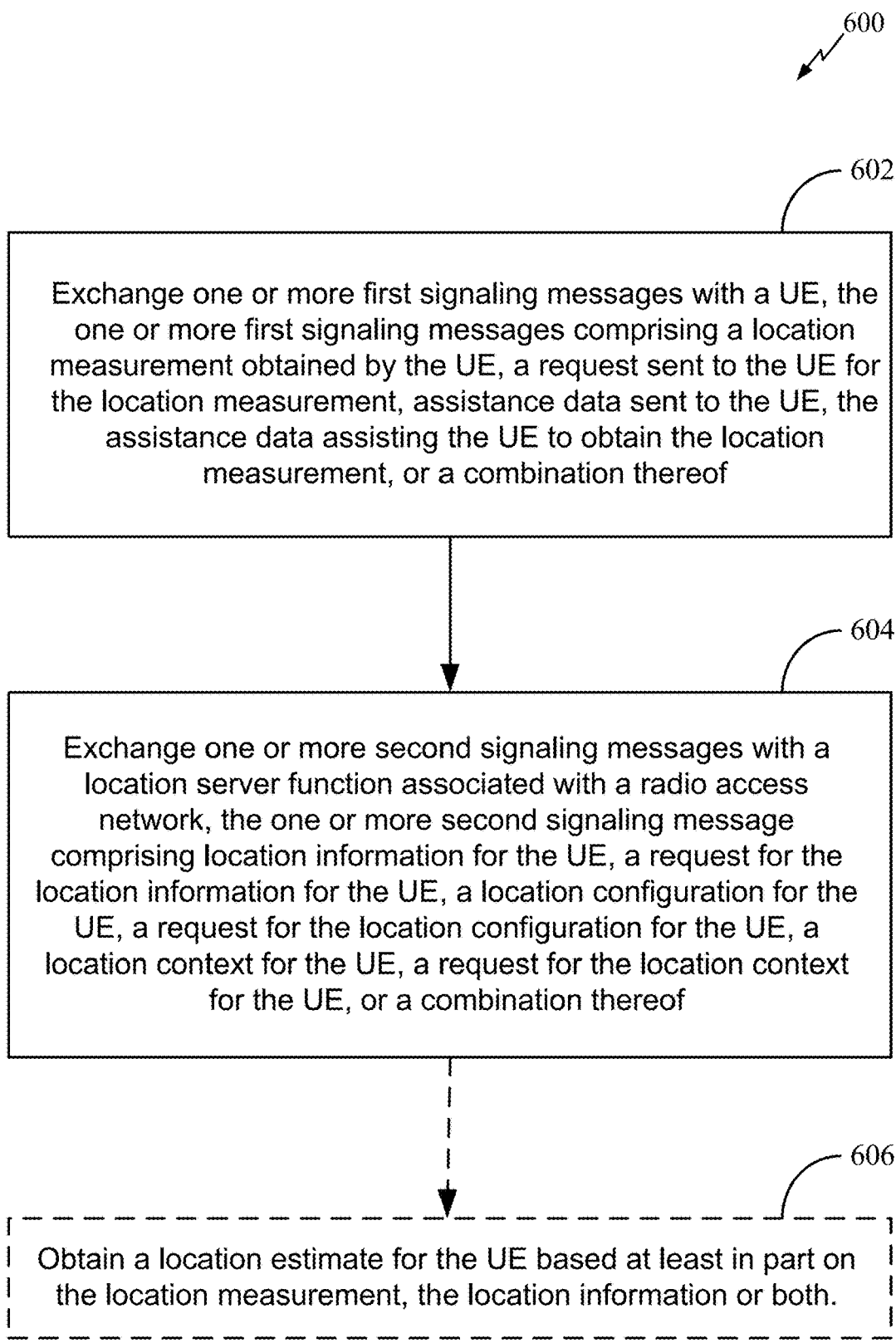

FIG. 6 is a flow diagram for a process 600 for providing positioning services to a UE accessing a RAN according to an embodiment. The positioning services may include obtaining a location for the UE. The UE may correspond to UE 102 or UE 103 in FIGS. 1-3. The positioning services may be performed by a location server in or associated with a core network such as 5G CN 234 in system 200 or a location server in or associated with a CN domain such as CN domain 214 in system 200. In an implementation, the process 600 may be performed by LS 226 in system 200 or by E-SMLC 110 or H-SLP 118 in system 100. For example, a location server having features shown by device 904 of FIG. 9 may perform actions for process 600, at least in part, by execution of instructions stored on memory 922 by processing unit 920. Furthermore, communication interface 930 in combination with processing unit 920 may be used to transmit and receive messages/signals/control signaling in data links in support of providing location services to a UE. It should be understood that the example structures for performing actions set forth in process 600 are merely example structures, and that claimed subject matter is not limited to these particular structures. Furthermore, the actions described for process 600 may be performed in various orders and actions may be added or omitted.

At block 602 for process 600, the location server exchanges a plurality of one or more first signaling messages with a UE, wherein one or more first signaling messages comprises a location measurement received from the UE, a request sent to the UE for the location measurement, assistance data sent to the UE, or some combination of these. The assistance data sent to the UE at block 602 may assist the UE to obtain the location measurement. One or more first signaling messages exchanged at block 602 may correspond to control signaling 358 as described previously for signaling flow 300.

At block 604 for process 600, the location server exchanges a plurality of one or more second signaling messages with a location server function (LSF) associated with a radio access network (RAN), wherein one or more second signaling message comprise location information for the UE, a request for the location information for the UE, a location configuration for the UE, a request for the location configuration for the UE, a location context for the UE, a request for the location context for the UE, or some combination of these. The LSF may comprise a standalone entity such as standalone LSF 232 in system 200 or may comprise, or comprise part of, a base station or access point such as an LSF 232 integrated in 5G BS 220 or 5G BS 222 as described previously for system 200. One or more second signaling messages exchanged at block 604 may correspond to control signaling 346 and/or 354 as described previously for signaling flow 300.

The UE for process 600 may have a fifth generation (5G) or 3GPP new radio (NR) radio interface and one or more first signaling messages may be exchanged at block 602, at least in part, using the 5G or NR radio interface.

In an embodiment of process 600, the location measurement received from the UE at block 602 may be a measurement of received signal strength indication (RSSI), angle of arrival (AOA), round trip signal propagation time (RTT), reference signal time difference (RSTD), signal to noise ratio (S/N), reference signal received power (RSRP), reference signal received quality (RSRQ), a code phase for a satellite vehicle (SV), a carrier phase for an SV, or a location estimate for the UE.

At an optional block 606 in process 606 in process 600, the location server obtains a location estimate for the UE based at least in part on the location measurement received at block 602 and/or the location information exchanged at block 604 in the case that the location information is received by the location server from the LSF. Block 606 may correspond to event 348 or event 362 for signaling flow 300

In an embodiment of process 600, one or more first signaling messages exchanged at block 602 are defined according to the Long Term Evolution (LTE) Positioning Protocol (LPP) protocol for the 3$^{rd}$ Generation Partnership Project (3GPP), the LPP Extensions (LPPe) protocol defined by the Open Mobile Alliance (OMA), or both LPP and LPPe.

In an embodiment of process 600, the location information exchanged at block 604 comprises a location estimate for the UE, location measurements for the UE or both.

In an embodiment of process 600, the location configuration exchanged at block 604 comprises parameters defining periodic location of the UE, triggered location of the UE, location accuracy for the UE, or some combination of these.

In an embodiment of process 600, the location context exchanged at block 604 comprises a last known serving cell identifier (ID) for the UE, a last known serving base station ID for the UE, a last known location for the UE, the location measurement received at block 602, the location information exchanged at block 604, or some combination of these.

In an embodiment of process 600, one or more second signaling messages exchanged at block 604 are defined according to the Long Term Evolution (LTE) Positioning Protocol Annex (LPPa) protocol for the 3$^{rd}$ Generation Partnership Project (3GPP).

In an embodiment of process 600, one or more second signaling messages are exchanged at block 604 using the Internet Protocol (IP).

Figure 7:
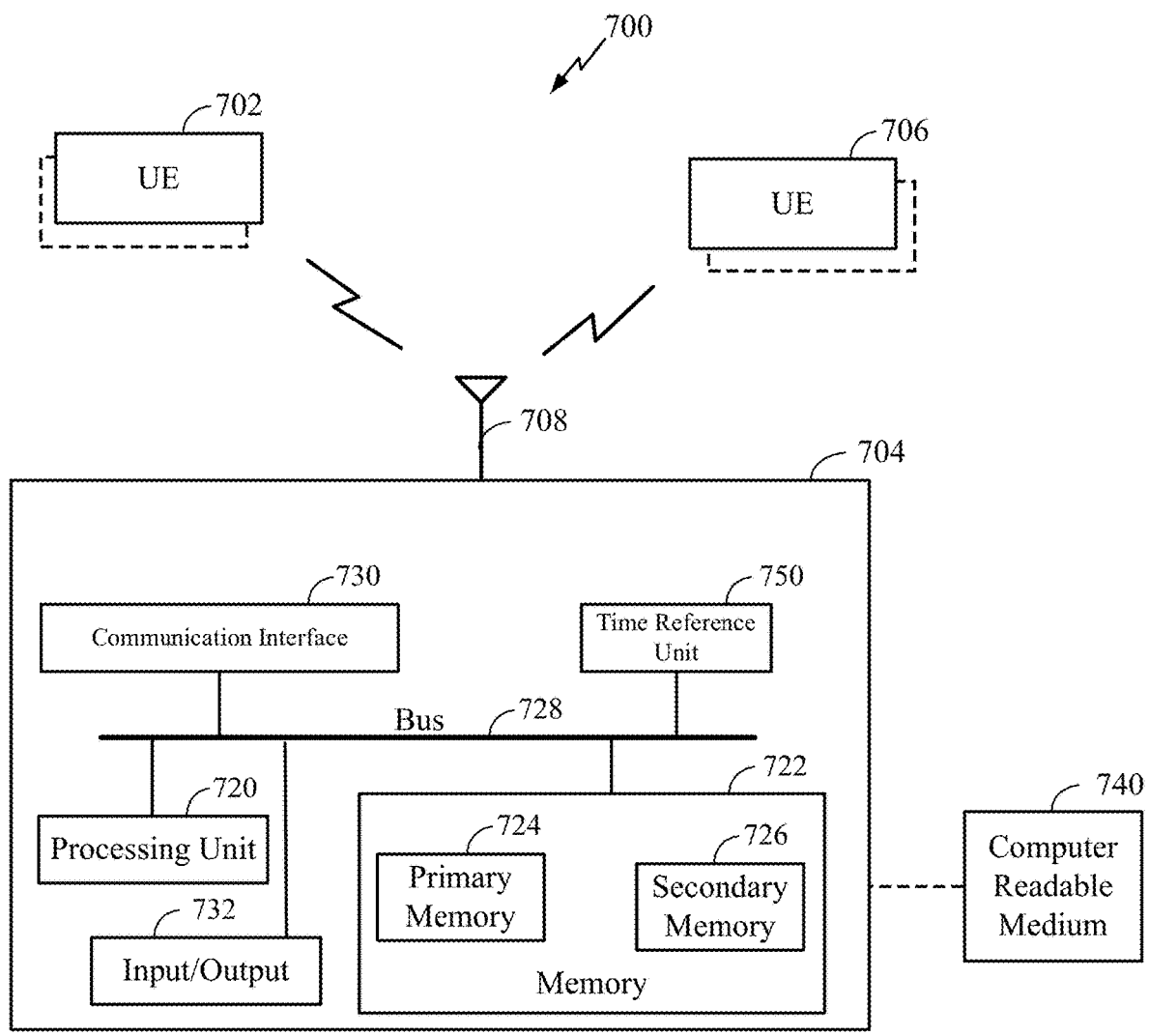
FIG. 7 is a schematic block diagram depicting an example wireless communication system including a plurality of computing platforms comprising one or more wirelessly connected devices, in accordance with an implementation.
Figure 8:
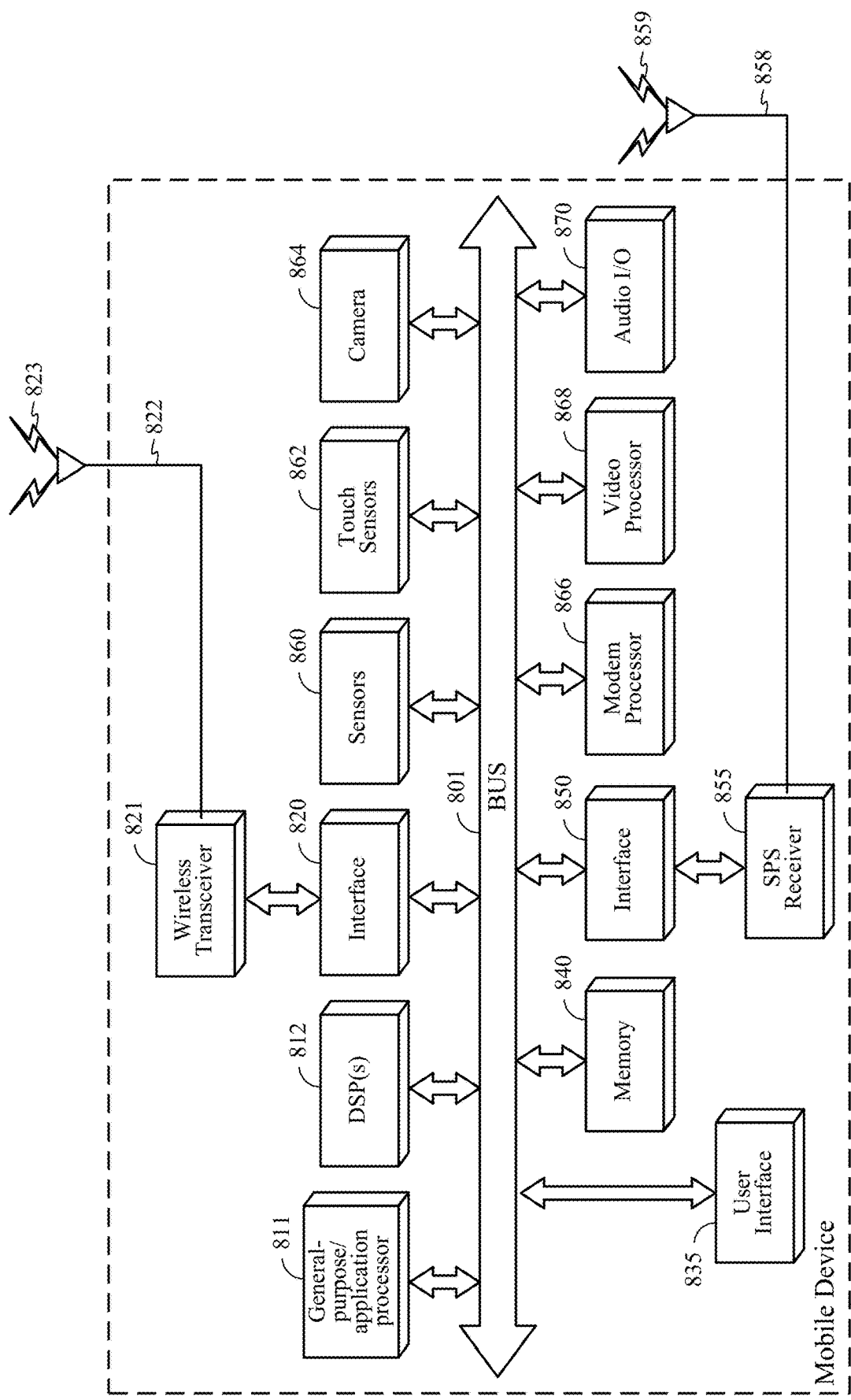
FIG. 8 is a schematic block diagram of a mobile device, in accordance with an example implementation.
Figure 9:
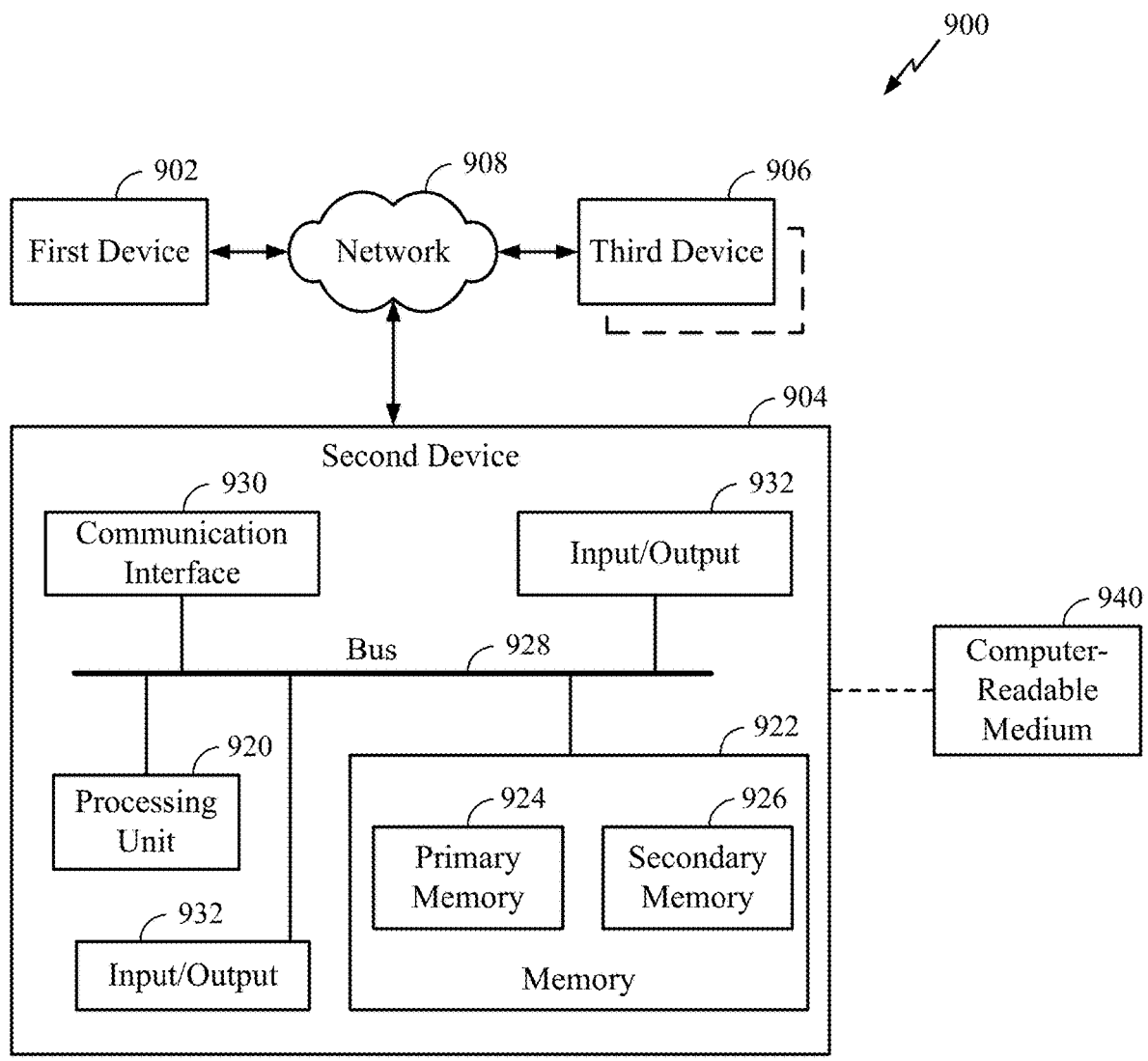
FIG. 9 is a schematic block diagram of an example computing platform in accordance with an implementation.

Subject matter shown in FIGS. 7, 8 and 9 may comprise features, for example, of a computing device, in an embodiment. It is further noted that the term computing device, in general, refers at least to one or more processors and a memory connected by a communication bus. Likewise, in the context of the present disclosure at least, this is understood to refer to sufficient structure within the meaning of 35 USC § 112(f) so that it is specifically intended that 35 USC § 112(f) not be implicated by use of the term "computing device," "UE," "location server," "location server function" and/or similar terms; however, if it is determined, for some reason not immediately apparent, that the foregoing understanding cannot stand and that 35 USC § 112(f) therefore, necessarily is implicated by the use of the term "computing device," "UE," "location server," "location server function" and/or similar terms, then, it is intended, pursuant to that statutory section, that corresponding structure, material and/or acts for performing one or more functions be understood and be interpreted to be described at least in FIGS. 4, 5 and 6, and corresponding text of the present disclosure.

FIG. 7 is a schematic diagram illustrating an example system 700 that may include one or more devices configurable to implement techniques or processes described above, for example, in connection with FIGS. 1-6. System 700 may include, for example, a first device 702, a second device 704, and a third device 706, which may be operatively coupled together through a wireless communications network. In an aspect, first device 702 may comprise a UE as shown, for example, such as UE 102 or 103 in FIGS. 1-3. Second device 704 may comprise a node in a cellular/wireless communication network such as a base station or access point. For example second device 704 may correspond to any of 5G BS 220, 5G BS 222, 5G TB 224 or an LSF 232 integrated in 5G BS 220 or 5G BS 222 as described for FIGS. 2-3. Third device 706 may comprise another UE, in an aspect, such as UE 102 or UE 103 in FIGS. 1-3. Also, in an aspect, devices 702, 704 and 706 may be included in a wireless communications network (not shown in FIG. 7) which may comprise one or more wireless access points, for example, such as the networks described for FIGS. 1-2. However, claimed subject matter is not limited in scope in these respects.

First device 702, second device 704 and third device 706, as shown in FIG. 7, may be representative of any device, appliance or machine that may be configurable to exchange data over a wireless communications network. By way of example but not limitation, any of first device 702, second device 704, or third device 706 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; wireless telecommunications access terminal; or any combination thereof. Any of the first, second, and third devices 702, 704, and 706, respectively, may comprise one or more of an access point or a mobile device in accordance with the examples described herein.

Similarly, a wireless communications network, as shown in FIG. 7, is representative of one or more communication links, processes, or resources configurable to support the exchange of signaling and/or data between at least two of first device 702, second device 704, and third device 706. By way of example but not limitation, a wireless communications network may include wireless or wired communication links, telephone or telecommunications systems (e.g., LTE), data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 706, there may be additional like devices operatively coupled to system 700.

It is recognized that all or part of the various devices and networks shown in FIG. 7, and the processes and methods as further described herein, may be implemented using or otherwise including hardware, firmware, software, or any combination thereof.

Thus, by way of example but not limitation, second device 704 may include at least one processing unit 720 that is operatively coupled to a memory 722 through a bus 728.

Processing unit 720 is representative of one or more circuits configurable to perform at least a portion of a data computing procedure or process. By way of example but not limitation, processing unit 720 may include one or more processors, controllers, microprocessors, microcontrollers, application specific integrated circuits, digital signal processors, programmable logic devices, field programmable gate arrays, and the like, or any combination thereof.

Memory 722 is representative of any data storage mechanism. Memory 722 may include, for example, a primary memory 724 or a secondary memory 726. Primary memory 724 may include, for example, a random access memory, read only memory, etc. While illustrated in this example as being separate from processing unit 720, it should be understood that all or part of primary memory 724 may be provided within or otherwise co-located/coupled with processing unit 720.

Secondary memory 726 may include, for example, the same or similar type of memory as primary memory or one or more data storage devices or systems, such as, for example, a disk drive, an optical disc drive, a tape drive, a solid state memory drive, etc. In certain implementations, secondary memory 726 may be operatively receptive of, or otherwise configurable to couple to, a computer-readable medium 740. Computer-readable medium 740 may include, for example, any non-transitory medium that can carry or make accessible data, code or instructions for one or more of the devices in system 700. Computer-readable medium 740 may also be referred to as a storage medium.

Second device 704 may include, for example, a communication interface 730 that provides for or otherwise supports the operative coupling of second device 704 to a wireless communications network at least through an antenna 708. By way of example but not limitation, communication interface 730 may include a network interface device or card, a modem, a router, a switch, a transceiver, and the like. In a particular implementation, communication interface 730 may comprise a wireless transmitter that is configured for transmission of a TPS or PRS.

Communication interface 730 may further comprise a wireless receiver that is configured for reception, acquisition and/or measurement of a TPS or PRS. Communication interface 730 (or a different communication interface for second device 704 not shown in FIG. 7) may further support the operative coupling of second device 704 to a wireline communications network and/or to wired communication links that may enable second device 704 to communicate with one or more other elements in a radio access network or in a core network such as standalone LSF 232 or LS 226 in system 200.

Second device 704 may include, for example, an input/output device 732. Input/output device 732 is representative of one or more devices or features that may be configurable to accept or otherwise introduce human or machine inputs, or one or more devices or features that may be configurable to deliver or otherwise provide for human or machine outputs. By way of example but not limitation, input/output device 732 may include an operatively configured display, speaker, keyboard, mouse, trackball, touch screen, data port, etc.

Second device 704 may further include a time reference unit 750 that may be configured to determine an accurate global or common time by means of access to an accurate global time source, which may be provided in one embodiment by GNSS navigation signals received at antenna 708 and acquired, measured and/or demodulated by communication interface 730. Time reference unit 750 may be used by second device 704 (e.g. by communication interface 730) to synchronize TPS and PRS signals transmitted by communication interface 730 using antenna 708 to the accurate global or common time and/or to measure the timing (e.g. TOA or RSTD) for TPS and PRS signals received by communication interface 730 using antenna 708.

In a particular implementation, all or portions of actions or operations set forth for process 400 may be executed by processing unit 720 based on machine-readable instructions stored in memory 722. For example processing unit 720 may exchange control signaling with other entities (e.g. a location server, standalone LSF or a UE) using communication interface 730 in order to support actions of process 400.

FIG. 8 is a schematic diagram of a mobile device 800 according to an embodiment. UE 102 and/or UE 103 as shown in FIGS. 1, 2 and 3 may comprise one or more features of mobile device 800 shown in FIG. 8. In certain embodiments, mobile device 800 may comprise a wireless transceiver 821 which is capable of transmitting and receiving wireless signals 823 via wireless antenna 822 over a wireless communication network. Wireless transceiver 821 may be connected to bus 801 by a wireless transceiver bus interface 820. Wireless transceiver bus interface 820 may, in some embodiments be at least partially integrated with wireless transceiver 821. Some embodiments may include multiple wireless transceivers 821 and wireless antennas 822 to enable transmitting and/or receiving signals according to corresponding multiple wireless communication standards such as, for example, versions of IEEE Standard 802.11, CDMA, WCDMA, LTE, UMTS, GSM, AMPS, Zigbee, Bluetooth and a 5G or NR radio interface defined by 3GPP, just to name a few examples. In a particular implementation, wireless transceiver 821 may receive and acquire a downlink signal comprising a terrestrial positioning signal such as a PRS. For example, wireless transceiver 821 may process an acquired terrestrial positioning signal sufficiently to enable detection of timing of the acquired terrestrial positioning signal.

Mobile device 800 may also comprise SPS receiver 855 capable of receiving and acquiring SPS signals 859 via SPS antenna 858 (which may be the same as antenna 822 in some embodiments). SPS receiver 855 may also process, in whole or in part, acquired SPS signals 859 for estimating a location of mobile device 800. In some embodiments, general-purpose processor(s) 811, memory 840, digital signal processor(s) (DSP(s)) 812 and/or specialized processors (not shown) may also be utilized to process acquired SPS signals, in whole or in part, and/or calculate an estimated location of mobile device 800, in conjunction with SPS receiver 855. Storage of SPS, TPS or other signals (e.g., signals acquired from wireless transceiver 821) or storage of measurements of these signals for use in performing positioning operations may be performed in memory 840 or registers (not shown). General-purpose processor(s) 811, memory 840, DSP(s) 812 and/or specialized processors may provide or support a location engine for use in processing measurements to estimate a location of mobile device 800. In a particular implementation, all or portions of actions or operations set forth for process 500 may be executed by general-purpose processor(s) 811 or DSP(s) 812 based on machine-readable instructions stored in memory 840. For example general-purpose processor(s) 811 or DSP(s) 812 may process a downlink signal acquired by wireless transceiver 821 to, for example, make measurements of RSSI, RTT, AOA, TOA, RSTD, RSRQ and/or RSRQ.

Also shown in FIG. 8, digital signal processor(s) (DSP(s)) 812 and general-purpose processor(s) 811 may be connected to memory 840 through bus 801. A particular bus interface (not shown) may be integrated with the DSP(s) 812, general-purpose processor(s) 811 and memory 840. In various embodiments, functions may be performed in response to execution of one or more machine-readable instructions stored in memory 840 such as on a computer-readable storage medium, such as RAM, ROM, FLASH, or disc drive, just to name a few example. The one or more instructions may be executable by general-purpose processor(s) 811, specialized processors, or DSP(s) 812. Memory 840 may comprise a non-transitory processor-readable memory and/or a computer-readable memory that stores software code (programming code, instructions, etc.) that are executable by processor(s) 811 and/or DSP(s) 812 to perform functions described herein.

Also shown in FIG. 8, a user interface 835 may comprise any one of several devices such as, for example, a speaker, microphone, display device, vibration device, keyboard, touch screen, just to name a few examples. In a particular implementation, user interface 835 may enable a user to interact with one or more applications hosted on mobile device 800. For example, devices of user interface 835 may store analog or digital signals on memory 840 to be further processed by DSP(s) 812 or general purpose processor 811 in response to action from a user. Similarly, applications hosted on mobile device 800 may store analog or digital signals on memory 840 to present an output signal to a user. In another implementation, mobile device 800 may optionally include a dedicated audio input/output (I/O) device 870 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 800 may comprise touch sensors 862 responsive to touching or pressure on a keyboard or touch screen device.

Mobile device 800 may also comprise a dedicated camera device 864 for capturing still or moving imagery. Camera device 864 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 811 or DSP(s) 812. Alternatively, a dedicated video processor 868 may perform conditioning, encoding, compression or manipulation of signals representing captured images. Additionally, video processor 868 may decode/decompress stored image data for presentation on a display device (not shown) on mobile device 800.

Mobile device 800 may also comprise sensors 860 coupled to bus 801 which may include, for example, inertial sensors and environment sensors. Inertial sensors of sensors 860 may comprise, for example accelerometers (e.g., collectively responding to acceleration of mobile device 800 in three dimensions), one or more gyroscopes or one or more magnetometers (e.g., to support one or more compass applications). Environment sensors of mobile device 800 may comprise, for example, temperature sensors, barometric pressure sensors, ambient light sensors, camera imagers, microphones, just to name few examples. Sensors 860 may generate analog or digital signals that may be stored in memory 840 and processed by DPS(s) 812 or general purpose application processor 811 in support of one or more applications such as, for example, applications directed to positioning or navigation operations.

In a particular implementation, mobile device 800 may comprise a dedicated modem processor 866 capable of performing baseband processing of signals received and downconverted at wireless transceiver 821 or SPS receiver 855. Similarly, modem processor 866 may perform baseband processing of signals to be upconverted for transmission by wireless transceiver 821. In alternative implementations, instead of having a dedicated modem processor, baseband processing may be performed by a general purpose processor or DSP (e.g., general purpose/application processor 811 or DSP(s) 812). It should be understood, however, that these are merely examples of structures that may perform baseband processing, and that claimed subject matter is not limited in this respect.

FIG. 9 is a schematic diagram illustrating an example system 900 that may include one or more devices configurable to implement techniques or processes described above. System 900 may include, for example, a first device 902, a second device 904, and a third device 906, which may be operatively coupled together through a wireless communications network 908. In an aspect, second device 904 may comprise a server or location server, such as LS 226 or standalone LSF 232 in system 200, or E-SMLC 110 or H-SLP 118 in system 100. Also, in an aspect, wireless communications network 908 may comprise one or more wireless access points, for example. However, claimed subject matter is not limited in scope in these respects.

First device 902, second device 904 and third device 906 may be representative of any device, appliance or machine. By way of example but not limitation, any of first device 902, second device 904, or third device 906 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 902, 904, and 906, respectively, may comprise one or more of a location server, a base station almanac server, a location server function, a base station, or a mobile device in accordance with the examples described herein.

Similarly, wireless communications network 908, may be representative of one or more communication links, processes, or resources configurable to support the exchange of data between at least two of first device 902, second device 904, and third device 906. By way of example but not limitation, wireless communications network 908 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured by third device 906, there may be additional like devices operatively coupled to wireless communications network 908.

It is recognized that all or part of the various devices and networks shown in system 900, and the processes and methods as further described herein, may be implemented using or otherwise including hardware, firmware, software, or any combination thereof.

Thus, by way of example but not limitation, second device 904 may include at least one processing unit 920 that is operatively coupled to a memory 922 through a bus 928.

Processing unit 920 is representative of one or more circuits configurable to perform at least a portion of a data computing procedure or process. By way of example but not limitation, processing unit 920 may include one or more processors, controllers, microprocessors, microcontrollers, application specific integrated circuits, digital signal processors, programmable logic devices, field programmable gate arrays, and the like, or any combination thereof.

Memory 922 is representative of any data storage mechanism. Memory 922 may include, for example, a primary memory 924 or a secondary memory 926. Primary memory 924 may include, for example, a random access memory, read only memory, etc. While illustrated in this example as being separate from processing unit 920, it should be understood that all or part of primary memory 924 may be provided within or otherwise co-located/coupled with processing unit 920.

In a particular implementation, a digital map of an indoor area may be stored in a particular format in memory 922. Processing unit 920 may execute instructions to processes the stored digital map to identify and classify component areas bounded by a perimeter of structures indicated in the digital map.

Secondary memory 926 may include, for example, the same or similar type of memory as primary memory or one or more data storage devices or systems, such as, for example, a disk drive, an optical disc drive, a tape drive, a solid state memory drive, etc. In certain implementations, secondary memory 926 may be operatively receptive of, or otherwise configurable to couple to, a computer-readable medium 940. Computer-readable medium 940 may include, for example, any non-transitory medium that can carry or make accessible data, code or instructions for one or more of the devices in system 900. Computer-readable medium 940 may also be referred to as a storage medium.

Second device 904 may include, for example, a communication interface 930 that provides for or otherwise supports the operative coupling of second device 904 to at least wireless communications network 908. By way of example but not limitation, communication interface 930 may include a network interface device or card, a modem, a router, a switch, a transceiver, and the like.

Second device 904 may include, for example, an input/output device 932. Input/output device 932 is representative of one or more devices or features that may be configurable to accept or otherwise introduce human or machine inputs, or one or more devices or features that may be configurable to deliver or otherwise provide for human or machine outputs. By way of example but not limitation, input/output device 932 may include an operatively configured display, speaker, keyboard, mouse, trackball, touch screen, data port, etc.

In a particular implementation, all or portions of actions or operations set forth for process 600 may be executed by processing unit 920 based on machine-readable instructions stored in memory 922. For example processing unit 920 may exchange control signaling with other entities (e.g. a standalone LSF, an integrated LSF, a base station or a UE) using communication interface 930 in order to support actions of process 600.

Particular embodiments described herein relate to a non-transitory storage medium comprising computer-readable instructions stored thereon which are executable by one or more processors of a location server function associated with a radio access network for locating a user equipment (UE) to: exchange one or more first signaling messages with the UE, the one or more first signaling messages comprising: (i) a location measurement obtained by the UE, the location server function enabled to determine a location estimate for the UE based at least in part on the location measurement; (ii) a request sent to the UE for the location measurement; (iii) assistance data sent to the UE, the assistance data assisting the UE to obtain the location measurement; or (iv) a combination thereof; and exchange one or more second signaling messages with a location server associated with a core network, the one or more second signaling messages comprising location information for the UE, a request for the location information for the UE, a location configuration for the UE, a request for the location configuration for the UE, a location context for the UE, a request for the location context for the UE, or a combination thereof. In one particular implementation, the one or more first signaling messages comprise one or more layer 3 messages, and wherein the one or more second signaling messages comprise one or more control plane messages or one or more user plane messages. In another particular implementation, the location server function associated with the radio access network is configured to obtain an estimated location of the UE independently of the location server associated with the core network. In another particular implementation, the location server function is integrated with a base station or access point, or comprises a standalone entity. In another particular implementation, the location server function comprises a standalone entity and the one or more first signaling messages is exchanged using an intermediate base station to transmit the one or more first signaling messages between the location server function and the UE, the one or more first signaling messages undergoing protocol conversion at the intermediate base station. In another particular implementation, the one or more first signaling messages is exchanged in part using a Fifth Generation (5G) radio interface or a $3^{rd}$ Generation Partnership Project (3GPP) New Radio (NR). In another particular implementation, the location measurement comprises a measurement of received signal strength indication (RSSI), measurement of angle of arrival (AOA), measurement of round trip signal propagation time (RTT), measurement of reference signal time difference (RSTD), signal to noise ratio (S/N), reference signal received power (RSRP), reference signal received quality (RSRQ), measurement of code phase for a satellite vehicle (SV), a carrier phase for an SV or a location estimate for the UE, or a combination thereof. In another particular implementation, the assistance data is transmitted to the UE using a broadcast message. In another particular implementation, a location estimate for the UE is obtained based at least in part on the location measurement. In another particular implementation, the location information comprises a location estimate for the UE or location measurements for the UE, or a combination thereof. In another particular implementation, the location configuration comprises parameters defining periodic location estimation of the UE, triggered location estimation of the UE or location estimation accuracy for the UE, or a combination thereof. In another particular implementation, the location context comprises a last known serving cell identifier (ID) for the UE, a last known serving base station ID for the UE, a last known location for the UE or the location measurement, or a combination thereof. In another particular implementation, the one or more second signaling messages are defined according to the Long Term Evolution (LTE) Positioning Protocol Annex (LPPa) protocol for the $3^{rd}$ Generation Partnership Project (3GPP). In another particular implementation, the one or more second signaling messages are exchanged using the Internet Protocol (IP).

Particular embodiments described herein relate to a location server function associated with a radio access network for locating a user equipment (UE) comprising: means for exchanging one or more first signaling messages with the UE, the one or more first signaling messages comprising: (i) a location measurement obtained by the UE, the location server function enabled to determine a location estimate for the UE based at least in part on the location measurement; (ii) a request sent to the UE for the location measurement; (iii) assistance data sent to the UE, the assistance data assisting the UE to obtain the location measurement; or (iv) a combination thereof; and means for exchanging one or more second signaling messages with a location server associated with a core network, the one or more second signaling messages comprising location information for the UE, a request for the location information for the UE, a location configuration for the UE, a request for the location configuration for the UE, a location context for the UE, a request for the location context for the UE, or a combination thereof. In one particular implementation, the one or more first signaling messages comprise one or more layer 3 messages, and wherein the one or more second signaling messages comprise one or more control plane messages or one or more user plane messages. In another particular implementation, the location server function associated with the radio access network is configured to obtain an estimated location of the UE independently of the location server associated with the core network. In another particular implementation, the location server function is integrated with a base station or access point, or comprises a standalone entity. In another particular implementation, the location server function comprises a standalone entity and the one or more first signaling messages is exchanged using an intermediate base station to transmit the one or more first signaling messages between the location server function and the UE, the one or more first signaling messages undergoing protocol conversion at the intermediate base station. In another particular implementation, the one or more first signaling messages is exchanged in part using a Fifth Generation (5G) radio interface or a $3^{rd}$ Generation Partnership Project (3GPP) New Radio (NR). In another particular implementation, the location measurement comprises a measurement of received signal strength indication (RSSI), measurement of angle of arrival (AOA), measurement of round trip signal propagation time (RTT), measurement of reference signal time difference (RSTD), signal to noise ratio (S/N), reference signal received power (RSRP), reference signal received quality (RSRQ), measurement of code phase for a satellite vehicle (SV), a carrier phase for an SV or a location estimate for the UE, or a combination thereof. In another particular implementation, the assistance data is transmitted to the UE using a broadcast message. In another particular implementation, a location estimate for the UE is obtained based at least in part on the location measurement. In another particular implementation, the location information comprises a location estimate for the UE or location measurements for the UE, or a combination thereof. In another particular implementation, the location configuration comprises parameters defining periodic location estimation of the UE, triggered location estimation of the UE or location estimation accuracy for the UE, or a combination thereof. In another particular implementation, the location context comprises a last known serving cell identifier (ID) for the UE, a last known serving base station ID for the UE, a last known location for the UE or the location measurement, or a combination thereof. In another particular implementation, the one or more second signaling messages are defined according to the Long Term Evolution (LTE) Positioning Protocol Annex (LPPa) protocol for the $3^{rd}$ Generation Partnership Project (3GPP). In another particular implementation, the one or more second signaling messages are exchanged using the Internet Protocol (IP).

Particular embodiments described herein relate to a non-transitory storage medium comprising computer-readable instructions stored thereon which are executable by one or more processors of method of at a user equipment (UE) supporting location services to: exchange one or more first signaling messages with a location server function associated with a radio access network, the one or more first signaling messages comprising: (i) a first location measurement obtained by the UE, the location server function enabled to determine an estimate location of the UE based at least in part on the first location measurement; (ii) a request received by the UE for the first location measurement; (iii) first assistance data received by the UE, the first assistance data assisting the UE to obtain the first location measurement; or (iv) a combination thereof; and exchange one or more second signaling messages with a location server associated with a core network, the one or more second signaling message comprising a second location measurement obtained by the UE, a request received by the UE for the second location measurement, second assistance data received by the UE, the second assistance data assisting the UE to obtain the second location measurement, or a combination thereof. In one particular implementation, the one or more first messages comprise one or more one or more layer 3 messages, and wherein the one or more second signaling messages comprise one or more control plane messages or one or more user plane messages. In another particular implementation, the location server function comprises a base station, access point, or a standalone entity. In another particular implementation, the location server function comprises a standalone entity and one or more first signaling messages is exchanged using an intermediate base station, one or more first signaling messages undergoing protocol conversion at the intermediate base station. In another particular implementation, the one or more first signaling messages is exchanged in part using a Fifth Generation (5G) radio interface or a $3^{rd}$ Generation Partnership Project (3GPP) New Radio (NR). In another particular implementation, at least one of the first location measurement and the second location measurement is a measurement of received signal strength indication (RSSI), angle of arrival (AOA), round trip signal propagation time (RTT), reference signal time difference (RSTD), signal to noise ratio (S/N), reference signal received power (RSRP), reference signal received quality (RSRQ), a code phase for a satellite vehicle (SV), a carrier phase for an SV or a location estimate for the UE. In another particular implementation, the first assistance data is received by the UE by receiving a broadcast signal. In another particular implementation, one or more second signaling messages are defined according to the Long Term Evolution (LTE) Positioning Protocol (LPP) protocol for the $3^{rd}$ Generation Partnership Project (3GPP), the LPP Extensions (LPPe) protocol defined by the Open Mobile Alliance (OMA), or both LPP and LPPe.

Particular embodiments described herein relate to a user equipment (UE) supporting location services comprising: means for exchanging one or more first signaling messages with a location server function associated with a radio access network, the one or more first signaling messages comprising: (i) a first location measurement obtained by the UE, the location server function enabled to determine an estimate location of the UE based at least in part on the first location measurement; (ii) a request received by the UE for the first location measurement; (iii) first assistance data received by the UE, the first assistance data assisting the UE to obtain the first location measurement; or (iv) a combination thereof; and means for exchanging one or more second signaling messages with a location server associated with a core network, the one or more second signaling message comprising a second location measurement obtained by the UE, a request received by the UE for the second location measurement, second assistance data received by the UE, the second assistance data assisting the UE to obtain the second location measurement, or a combination thereof. In one particular implementation, the one or more first messages comprise one or more one or more layer 3 messages, and wherein the one or more second signaling messages comprise one or more control plane messages or one or more user plane messages. In another particular implementation, the location server function comprises a base station, access point, or a standalone entity. In another particular implementation, the location server function comprises a standalone entity and one or more first signaling messages is exchanged using an intermediate base station, one or more first signaling messages undergoing protocol conversion at the intermediate base station. In another particular implementation, the one or more first signaling messages is exchanged in part using a Fifth Generation (5G) radio interface or a $3^{rd}$ Generation Partnership Project (3GPP) New Radio (NR). In another particular implementation, at least one of the first location measurement and the second location measurement is a measurement of received signal strength indication (RSSI), angle of arrival (AOA), round trip signal propagation time (RTT), reference signal time difference (RSTD), signal to noise ratio (S/N), reference signal received power (RSRP), reference signal received quality (RSRQ), a code phase for a satellite vehicle (SV), a carrier phase for an SV or a location estimate for the UE. In another particular implementation, the first assistance data is received by the UE by receiving a broadcast signal. In another particular implementation, one or more second signaling messages are defined according to the Long Term Evolution (LTE) Positioning Protocol (LPP) protocol for the $3^{rd}$ Generation Partnership Project (3GPP), the LPP Extensions (LPPe) protocol defined by the Open Mobile Alliance (OMA), or both LPP and LPPe.

Particular embodiments described herein relate to a method of locating a user equipment (UE) at a location server associated with a core network, comprising: exchanging one or more first signaling messages with the UE, the one or more first signaling messages comprising a location measurement received obtained by the UE, a request sent to the UE for the location measurement, assistance data sent to the UE, the assistance data assisting the UE to obtain the location measurement, or a combination thereof; and exchanging one or more second signaling messages with a location server function associated with a radio access network, one or more second signaling message comprising location information for the UE, a request for the location information for the UE, a location configuration for the UE, a request for the location configuration for the UE, a location context for the UE, a request for the location context for the UE, or a combination thereof. In one particular implementation, the one or more second signaling messages comprise one or more control plane messages or one or more user plane messages. In another particular implementation, the location server function comprises a base station, access point, or a standalone entity. In another particular implementation, one or more first signaling messages is exchanged in part using a Fifth Generation (5G) radio interface or a $3^{rd}$ Generation Partnership Project (3GPP) New Radio (NR). In another particular implementation, the location measurement is a measurement of received signal strength indication (RSSI), angle of arrival (AOA), round trip signal propagation time (RTT), reference signal time difference (RSTD), signal to noise ratio (S/N), reference signal received power (RSRP), reference signal received quality (RSRQ), a code phase for a satellite vehicle (SV), a carrier phase for an SV, or a location estimate for the UE. In another particular implementation, the location estimate for the UE is obtained based at least in part on the location measurement, the location information or both. In another particular implementation, one or more first signaling messages are defined according to the Long Term Evolution (LTE) Positioning Protocol (LPP) protocol for the $3^{rd}$ Generation Partnership Project (3GPP) the LPP Extensions (LPPe) protocol defined by the Open Mobile Alliance (OMA), or both LPP and LPPe. In another particular implementation, the location information comprises a location estimate for the UE, location measurements for the UE or both. In another particular implementation, the location configuration comprises parameters defining periodic location of the UE, triggered location of the UE, location accuracy for the UE, or a combination thereof. In another particular implementation, the location context comprises a last known serving cell identifier (ID) for the UE, a last known serving base station ID for the UE, a last known location for the UE, the location measurement, the location information, or a combination thereof. In another particular implementation, one or more second signaling messages are defined according to the Long Term Evolution (LTE) Positioning Protocol Annex (LPPa) protocol for the $3^{rd}$ Generation Partnership Project (3GPP). In another particular implementation, one or more second signaling messages are exchanged using the Internet Protocol (IP).

Particular embodiments described herein further relate to a location server associated with a core network for locating a user equipment (UE), comprising: a communication interface; and one or more processors to: exchange one or more first signaling messages through the communication interface with the UE, the one or more first signaling messages comprising a location measurement received obtained by the UE, a request sent to the UE for the location measurement, assistance data sent to the UE, the assistance data assisting the UE to obtain the location measurement, or a combination thereof; and exchange one or more second signaling messages through the communication interface with a location server function associated with a radio access network, one or more second signaling message comprising location information for the UE, a request for the location information for the UE, a location configuration for the UE, a request for the location configuration for the UE, a location context for the UE, a request for the location context for the UE, or a combination thereof. In one particular implementation, the one or more second signaling messages comprise one or more control plane messages or one or more user plane messages. In another particular implementation, the location server function comprises a base station, access point, or a standalone entity. In another particular implementation, one or more first signaling messages is exchanged in part using a Fifth Generation (5G) radio interface or a $3^{rd}$ Generation Partnership Project (3GPP) New Radio (NR). In another particular implementation, the location measurement is a measurement of received signal strength indication (RSSI), angle of arrival (AOA), round trip signal propagation time (RTT), reference signal time difference (RSTD), signal to noise ratio (S/N), reference signal received power (RSRP), reference signal received quality (RSRQ), a code phase for a satellite vehicle (SV), a carrier phase for an SV, or a location estimate for the UE. In another particular implementation, the location estimate for the UE is obtained based at least in part on the location measurement, the location information or both. In another particular implementation, one or more first signaling messages are defined according to the Long Term Evolution (LTE) Positioning Protocol (LPP) protocol for the $3^{rd}$ Generation Partnership Project (3GPP) the LPP Extensions (LPPe) protocol defined by the Open Mobile Alliance (OMA), or both LPP and LPPe. In another particular implementation, the location information comprises a location estimate for the UE, location measurements for the UE or both. In another particular implementation, the location configuration comprises parameters defining periodic location of the UE, triggered location of the UE, location accuracy for the UE, or a combination thereof. In another particular implementation, the location context comprises a last known serving cell identifier (ID) for the UE, a last known serving base station ID for the UE, a last known location for the UE, the location measurement, the location information, or a combination thereof. In another particular implementation, one or more second signaling messages are defined according to the Long Term Evolution (LTE) Positioning Protocol Annex (LPPa) protocol for the $3^{rd}$ Generation Partnership Project (3GPP). In another particular implementation, one or more second signaling messages are exchanged using the Internet Protocol (IP).

Particular embodiments described herein further relate to a non-transitory storage medium comprising computer-readable instructions stored thereon which are executable by one or more processors of a location server associated with a core network for locating a user equipment (UE) to: exchange one or more first signaling messages with the UE, the one or more first signaling messages comprising a location measurement received obtained by the UE, a request sent to the UE for the location measurement, assistance data sent to the UE, the assistance data assisting the UE to obtain the location measurement, or a combination thereof; exchange a plurality of one or more second signaling messages with a location server function associated with a radio access network, one or more second signaling message comprising location information for the UE, a request for the location information for the UE, a location configuration for the UE, a request for the location configuration for the UE, a location context for the UE, a request for the location context for the UE, or a combination thereof. In one particular implementation, the one or more second signaling messages comprise one or more control plane messages or one or more user plane messages. In another particular implementation, the location server function comprises a base station, access point, or a standalone entity. In another particular implementation, one or more first signaling messages is exchanged in part using a Fifth Generation (5G) radio interface or a 3$^{rd}$ Generation Partnership Project (3GPP) New Radio (NR). In another particular implementation, the location measurement is a measurement of received signal strength indication (RSSI), angle of arrival (AOA), round trip signal propagation time (RTT), reference signal time difference (RSTD), signal to noise ratio (S/N), reference signal received power (RSRP), reference signal received quality (RSRQ), a code phase for a satellite vehicle (SV), a carrier phase for an SV, or a location estimate for the UE. In another particular implementation, the location estimate for the UE is obtained based at least in part on the location measurement, the location information or both. In another particular implementation, one or more first signaling messages are defined according to the Long Term Evolution (LTE) Positioning Protocol (LPP) protocol for the 3$^{rd}$ Generation Partnership Project (3GPP) the LPP Extensions (LPPe) protocol defined by the Open Mobile Alliance (OMA), or both LPP and LPPe. In another particular implementation, the location information comprises a location estimate for the UE, location measurements for the UE or both. In another particular implementation, the location configuration comprises parameters defining periodic location of the UE, triggered location of the UE, location accuracy for the UE, or a combination thereof. In another particular implementation, the location context comprises a last known serving cell identifier (ID) for the UE, a last known serving base station ID for the UE, a last known location for the UE, the location measurement, the location information, or a combination thereof. In another particular implementation, one or more second signaling messages are defined according to the Long Term Evolution (LTE) Positioning Protocol Annex (LPPa) protocol for the 3$^{rd}$ Generation Partnership Project (3GPP). In another particular implementation, one or more second signaling messages are exchanged using the Internet Protocol (IP).

Particular embodiments described herein further relate to A location server associated with a core network for locating a user equipment (UE), comprising: means for exchanging a one or more first signaling messages with the UE, the one or more first signaling messages comprising a location measurement received obtained by the UE, a request sent to the UE for the location measurement, assistance data sent to the UE, the assistance data assisting the UE to obtain the location measurement, or a combination thereof; means for exchanging a plurality of one or more second signaling messages with a location server function associated with a radio access network, one or more second signaling message comprising location information for the UE, a request for the location information for the UE, a location configuration for the UE, a request for the location configuration for the UE, a location context for the UE, a request for the location context for the UE, or a combination thereof. In one particular implementation, the one or more second signaling messages comprise one or more control plane messages or one or more user plane messages. In another particular implementation, the location server function comprises a base station, access point, or a standalone entity. In another particular implementation, one or more first signaling messages is exchanged in part using a Fifth Generation (5G) radio interface or a 3$^{rd}$ Generation Partnership Project (3GPP) New Radio (NR). In another particular implementation, the location measurement is a measurement of received signal strength indication (RSSI), angle of arrival (AOA), round trip signal propagation time (RTT), reference signal time difference (RSTD), signal to noise ratio (S/N), reference signal received power (RSRP), reference signal received quality (RSRQ), a code phase for a satellite vehicle (SV), a carrier phase for an SV, or a location estimate for the UE. In another particular implementation, the location estimate for the UE is obtained based at least in part on the location measurement, the location information or both. In another particular implementation, one or more first signaling messages are defined according to the Long Term Evolution (LTE) Positioning Protocol (LPP) protocol for the 3$^{rd}$ Generation Partnership Project (3GPP) the LPP Extensions (LPPe) protocol defined by the Open Mobile Alliance (OMA), or both LPP and LPPe. In another particular implementation, the location information comprises a location estimate for the UE, location measurements for the UE or both. In another particular implementation, the location configuration comprises parameters defining periodic location of the UE, triggered location of the UE, location accuracy for the UE, or a combination thereof. In another particular implementation, the location context comprises a last known serving cell identifier (ID) for the UE, a last known serving base station ID for the UE, a last known location for the UE, the location measurement, the location information, or a combination thereof. In another particular implementation, one or more second signaling messages are defined according to the Long Term Evolution (LTE) Positioning Protocol Annex (LPPa) protocol for the 3$^{rd}$ Generation Partnership Project (3GPP). In another particular implementation, one or more second signaling messages are exchanged using the Internet Protocol (IP).

As used herein, the terms "mobile device" and "user equipment" (UE) are used synonymously to refer to a device that may from time to time have a location that changes. The changes in location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit.

Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband CDMA (WCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and WCDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. 4G Long Term Evolution (LTE) and 5G or New Radio (NR) communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method of supporting location services at a user equipment (UE), comprising:
 exchanging a plurality of first signaling messages with a
  first location server implemented in a base station or access point of a radio access network, wherein the radio access network comprises a first positioning domain to utilize a first protocol, the plurality of first signaling messages comprising first assistance data, from the first location server and configured to assist the UE to obtain a first location measurement, and: (i) the first location measurement, the first location server enabled to determine an estimate of a location of the UE based at least in part on the first location measurement; or (ii) a request received by the UE for the first location measurement; or (iii) a combination thereof; and exchanging one or more second signaling messages with a second location server associated with a core network, wherein the core network comprises a second positioning domain to utilize a second protocol distinct from the first protocol, the one or more second signaling messages comprising: a second location measurement obtained by the UE; or a request received by the UE for the second location measurement; or second assistance data received by the UE, the second assistance data to assist the UE to obtain the second location measurement; or a combination of two or more thereof.

2. The method of claim 1, wherein the plurality of first signaling messages comprise a plurality of layer 3 messages, and wherein the one or more second signaling messages comprise one or more control plane messages or one or more user plane messages.

3. The method of claim 1, wherein the plurality of first signaling messages are exchanged in part using a Fifth Generation (5G) radio interface or a 3rd Generation Partnership Project (3GPP) Previously presented Radio (NR).

4. The method of claim 1, wherein the first location measurement or the second location measurement, or a combination thereof, comprises a measurement of received signal strength indication (RSSI), angle of arrival (AOA), round trip signal propagation time (RTT), reference signal time difference (RSTD), signal to noise ratio (S/N), reference signal received power (RSRP), reference signal received quality (RSRQ), a code phase for a satellite vehicle (SV) or a carrier phase for an SV.

5. The method of claim 1, wherein the first assistance data is received by the UE by receiving a broadcast signal.

6. The method of claim 1, wherein the one or more second signaling messages are defined according to Long Term Evolution (LTE) Positioning Protocol (LPP) protocol for 3rd Generation Partnership Project (3GPP) or LPP Extensions (LPPe) protocol defined by Open Mobile Alliance (OMA), or both LPP and LPPe.

7. A user equipment (UE) to support location services, comprising:
a wireless transceiver to transmit signaling messages to and receive signaling messages from a communication network; and
one or more processors configured to:
exchange a plurality of first signaling messages with a first location server implemented in a base station or access point of a radio access network through the wireless transceiver, the plurality of first signaling messages comprising first assistance data, from the first location server and configured to assist the UE to obtain a first location measurement, and: (i) the first location measurement, the first location server enabled to determine a location estimate of the UE based at least in part on the first location measurement; or (ii) a request received by the UE for the first location measurement; or (iii) a combination thereof; and exchange one or more second signaling messages with a second location server associated with a core network through the wireless transceiver, the one or more second signaling messages comprising: a second location measurement obtained by the UE; or a request received by the UE for the second location measurement; or second assistance data received by the UE, the second assistance data to assist the UE to obtain the second location measurement; or a combination of two or more thereof.

8. The UE of claim 7, wherein the plurality of first signaling messages comprise one or more layer 3 messages, and wherein the one or more second signaling messages comprise one or more control plane messages or one or more user plane messages.

9. The UE of claim 7, wherein the plurality of first signaling messages are exchanged in part using a Fifth Generation (5G) radio interface or a 3rd Generation Partnership Project (3GPP) Previously presented Radio (NR).

10. The UE of claim 7, wherein the first location measurement or the second location measurement, or a combination thereof, comprises a measurement of received signal strength indication (RSSI), angle of arrival (AOA), round trip signal propagation time (RTT), reference signal time difference (RSTD), signal to noise ratio (S/N), reference signal received power (RSRP), reference signal received quality (RSRQ), a code phase for a satellite vehicle (SV) or a carrier phase for an SV.

11. The UE of claim 7, wherein the one or more second signaling messages are defined according to Long Term Evolution (LTE) Positioning Protocol (LPP) protocol for 3rd Generation Partnership Project (3GPP) or LPP Extensions (LPPe) protocol defined by Open Mobile Alliance (OMA), or both LPP and LPPe.

12. A user equipment (UE) to support location services, comprising:
means for transmitting and receiving signaling messages to and from a communication network;
means for exchanging a plurality of first signaling messages with a first location server implemented in a base station or access point of a radio access network through the wireless transceiver, wherein the radio access network comprises a first positioning domain to utilize a first protocol, the plurality of first signaling messages comprising first assistance data, from the first location server and configured to assist the UE to obtain a first location measurement, and: (i) the first location measurement, the first location server enabled to determine a location estimate of the UE based at least in part on the first location measurement; or (ii) a request received by the UE for the first location measurement; or (iii) a combination thereof; and
means for exchanging one or more second signaling messages with a second location server associated with a core network through the means for transmitting and receiving the signaling messages to and from the communication network, wherein the core network comprises a second positioning domain to utilize a second protocol distinct from the first protocol, the one or more second signaling messages comprising: a second location measurement obtained by the UE; or a request received by the UE for the second location measurement; or second assistance data received by the UE, the second assistance data to assist the UE to obtain the second location measurement; or a combination of two or more thereof.

13. The UE of claim 12, wherein the plurality of first signaling messages comprise one or more layer 3 messages, and wherein the one or more second signaling messages comprise one or more control plane messages or one or more user plane messages.

14. The UE of claim 12, wherein the plurality of first signaling messages are exchanged in part using a Fifth Generation (5G) radio interface or a 3rd Generation Partnership Project (3GPP) Previously presented Radio (NR).

15. The UE of claim 12, wherein the first location measurement or the second location measurement, or a combination thereof, comprises a measurement of received signal strength indication (RSSI), angle of arrival (AOA), round trip signal propagation time (RTT), reference signal time difference (RSTD), signal to noise ratio (S/N), reference signal received power (RSRP), reference signal received quality (RSRQ), a code phase for a satellite vehicle (SV) or a carrier phase for an SV.

16. The UE of claim 12, wherein the one or more second signaling messages are defined according to Long Term Evolution (LTE) Positioning Protocol (LPP) protocol for 3rd Generation Partnership Project (3GPP) or LPP Extensions (LPPe) protocol defined by Open Mobile Alliance (OMA), or both LPP and LPPe.

17. An article comprising: a non-transitory computer-readable medium comprising machine-readable instructions stored thereon which are executable by a processor to:
   initiate exchange of a plurality of first signaling messages between a user equipment (UE) and a first location server implemented in a base station or access point of a radio access network, wherein the radio access network comprises a first positioning domain to utilize a first protocol, the plurality of first signaling messages comprising first assistance data, from the first location server and configured to assist the UE to obtain a first location measurement, and: (i) the first location measurement, the first location server enabled to determine a location estimate of the UE based at least in part on the first location measurement; or (ii) a request received by the UE for the first location measurement; or (iii) a combination thereof; and
   initiate exchange of one or more second signaling messages between the UE and a second location server associated with a core network, wherein the core network comprises a second positioning domain to utilize a second protocol distinct from the first protocol, the one or more second signaling messages comprising: a second location measurement obtained by the UE; or a request received by the UE for the second location measurement; or second assistance data received by the UE, the second assistance data to assist the UE to obtain the second location measurement; or a combination of two or more thereof.

18. The article of claim 17, wherein the plurality of first signaling messages comprise one or more layer 3 messages, and wherein the one or more second signaling messages comprise one or more control plane messages or one or more user plane messages.

19. The article of claim 17, wherein plurality of first signaling messages are exchanged in part using a Fifth Generation (5G) radio interface or a 3rd Generation Partnership Project (3GPP) Previously presented Radio (NR).

20. The article of claim 17, wherein the first location measurement or the second location measurement, or a combination thereof, comprises a measurement of received signal strength indication (RSSI), angle of arrival (AOA), round trip signal propagation time (RTT), reference signal time difference (RSTD), signal to noise ratio (S/N), reference signal received power (RSRP), reference signal received quality (RSRQ), a code phase for a satellite vehicle (SV) or a carrier phase for an SV.

21. The article of claim 17, wherein the one or more second signaling messages are defined according to Long Term Evolution (LTE) Positioning Protocol (LPP) protocol for 3rd Generation Partnership Project (3GPP) or LPP Extensions (LPPe) protocol defined by Open Mobile Alliance (OMA), or both LPP and LPPe.

22. The method claim 1, wherein the first assistance data comprises scheduling information indicative of when a reference signal is to be transmitted, the method comprising:
   obtaining the first location measurement of the reference signal based on the scheduling information.

23. The method claim 1, wherein the first assistance data is ciphered, the method comprising:
   deciphering the first assistance data responsive to obtaining the first assistance data from the first location server.

* * * * *